(12) United States Patent
Parker

(10) Patent No.: US 7,554,978 B1
(45) Date of Patent: Jun. 30, 2009

(54) SYSTEM FOR ACCESSING CONTENT-ADDRESSABLE MEMORY IN PACKET PROCESSOR

(75) Inventor: David K. Parker, Cheltenham (GB)

(73) Assignee: Extreme Networks, Inc., Santa Clara, CA (US)

( * ) Notice: Subject to any disclaimer, the term of this patent is extended or adjusted under 35 U.S.C. 154(b) by 834 days.

(21) Appl. No.: 10/834,576

(22) Filed: Apr. 28, 2004

Related U.S. Application Data

(60) Provisional application No. 60/558,039, filed on Mar. 30, 2004.

(51) Int. Cl.
*H04L 12/56* (2006.01)
*G06F 12/00* (2006.01)
*G06F 13/16* (2006.01)

(52) U.S. Cl. ............ 370/389; 370/256; 370/392; 370/412; 370/429; 370/469; 709/223; 709/224; 709/231; 709/249; 711/108; 711/122

(58) Field of Classification Search ........ 370/389–469; 709/223–249; 711/108–126
See application file for complete search history.

(56) References Cited

U.S. PATENT DOCUMENTS

| 4,025,901 | A | * | 5/1977 | Bachman et al. ............... 707/3 |
| 4,042,912 | A | * | 8/1977 | Bachman et al. ............... 707/1 |
| 5,282,270 | A | | 1/1994 | Oppenheimer et al. |
| 6,034,957 | A | | 3/2000 | Haddock et al. |
| 6,172,980 | B1 | | 1/2001 | Flanders et al. |
| 6,173,333 | B1 | * | 1/2001 | Jolitz et al. .................. 709/240 |
| 6,275,861 | B1 | | 8/2001 | Chaudri et al. |
| 6,295,299 | B1 | | 9/2001 | Haddock et al. |
| 6,381,242 | B1 | | 4/2002 | Maher, III et al. |
| 6,466,983 | B1 | * | 10/2002 | Strazza ....................... 709/227 |
| 6,502,185 | B1 | * | 12/2002 | Keller et al. ................. 712/213 |
| 6,553,002 | B1 | | 4/2003 | Bremer et al. |
| 6,570,877 | B1 | * | 5/2003 | Kloth et al. .................. 370/392 |
| 6,738,892 | B1 | | 5/2004 | Coon et al. |
| 6,765,881 | B1 | | 7/2004 | Rajakarunanayake |
| 6,871,262 | B1 | | 3/2005 | Oren et al. |
| 6,882,642 | B1 | * | 4/2005 | Kejriwal et al. ............. 370/388 |

(Continued)

FOREIGN PATENT DOCUMENTS

WO    WO 03/081857    10/2003

OTHER PUBLICATIONS

Van Ess, D., *A Circular FIFO, PSoC Style*, Cypress Microsystems, Application Note AN2036, Rev. B, pp. 1-5, Jun. 21, 2002.

(Continued)

*Primary Examiner*—Edan Orgad
*Assistant Examiner*—Venkatesh Haliyur
(74) *Attorney, Agent, or Firm*—Howrey LLP

(57) ABSTRACT

A system for accessing a content-addressable memory in a packet processing system is described. A register holds a data element having a key field. Logic derives a value of the key responsive to 1) packet processing state data relating to one or more packets undergoing processing by the packet processing system, and 2) the value of this key field. The derived value of the key is presented to the memory. In response, the memory searches for an entry associated with the presented key value. If found, the content value associated with the entry is output. If not found, a signal indicative of a miss condition is output.

22 Claims, 47 Drawing Sheets

U.S. PATENT DOCUMENTS

| | | | |
|---|---|---|---|
| 6,888,797 B1 | 5/2005 | Cao et al. | |
| 6,914,905 B1 | 7/2005 | Yip | |
| 6,917,617 B2 | 7/2005 | Jin et al. | |
| 6,957,258 B2 | 10/2005 | Maher, III et al. | |
| 6,980,552 B1* | 12/2005 | Belz et al. | 370/392 |
| 7,007,151 B1* | 2/2006 | Ely et al. | 711/202 |
| 7,079,407 B1 | 7/2006 | Dimitrelis | |
| 7,120,733 B1* | 10/2006 | Mick et al. | 711/108 |
| 7,149,216 B1* | 12/2006 | Cheriton | 370/392 |
| 7,152,191 B2* | 12/2006 | Kessler et al. | 714/55 |
| 7,177,276 B1* | 2/2007 | Epps et al. | 370/230 |
| 7,190,696 B1 | 3/2007 | Manur et al. | |
| 7,248,584 B2 | 7/2007 | Hooper | |
| 7,248,585 B2 | 7/2007 | Kohn et al. | |
| 7,274,693 B1* | 9/2007 | Kloth et al. | 370/389 |
| 7,463,628 B2* | 12/2008 | Parker et al. | 370/392 |
| 7,502,374 B1* | 3/2009 | Parker et al. | 370/395.32 |
| 7,522,516 B1* | 4/2009 | Parker | 370/216 |
| 2001/0025315 A1* | 9/2001 | Jolitz | 709/231 |
| 2002/0109615 A1* | 8/2002 | Abdat | 341/51 |
| 2002/0191605 A1* | 12/2002 | Lunteren et al. | 370/389 |
| 2003/0069973 A1 | 4/2003 | Ganesan et al. | |
| 2003/0193949 A1 | 10/2003 | Kojima et al. | |
| 2003/0196081 A1* | 10/2003 | Savarda et al. | 713/153 |
| 2004/0003110 A1 | 1/2004 | Ozguner | |
| 2004/0100956 A1 | 5/2004 | Watanabe | |
| 2004/0205753 A1 | 10/2004 | Moore | |
| 2004/0246981 A1 | 12/2004 | Zhiqun | |
| 2005/0074009 A1 | 4/2005 | Kanetake | |
| 2005/0198362 A1 | 9/2005 | Navada et al. | |
| 2005/0220094 A1* | 10/2005 | Parker et al. | 370/389 |
| 2005/0226242 A1* | 10/2005 | Parker | 370/389 |
| 2007/0153808 A1* | 7/2007 | Parker et al. | 370/395.53 |

OTHER PUBLICATIONS

Network Working Group, *RFC 1071—Computing the Internet Checksum*, Sep. 1988, available at: http://www.faqs.org/rfcs/rfc1071.html.

Network Working Group, *RFC 1141—Incremental Updating of the Internet Checksum*, Jan. 1990, available at: http://www.faqs.org/rfcs/rfc1141.html.

Network Working Group, *RFC 1624—Computation of the Internet Checksum via Incremental Update*, May 1994, available at: http://www.faqs.org/rfcs/rfc1624.html.

Netlogic Microsystems, Product Brief NSE5000GLQ, Copyright 2004, available at: http://www.netlogicmicro.com/datasheets/nse5000glq.html.

Zhang, Z., *Recovery of Memory and Process in DSM Systems: HA Issue #1*, Hewlett-Packard Co. HPL-2001-76, Mar. 30, 2001.

* cited by examiner

| BIT | FUNCTION | DESCRIPTION |
|---|---|---|
| 15-0 | PTI | PORT TAG INDEX. |
| 19-16 | EQoS | EGRESS QUEUE SELECT. |
| 23-20 | LAI | LAI INDEX. |
| 24 | JUMBO | EGRESS JUMBO CHECK FLAG. |
| 25 | DON'T FRAG | DON'T FRAGMENT FLAG. |
| 26 | IF TYPE | INGRESS INTERFACE TYPE. 0 = ETHERNET, 1 = POS INTERFACE. |
| 27 | - | RESERVED. |
| 28 | ROUTE | ROUTE FLAG. |
| 29 | RED | RANDOM EARLY DROP. |
| 31-30 | CTL | AFH FORMAT TYPE. |
| 51-32 | TXMI | TRANSMIT MODIFICATION INDEX. |
| 58-52 | CQoS | CPU QUEUE SELECT. |
| 59 | CPU COPY | CPU COPY FLAG. |
| 60 | REDIRECT | REDIRECT FLAG. |
| 61 | SSAMPLE | STATISTICAL SAMPLE FLAG. |
| 62 | LEARN | LEARN FLAG. REQUESTS OT TO SEND A COPY OF THE PACKET TO THE CPU FOR LEARN PROCESSING. |
| 63 | EMIRROR | EGRESS MIRROR. |
| 75-64 | IQoS | INGRESS QUEUE SELECT. |
| 78-76 | EMRK SEL | EGRESS MARK SELECT. |
| 81-79 | EMRK MASK | EGRESS MARK MASK. |
| 82 | IMIRROR | INGRESS MIRROR. |
| 83 | PERR KILL | PARITY ERROR KILL. |

FIGURE 2

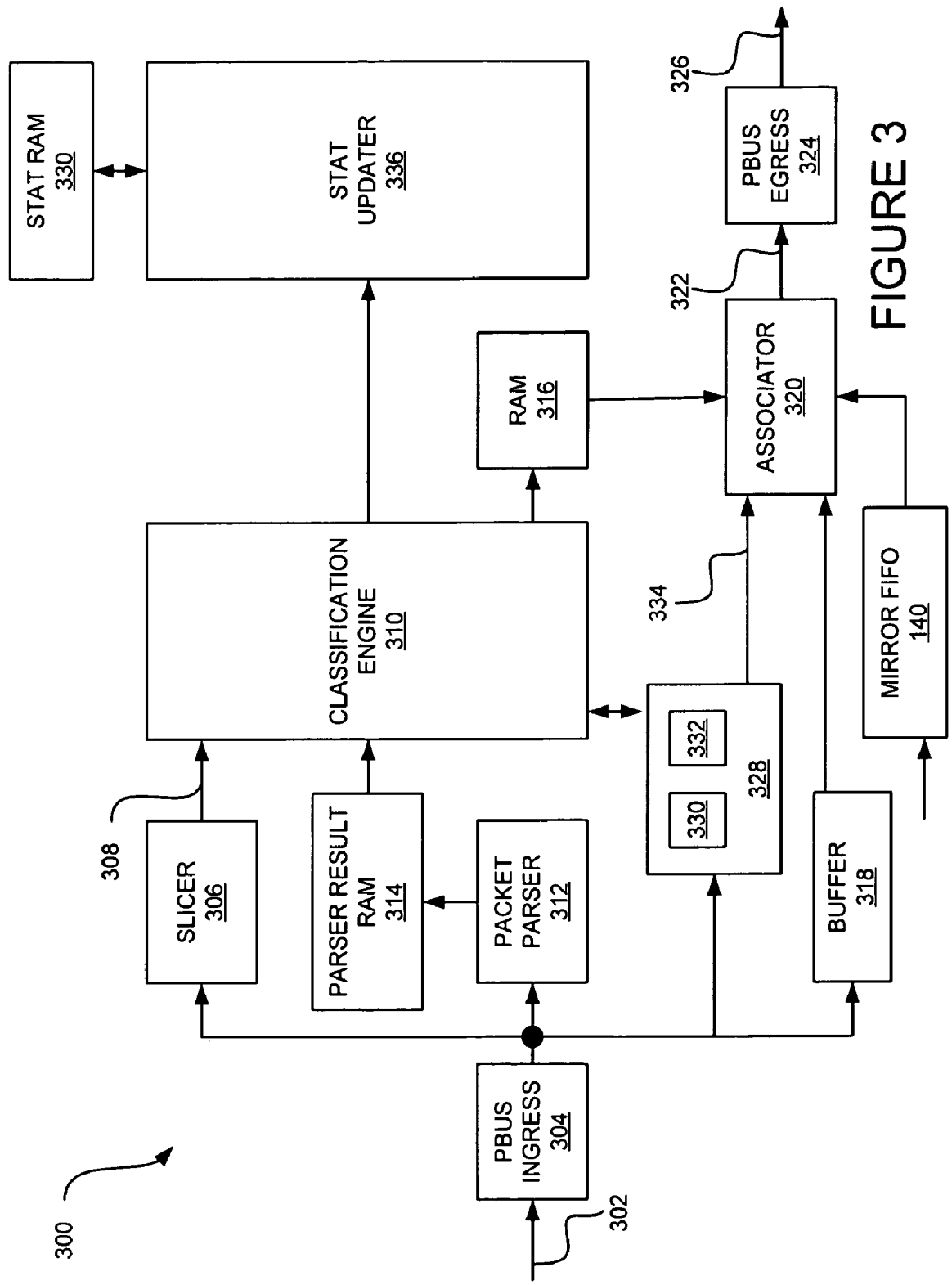

| Bit | Function | Description |
|---|---|---|
| 0 | BUSY | Processor pipeline stage is processing a packet. |
| 1 | CPU | Processor pipeline stage is processing a CPU access. |
| 2 | FIRST | First processor cycle for a packet processing sequence. |
| 3 | DONE PEND | Processor is finished processing for a packet. AFH hand-off is pending. |
| 9-4 | PTR | Packet reference handle into Receive FIFO. |
| 17-10 | LEN | Packet length up to 127 byte limit for receive processing. |
| 18 | IF TYPE | Ingress Interface Type. 0 = Ethernet, 1 = POS Interface. |
| 19 | IF PST ACTIVE | PST table is being used for this packet processing sequence. |
| 27-20 | PORT | Ingress Port of packet being processed. |
| 43-28 | VLAN | VLAN Tag associated with this processor cycle. |
| 51-44 | C1 | C1 Context Pointer for this processor cycle. |
| 59-52 | C2 | C2 Context Pointer for this processor cycle. |
| 67-60 | C3 | C3 Context Pointer for this processor cycle. |
| 75-68 | C4 | C4 Context Pointer for this processor cycle. |
| 83-76 | C5 | C5 Context Pointer for this processor cycle. |
| 91-84 | C6 | C6 Context Pointer for this processor cycle. |
| 95-92 | LKUP COUNT | Processor Cycle count for the packet being processed. |
| 102-96 | SCT | SCT Index for this processor cycle. |
| 103 | - | Reserved. |
| 104 | PAGE SEL | Page Select for this processor cycle. |
| 105 | VLAN SEL | VLAN Select for this processor cycle. |
| 106 | L3 SEL | L3 Header Select for this processor cycle. |
| 107 | VLAN ARAM | Active VLAN was derived from ARAM entry. |
| 108 | DEBUG ACTIVE | Debug Process Active. |
| 109 | DEBUG LAST SLOT | Debug Indication that this is the last slot in processor pipeline. |
| 110 | DEBUG LAST LKUP | Debug Indication that this is the last processor cycle in processor pipeline. |
| 111 | - | Reserved. |
| 115-112 | DEBUG VALID | Debug Valid bits to control triggering. |

FIGURE 22

| Bit | Function | Description |
| --- | --- | --- |
| 15-0 | PTI | Port Tag Index. |
| 35-16 | TXMI | Transmit Modification Index. |
| 39-36 | EQOS | Egress Queue Select. |
| 51-40 | IQOS | Ingress Queue Select. |
| 58-52 | CQOS | CPU Queue Select. |
| 59 | CPU COPY | CPU Copy Flag. |
| 62-60 | EMRK SEL | Egress Mark Select. |
| 65-63 | EMRK MASK | Egress Mark Mask. |
| 66 | PERR KILL | Parity Error Kill. |
| 67 | - | Reserved. |
| 71-68 | LAI | LAI Index. |
| 72 | LAI KEEP | LAI Index supplied by ARAM. |
| 73 | EMIRROR | Egress Mirror. |
| 74 | IMIRROR | Ingress Mirror. |
| 75 | ROUTE | Route Flag. |
| 76 | LEARN | Learn Flag. |
| 77 | REDIRECT | Redirect Flag. |
| 78 | JUMBO | Egress Jumbo Check Flag. |
| 79 | DON'T FRAG | Don't Fragment Flag. |
| 80 | RED | Random Early Drop Flag |
| 81 | IF TYPE | Ingress Interface Type. |
| 83-82 | - | Reserved. |
| 87-84 | PTI PRI | Port Tag Index Priority. |
| 91-88 | TXMI PRI | Transmit Modification Index Priority. |
| 95-92 | EQOS PRI | Egress Queue Select Priority. |
| 99-96 | IQOS PRI | Ingress Queue Select Priority. |
| 103-100 | CQOS PRI | CPU Queue Select Priority. |
| 107-104 | EMS/EMM PRI | Egress Mark Select/Mask Priority. |
| 110-108 | SSAMPLE BIN | Statistical Sample Bin. |
| 111 | SAMPLE ARAM | Statistical Sample Bin supplied by ARAM. |

FIGURE 23

| Bit | Function | Description |
| --- | --- | --- |
| 19-0 | STAT0 INDEX | Statistics Matrix 0 Index. |
| 39-20 | STAT1 INDEX | Statistics Matrix 1 Index. |
| 40 | STAT0 VALID | Statistics Matrix 0 Index field is valid. |
| 41 | STAT1 VALID | Statistics Matrix 1 Index field is valid. |
| 44-42 | SUQ ENT INDEX | Statistics Update Queue Entry Index. |
| 45 | SUQ BANK SEL | Statistics Update Queue Bank Select. |
| 52-46 | CNTR ID | Counter Id. |
| 53 | - | Reserved. |
| 55-54 | IP FRAG | IP Fragment Decode for IP Header currently being processed. (was absent from final netlist – ECOd into here as a patch). 0x0 = single, 0x1 = first, 0x2 = last, 0x3 = middle. |

FIGURE 24

| Field | Size | Description |
| --- | --- | --- |
| CID | byte | CAM ID from SCT for this processor cycle. |
| RID | byte | Router ID from PST or VST for this processor cycle. |
| PORT | byte | Ingress Port of packet being processed. |
| CONSTANT | byte | CONSTANT from SCT for this processor cycle. |
| RT0 RESULT | nibble | Result of Reduction Table 0 for this processor cycle. |
| RT1 RESULT | nibble | Result of Reduction Table 1 for this processor cycle. |
| RT2 RESULT | nibble | Result of Reduction Table 2 for this processor cycle. |
| RT3 RESULT | nibble | Result of Reduction Table 3 for this processor cycle. |
| IP PROTOCOL | byte | IP Protocol field of IP header currently being processed. |
| ARAM DATA | 144 bits | ARAM Entry Data from previous processor cycle. |
| CONTROL SET | 116 bits | Working Control Data Set for this processor cycle. |
| AFH SET | 112 bits | Working AFH Data Set for this processor cycle. |
| STATS SET | 56 bits | Working STAT Data Set for this processor cycle. |

FIGURE 25

| Byte 0 | | Byte 1 | | Byte 2 | | Byte 3 | | Byte 4 | | Byte 5 | | Byte 6 | | Byte 7 | |
|---|---|---|---|---|---|---|---|---|---|---|---|---|---|---|---|
| Nibble 0 | Nibble 1 | Nibble 2 | Nibble 3 | Nibble 4 | Nibble 5 | Nibble 6 | Nibble 7 | Nibble 8 | Nibble 9 | Nibble 10 | Nibble 11 | Nibble 12 | Nibble 13 | Nibble 14 | Nibble 15 |
| 0x00 | | CID | | CONSTANT | | RID | | PORT | | RT0 RES | RT1 RES | RT2 RES | RT3 RES | IP PROTOCOL | |
| 7:4 | 3:0 | 7:4 | 3:0 | 7:4 | 3:0 | 7:4 | 3:0 | 7:4 | 3:0 | 3:0 | 3:0 | 3:0 | 3:0 | 7:4 | 3:0 |

| Byte 8 | | Byte 9 | | Byte 10 | | Byte 11 | | Byte 12 | | Byte 13 | | Byte 14 | | Byte 15 | |
|---|---|---|---|---|---|---|---|---|---|---|---|---|---|---|---|
| Nibble 16 | Nibble 17 | Nibble 18 | Nibble 19 | Nibble 20 | Nibble 21 | Nibble 22 | Nibble 23 | Nibble 24 | Nibble 25 | Nibble 26 | Nibble 27 | Nibble 28 | Nibble 29 | Nibble 30 | Nibble 31 |
| 0x0000_0000_0000_0000 | | | | | | | | | | | | | | | |

| Byte 16 | | Byte 17 | | Byte 18 | | Byte 19 | | Byte 20 | | Byte 21 | | Byte 22 | | Byte 23 | |
|---|---|---|---|---|---|---|---|---|---|---|---|---|---|---|---|
| Nibble 32 | Nibble 33 | Nibble 34 | Nibble 35 | Nibble 36 | Nibble 37 | Nibble 38 | Nibble 39 | Nibble 40 | Nibble 41 | Nibble 42 | Nibble 43 | Nibble 44 | Nibble 45 | Nibble 46 | Nibble 47 |
| 0x0 | | CONTROL SET | | | | | | | | | | | | | |
| 3:0 | 115:112 | 111:108 | 107:104 | 103:100 | 99:96 | 95:92 | 91:8 | 87:84 | 83:80 | 79:76 | 75:72 | 71:68 | 67:64 | 63:60 | 59:56 |

| Byte 24 | | Byte 25 | | Byte 26 | | Byte 27 | | Byte 28 | | Byte 29 | | Byte 30 | | Byte 31 | |
|---|---|---|---|---|---|---|---|---|---|---|---|---|---|---|---|
| Nibble 48 | Nibble 49 | Nibble 50 | Nibble 51 | Nibble 52 | Nibble 53 | Nibble 54 | Nibble 55 | Nibble 56 | Nibble 57 | Nibble 58 | Nibble 59 | Nibble 60 | Nibble 61 | Nibble 62 | Nibble 63 |
| CONTROL SET | | | | | | | | | | | | | | 0x00 | |
| 55:52 | 51:48 | 47:44 | 43:40 | 39:36 | 35:32 | 31:28 | 27:24 | 23:20 | 19:16 | 15:12 | 11:8 | 7:4 | 3:0 | 7:4 | 3:0 |

| Byte 32 | | Byte 33 | | Byte 34 | | Byte 35 | | Byte 36 | | Byte 37 | | Byte 38 | | Byte 39 | |
|---|---|---|---|---|---|---|---|---|---|---|---|---|---|---|---|
| Nibble 64 | Nibble 65 | Nibble 66 | Nibble 67 | Nibble 68 | Nibble 69 | Nibble 70 | Nibble 71 | Nibble 72 | Nibble 73 | Nibble 74 | Nibble 75 | Nibble 76 | Nibble 77 | Nibble 78 | Nibble 79 |
| AFH SET | | | | | | | | | | | | | | | |
| 111:108 | 107:104 | 103:100 | 99:96 | 95:92 | 91:8 | 87:84 | 83:80 | 79:76 | 75:72 | 71:68 | 67:64 | 63:60 | 59:56 | 55:52 | 51:48 |

| Byte 40 | | Byte 41 | | Byte 42 | | Byte 43 | | Byte 44 | | Byte 45 | | Byte 46 | | Byte 47 | |
|---|---|---|---|---|---|---|---|---|---|---|---|---|---|---|---|
| Nibble 80 | Nibble 81 | Nibble 82 | Nibble 83 | Nibble 84 | Nibble 85 | Nibble 86 | Nibble 87 | Nibble 88 | Nibble 89 | Nibble 90 | Nibble 91 | Nibble 92 | Nibble 93 | Nibble 94 | Nibble 95 |
| AFH SET | | | | | | | | | | | | 0x0000 | | | |
| 47:44 | 43:40 | 39:36 | 35:32 | 31:28 | 27:24 | 23:20 | 19:16 | 15:12 | 11:8 | 7:4 | 3:0 | 15:12 | 11:8 | 7:4 | 3:0 |

| Byte 48 | | Byte 49 | | Byte 50 | | Byte 51 | | Byte 52 | | Byte 53 | | Byte 54 | | Byte 55 | |
|---|---|---|---|---|---|---|---|---|---|---|---|---|---|---|---|
| Nibble 96 | Nibble 97 | Nibble 98 | Nibble 99 | Nibble 100 | Nibble 101 | Nibble 102 | Nibble 103 | Nibble 104 | Nibble 105 | Nibble 106 | Nibble 107 | Nibble 108 | Nibble 109 | Nibble 110 | Nibble 111 |
| STATS SET | | | | | | | | | | | | | | 0x00 | |
| 55:52 | 51:48 | 47:44 | 43:40 | 39:36 | 35:32 | 31:28 | 27:24 | 23:20 | 19:16 | 15:12 | 11:8 | 7:4 | 3:0 | 7:4 | 3:0 |

| Byte 56 | | Byte 57 | | Byte 58 | | Byte 59 | | Byte 60 | | Byte 61 | | Byte 62 | | Byte 63 | |
|---|---|---|---|---|---|---|---|---|---|---|---|---|---|---|---|
| Nibble 112 | Nibble 113 | Nibble 114 | Nibble 115 | Nibble 116 | Nibble 117 | Nibble 118 | Nibble 119 | Nibble 120 | Nibble 121 | Nibble 122 | Nibble 123 | Nibble 124 | Nibble 125 | Nibble 126 | Nibble 127 |
| 0x0000_0000_0000_0000 | | | | | | | | | | | | | | | |

| Byte 64 | | Byte 65 | | Byte 66 | | Byte 67 | | Byte 68 | | Byte 69 | | Byte 70 | | Byte 71 | |
|---|---|---|---|---|---|---|---|---|---|---|---|---|---|---|---|
| Nibble 128 | Nibble 129 | Nibble 130 | Nibble 131 | Nibble 132 | Nibble 133 | Nibble 134 | Nibble 135 | Nibble 136 | Nibble 137 | Nibble 138 | Nibble 139 | Nibble 140 | Nibble 141 | Nibble 142 | Nibble 143 |
| ARAM DATA | | | | | | | | | | | | | | | |
| 143:140 | 139:136 | 135:132 | 131:128 | 127:124 | 123:120 | 119:116 | 115:112 | 111:108 | 107:104 | 103:100 | 99:96 | 95:92 | 91:88 | 87:84 | 83:80 |

FIGURE 26A

| 26A |
|---|
| 26B |

| Byte 72 | | Byte 73 | | Byte 74 | | Byte 75 | | Byte 76 | | Byte 77 | | Byte 78 | | Byte 79 | |
|---|---|---|---|---|---|---|---|---|---|---|---|---|---|---|---|
| Nibble 144 | Nibble 145 | Nibble 146 | Nibble 147 | Nibble 148 | Nibble 149 | Nibble 150 | Nibble 151 | Nibble 152 | Nibble 153 | Nibble 154 | Nibble 155 | Nibble 156 | Nibble 157 | Nibble 158 | Nibble 159 |
| ARAM DATA | | | | | | | | | | | | | | | |
| 79:76 | 75:72 | 71:68 | 67:64 | 63:60 | 59:56 | 55:52 | 51:48 | 47:44 | 43:40 | 39:36 | 35:32 | 31:28 | 27:24 | 23:20 | 19:16 |

| Byte 80 | | Byte 81 | | Byte 82 | | Byte 83 | | Byte 84 | | Byte 85 | | Byte 86 | | Byte 87 | |
|---|---|---|---|---|---|---|---|---|---|---|---|---|---|---|---|
| Nibble 160 | Nibble 161 | Nibble 162 | Nibble 163 | Nibble 164 | Nibble 165 | Nibble 166 | Nibble 167 | Nibble 168 | Nibble 169 | Nibble 170 | Nibble 171 | Nibble 172 | Nibble 173 | Nibble 174 | Nibble 175 |
| ARAM DATA | | | | 0x0000_0000_0000 | | | | | | | | | | | |
| 15:12 | 11:8 | 7:4 | 3:0 | 47:44 | 43:40 | 39:36 | 35:32 | 31:28 | 27:24 | 23:20 | 19:16 | 15:12 | 11:8 | 7:4 | 3:0 |

| Byte 88 | | Byte 89 | | Byte 90 | | Byte 91 | | Byte 92 | | Byte 93 | | Byte 94 | | Byte 95 | |
|---|---|---|---|---|---|---|---|---|---|---|---|---|---|---|---|
| Nibble 176 | Nibble 177 | Nibble 178 | Nibble 179 | Nibble 180 | Nibble 181 | Nibble 182 | Nibble 183 | Nibble 184 | Nibble 185 | Nibble 186 | Nibble 187 | Nibble 188 | Nibble 189 | Nibble 190 | Nibble 191 |
| 0x0000_0000_0000_0000 | | | | | | | | | | | | | | | |

| Byte 96 | | Byte 97 | | Byte 98 | | Byte 99 | | Byte 100 | | Byte 101 | | Byte 102 | | Byte 103 | |
|---|---|---|---|---|---|---|---|---|---|---|---|---|---|---|---|
| Nibble 192 | Nibble 193 | Nibble 194 | Nibble 195 | Nibble 196 | Nibble 197 | Nibble 198 | Nibble 199 | Nibble 200 | Nibble 201 | Nibble 202 | Nibble 203 | Nibble 204 | Nibble 205 | Nibble 206 | Nibble 207 |
| 0x0000_0000_0000_0000 | | | | | | | | | | | | | | | |

| Byte 104 | | Byte 105 | | Byte 106 | | Byte 107 | | Byte 108 | | Byte 109 | | Byte 110 | | Byte 111 | |
|---|---|---|---|---|---|---|---|---|---|---|---|---|---|---|---|
| Nibble 208 | Nibble 209 | Nibble 210 | Nibble 211 | Nibble 212 | Nibble 213 | Nibble 214 | Nibble 215 | Nibble 216 | Nibble 217 | Nibble 218 | Nibble 219 | Nibble 220 | Nibble 221 | Nibble 222 | Nibble 223 |
| 0x0000_0000_0000_0000 | | | | | | | | | | | | | | | |

| Byte 112 | | Byte 113 | | Byte 114 | | Byte 115 | | Byte 116 | | Byte 117 | | Byte 118 | | Byte 119 | |
|---|---|---|---|---|---|---|---|---|---|---|---|---|---|---|---|
| Nibble 224 | Nibble 225 | Nibble 226 | Nibble 227 | Nibble 228 | Nibble 229 | Nibble 230 | Nibble 231 | Nibble 232 | Nibble 233 | Nibble 234 | Nibble 235 | Nibble 236 | Nibble 237 | Nibble 238 | Nibble 239 |
| 0x0000_0000_0000_0000 | | | | | | | | | | | | | | | |

| Byte 120 | | Byte 121 | | Byte 122 | | Byte 123 | | Byte 124 | | Byte 125 | | Byte 126 | | Byte 127 | |
|---|---|---|---|---|---|---|---|---|---|---|---|---|---|---|---|
| Nibble 240 | Nibble 241 | Nibble 242 | Nibble 243 | Nibble 244 | Nibble 245 | Nibble 246 | Nibble 247 | Nibble 248 | Nibble 249 | Nibble 250 | Nibble 251 | Nibble 252 | Nibble 253 | Nibble 254 | Nibble 255 |
| 0x0000_0000_0000_0000 | | | | | | | | | | | | | | | |

FIGURE 26B

| 26A |
|---|
| 26B |

| Byte 0 | | Byte 1 | | Byte 2 | | Byte 3 | | Byte 4 | | Byte 5 | | Byte 6 | | Byte 7 | |
|---|---|---|---|---|---|---|---|---|---|---|---|---|---|---|---|
| Nibble 0 | Nibble 1 | Nibble 2 | Nibble 3 | Nibble 4 | Nibble 5 | Nibble 6 | Nibble 7 | Nibble 8 | Nibble 9 | Nibble 10 | Nibble 11 | Nibble 12 | Nibble 13 | Nibble 14 | Nibble 15 |
| AFH | | | | | | | | | | | | | | | |
| 63:60 | 59:56 | 55:52 | 51:48 | 47:44 | 43:40 | 39:36 | 35:32 | 31:28 | 27:24 | 23:20 | 19:16 | 15:12 | 11:8 | 7:4 | 3:0 |

| Byte 8 | | Byte 9 | | Byte 10 | | Byte 11 | | Byte 12 | | Byte 13 | | Byte 14 | | Byte 15 | |
|---|---|---|---|---|---|---|---|---|---|---|---|---|---|---|---|
| Nibble 16 | Nibble 17 | Nibble 18 | Nibble 19 | Nibble 20 | Nibble 21 | Nibble 22 | Nibble 23 | Nibble 24 | Nibble 25 | Nibble 26 | Nibble 27 | Nibble 28 | Nibble 29 | Nibble 30 | Nibble 31 |
| MAC DA | | | | | | | | | | | | MAC SA | | | |
| 47:44 | 43:40 | 39:36 | 35:32 | 31:28 | 27:24 | 23:20 | 19:16 | 15:12 | 11:8 | 7:4 | 3:0 | 47:44 | 43:40 | 39:36 | 35:32 |

| Byte 16 | | Byte 17 | | Byte 18 | | Byte 19 | | Byte 20 | | Byte 21 | | Byte 22 | | Byte 23 | |
|---|---|---|---|---|---|---|---|---|---|---|---|---|---|---|---|
| Nibble 32 | Nibble 33 | Nibble 34 | Nibble 35 | Nibble 36 | Nibble 37 | Nibble 38 | Nibble 39 | Nibble 40 | Nibble 41 | Nibble 42 | Nibble 43 | Nibble 44 | Nibble 45 | Nibble 46 | Nibble 47 |
| MAC SA | | | | | | | | 802.1q HEADER | | | | | | | |
| 31:28 | 27:24 | 23:20 | 19:16 | 15:12 | 11:8 | 7:4 | 3:0 | 31:28 | 27:24 | 23:20 | 19:16 | 15:12 | 11:8 | 7:4 | 3:0 | and so on – thru to :

| Byte 120 | | Byte 121 | | Byte 122 | | Byte 123 | | Byte 124 | | Byte 125 | | Byte 126 | | Byte 127 | |
|---|---|---|---|---|---|---|---|---|---|---|---|---|---|---|---|
| Nibble 240 | Nibble 241 | Nibble 242 | Nibble 243 | Nibble 244 | Nibble 245 | Nibble 246 | Nibble 247 | Nibble 248 | Nibble 249 | Nibble 250 | Nibble 251 | Nibble 252 | Nibble 253 | Nibble 254 | Nibble 255 |
| PAYLOAD | | | | | | | | | | | | | | | |

FIGURE 27

| Bit | Function | Description |
|---|---|---|
| 6-0 | NEXT SCT HIT | Next SCT Hit. If the CAM search results in a match, the Rx Processor will jump to the location specified by NEXT SCT HIT*2 for the next packet processing operation. (all packet processor operations use a double pump of SCT – reading even and odd adjacent locations hence the *2). Over-ridden if the matching CAM Entry ARAM Data wants to supply the NEXT SCT field directly. |
| 13-7 | NEXT SCT MISS | Next SCT Miss. If the CAM search results in no match, the Rx Processor will jump to the location specified by NEXT SCT MISS*2 for the next packet processing operation. (all packet processor operations use a double pump of SCT – reading even and odd adjacent locations hence the *2). |
| 16-14 | EXCP SELECT | Exception Handler Select. 0 = L2, 1 = MPLS, 2 = IP v4, 3 = IP v6, 4 = IPX, 5-7 = reserved. |
| 19-17 | EXCP PTR SELECT | Exception Handler Context Pointer Select. Determines which context pointer is used for processing the Exceptions. |
| 21-20 | EXCP MASK SELECT | Exception Mask Select. Selects one of 4 masks for use in Exception processing. |
| 23-22 | QOS MAP | QoS Map Select. Selects one of 4 QoS Map policies. 0 = Vpri (.1p), 1= MPLS Exp (CoS), 2 = IP v4 Tos, 3 = IP v6 ToS (Traffic Class). |
| 27-24 | PTI PRIORITY | PTI Priority. Sets the PTI Priority for this processor cycle. |
| 31-28 | TXMI PRIORITY | TXMI Priority. Sets the TXMI Priority for this processor cycle. |
| 35-32 | EQOS PRIORITY | Egress QoS Priority. Sets the ARAM EQOS Priority for this processor cycle. |
| 39-36 | IQOS PRIORITY | Ingress QoS Priority. Sets the ARAM IQOS Priority for this processor cycle. |
| 43-40 | CQOS PRIORITY | CPU QoS Priority. Sets the ARAM CQOS Priority for this processor cycle. |
| 47-44 | EMRK PRIORITY | Egress Mark Priority. Sets the ARAM Egress Mark Priority for this processor cycle. |
| 55-48 | STAT0 MASK | Stat0 Mask. Mask for use with Statistics Matrix 0 when using matrix-based statistics. |
| 59-56 | STAT0 SHIFT | Stat0 Shift. Shift for use with Statistics Matrix 0 when using matrix-based statistics. |
| 67-60 | STAT1 MASK | Stat1 Mask. Mask for use with Statistics Matrix 1 when using matrix-based statistics. |
| 71-68 | STAT1 SHIFT | Stat1 Shift. Shift for use with Statistics Matrix 1 when using matrix-based statistics. |
| 72 | LEARN OP | Learn Operation. Perform Learn processing functions (PTI port compare and setting of AF_Learn Flag) as part of this processor cycle. |
| 73 | ROUTE OP | Route Operation. Set the Unicast Route Flag as part of this processor cycle. |
| 74 | REDIRECT OP | Redirect Operation. Perform Redirect processing function (Ingress Egress VLAN ID Compare and setting of AF_Redirect Flag) as part of this processor cycle. |
| 75 | DON'T FRAG OP | Don't Fragment Operation. Perform Don't Fragment processing functions (setting of AF_Don't_Frag Flag) as part of this processor cycle. |
| 76 | JUMBO OP | Jumbo Operation. Perform Jumbo processing functions (setting of AF_Jumbo Flag) as part of this processor cycle. |
| 77 | VPST IGNORE | VPST Ignore. Ignore returned VPST data for this processor cycle. |
| 78 | AFH VPST IGNORE | AFH VPST Ignore. Ignore supplied AFH VPST data for this processor cycle. AFH VPST Ignore is only applicable to Mariner mode. It is not used in Constellation mode. |
| 79 | LAI CTRL | Link Aggregation Index Control. If clear, XOR the working LA Index with this cycle's LA Index to form new LA Index. If set, replace the working LA Index with this cycle's LA Index. |
| 80 | EXCP ALLOW GRE | Exception Allow GRE. Enable GRE exceptions for this processor cycle. |
| 81 | EXCP ALLOW PIM | Exception Allow PIM. Enable PIM exceptions for this processor cycle. |
| 82 | AGE OP | If set, the ability for the current search cycle to perform a Packet Age Write operation into a matching CAM entry ARAM data is enabled. NOT implemented in device Revision 0. |
| 83 | QOS MAP OP | If set, enables QoS Mapping using the QoS Map tables selected by the QOS MAP field. |

FIGURE 28A

| 28A |
|---|
| 28B |
| 28C |

| | | |
|---|---|---|
| | | If not set, QoS Mapping is disabled and QOS MAP must be set to 0. NOT implemented in device Revision 0. |
| 95-84 | QOS MAP SEL NIBBLE 0 | QoS Map Data Select Nibble 0. |
| 107-96 | QOS MAP SEL NIBBLE 1 | QoS Map Data Select Nibble 1. |
| 119-108 | REDN TABLE 0 SEL NIBBLE 0 | Reduction Table 0 Data Select Nibble 0. |
| 131-120 | REDN TABLE 0 SEL NIBBLE 1 | Reduction Table 0 Data Select Nibble 1. |
| 143-132 | REDN TABLE 1 SEL NIBBLE 0 | Reduction Table 1 Data Select Nibble 0. |
| 155-144 | REDN TABLE 1 SEL NIBBLE 1 | Reduction Table 1 Data Select Nibble 1. |
| 167-156 | REDN TABLE 2 SEL NIBBLE 0 | Reduction Table 2 Data Select Nibble 0. |
| 179-168 | REDN TABLE 2 SEL NIBBLE 1 | Reduction Table 2 Data Select Nibble 1. |
| 191-180 | REDN TABLE 3 SEL NIBBLE 0 | Reduction Table 3 Data Select Nibble 0. |
| 203-192 | REDN TABLE 3 SEL NIBBLE 1 | Reduction Table 3 Data Select Nibble 1. |
| 211-204 | KEY CONSTANT | Key Constant. A constant data field for inclusion in the Data Selection operations as part of Process Data. |
| 219-212 | KEY CID | Key CAM ID. An ID field for inclusion in the Data Selection operations as part of Process Data specifically for CAM Entry Typing. |
| 231-220 | CAM KEY SEL NIBBLE 0 | CAM Key Data Select Nibble 0. |
| 243-232 | CAM KEY SEL NIBBLE 1 | CAM Key Data Select Nibble 1. |
| 255-244 | CAM KEY SEL NIBBLE 2 | CAM Key Data Select Nibble 2. |
| 267-256 | CAM KEY SEL NIBBLE 3 | CAM Key Data Select Nibble 3. |
| 279-268 | CAM KEY SEL NIBBLE 4 | CAM Key Data Select Nibble 4. |
| 291-280 | CAM KEY SEL NIBBLE 5 | CAM Key Data Select Nibble 5. |
| 303-292 | CAM KEY SEL NIBBLE 6 | CAM Key Data Select Nibble 6. |
| 315-304 | CAM KEY SEL NIBBLE 7 | CAM Key Data Select Nibble 7. |
| 327-316 | CAM KEY SEL NIBBLE 8 | CAM Key Data Select Nibble 8. |
| 339-328 | CAM KEY SEL NIBBLE 9 | CAM Key Data Select Nibble 9. |
| 351-340 | CAM KEY SEL NIBBLE 10 | CAM Key Data Select Nibble 10. |
| 363-352 | CAM KEY SEL NIBBLE 11 | CAM Key Data Select Nibble 11. |
| 375-364 | CAM KEY SEL NIBBLE 12 | CAM Key Data Select Nibble 12. |

FIGURE 28B

| 387-376 | CAM KEY SEL NIBBLE 13 | CAM Key Data Select Nibble 13. |
|---|---|---|
| 399-388 | CAM KEY SEL NIBBLE 14 | CAM Key Data Select Nibble 14. |
| 411-400 | CAM KEY SEL NIBBLE 15 | CAM Key Data Select Nibble 15. |
| 423-412 | CAM KEY SEL NIBBLE 16 | CAM Key Data Select Nibble 16. |
| 435-424 | CAM KEY SEL NIBBLE 17 | CAM Key Data Select Nibble 17.Error! Reference source not found.). |
| 451-436 | CAM CMD | CAM Command. Command issued to the CAM for this processor cycle. |
| 455-452 | CAM MISC | CAM Misc. Miscellaneous Control signals issued to the CAM for this processor cycle. |
| 473-456 | LA MASK | LA Index Mask. 1 bit per Nibble of CAM Key. If set, allows Nibble to be included in XOR calculation of LA Index based on CAM Key. If clear, corresponding Nibble of CAM key is ignored for LA Index calculation. |
| 509-474 | LA GROUP | LA Index Group. 2 bits per Nibble of CAM Key. Determines which LA Index group a CAM key nibble belongs to. Only to be used when processing parallel MPLS labels to control which LA Hash function each portion of the multi-label key belongs to. This is then selected by the MPLS select field from the ARAM entry as the actual LA Index value. |
| 511-510 | - | Reserved. |

FIGURE 28C

| Bit | Function | Description |
|---|---|---|
| 0 | NIBBLE SELECT | Selects which Nibble in the selected byte is being referenced.<br>0 = bits 7-4 of selected byte.<br>1 = bits 3-0 of selected byte. |
| 7-1 | BYTE SELECT | Selects which byte of the selected data segment (packet or process data) is being referenced.<br>Supports byte selection from 0 to 127. |
| 8 | PROCESS/PACKET DATA SELECT | Selects which data segment is being referenced.<br>0 = packet data.<br>1 = process data. |
| 11-9 | CONTEXT SELECT | Selects which context is to be used for the data reference. WHEN REFERENCING PROCESS DATA THIS FIELD MUST BE 0. Context select has relevance only for packet data references.<br>0 = Context 0 – raw.<br>1 = Context 1 - MAC Header Start.<br>2 = Context 2 - Encapsulation/EtherType Start.<br>3 = Context 3 - MPLS Start.<br>4 = Context 4 - L3 Outer Start.<br>5 = Context 5 - L3 Inner Start.<br>6 = Context 6 - L4 Start.<br>7 = reserved. |

FIGURE 30

| CAM Table Entry Data |||||||||||||||||||
|---|---|---|---|---|---|---|---|---|---|---|---|---|---|---|---|---|---|---|
| 71:68 | 67:64 | 63:60 | 59:56 | 55:52 | 51:48 | 47:44 | 43:40 | 39:36 | 35:32 | 31:28 | 27:24 | 23:20 | 19:16 | 15:12 | 11:8 | 7:4 | 3:0 |

L2 Entry

| CID | | | VLAN ID | | MAC Address | | | | |
|---|---|---|---|---|---|---|---|---|---|

IP v4 Unicast Destination

| CID | RID | RID | | | | | | IP v4 Destination Address | |
|---|---|---|---|---|---|---|---|---|---|

IP v4 Multicast / Flow

| CID | RID | RID | Frag | Prot | TCP | Destination Port | | IP v4 Destination Address | |
|---|---|---|---|---|---|---|---|---|---|
| CID | Port | | VLAN ID | | | Source Port | | IP v4 Source Address | |

MPLS - 2-way Parallel Lookup

| CID | RID | RID | VLAN ID | | Port | | Label | | Label |
|---|---|---|---|---|---|---|---|---|---|

MPLS - 4-way Parallel Lookup

| CID | RID | RID | VLAN ID | | Port | | Label | | Label |
|---|---|---|---|---|---|---|---|---|---|
| | | | | | | | Label | | Label |

IP v6 Destination

| CID | RID | | | | IP Destination Address [127:64] | | | | |
|---|---|---|---|---|---|---|---|---|---|
| | RID | | | | IP Destination Address [63:0] | | | | |

IP v6 Multicast / Flow Phase 1

| CID | 4'h0 | | | | IP Source Address [127:64] | | | | |
|---|---|---|---|---|---|---|---|---|---|
| | | | VLAN ID | | Port | | | | Flow Group 1 |

IP v6 Multicast / Flow Phase 2 using v6 Flow Label

| CID | 4'h1 | | | | IP Source Address [63:0] | | | | |
|---|---|---|---|---|---|---|---|---|---|
| | | | Frag | Prot | TCP | | | v6 Flow Label | Flow Group 2 |

IP v6 Multicast / Flow Phase 2 using Protocol Ports

| CID | 4'h2 | | | | IP Source Address [63:0] | | | | |
|---|---|---|---|---|---|---|---|---|---|
| | | | Frag | Prot | TCP | Destination Port | | Source Port | Flow Group 2 |

FIGURE 31

| Bit | Function | Description |
|---|---|---|
| 15-0 | PTI | Port Tag Index. |
| 35-16 | TXMI | Transmit Modification Index. |
| 39-36 | EQOS | Egress Queue Select. |
| 51-40 | IQOS | Ingress Queue Select. |
| 58-52 | CQOS | CPU Queue Select. |
| 59 | COUNT | Count Entry. When set, the Statistics Processor will count hits on the associated CAM entry. |
| 60 | PTI VALID | PTI field is valid. If not set, PTI field in this entry is ignored. If set, PTI field is used to update AFH PTI field using priority resolution. |
| 61 | TXMI VALID | TXMI field is valid. If not set, TXMI field in this entry is ignored. If set, TXMI field is used to update AFH TXMI field using priority resolution. |
| 62 | EQOS VALID | EQOS field is valid. If not set, EQOS field in this entry is ignored. If set, EQOS field is used to update AFH EQOS field using priority resolution. This bit is ignored if Special EQOS encode mode is enabled. |
| 63 | IQOS VALID | IQOS field is valid. If not set, IQOS field in this entry is ignored. If set, IQOS field is used to update AFH IQOS field using priority resolution. This bit is ignored if Special IQOS encode mode is enabled. |
| 64 | CQOS VALID | CQOS field is valid. If not set, CQOS field in this entry is ignored. If set, CQOS field is used to update AFH CQOS field using priority resolution. |
| 65 | LAI VALID | LAI field is valid. If not set, LAI field in this entry is ignored. If set, the LAI field is used to directly set the LAI Index exported in AFH. |
| 66 | ECMP | If direct ECMP mode is active AND this bit is set, perform ECMP modification on PTI field in this entry, Else leave PTI field as is. |
| 67 | RED | Random Early Drop. Sets the AFH RED Flag if set. |
| 70-68 | SSAMPLE | Statistical Sample Bin. If non-zero, dictates that a Statistical Sample operation should be performed on the packet being processed. Selects one of 7 bins for the sampling operation. |
| 71 | PAR LO | Low Parity Bit. Set so that there is odd parity across bits 71:0 of the entry data. |
| 78-72 | NEXT SCT | Next SCT Address |
| 79 | NEXT SCT VALID | Next SCT field is valid. If set, the Rx Processor will jump to the location specified by NEXT SCT*2 for the next packet processing operation. (all packet processor operations use a double pump of SCT – reading even and odd adjacent locations hence the *2). |
| 91-80 | VLAN ID | VLAN ID. Used for redirect detection and VLAN ID replacement. |
| 103-92 | NEXT DATA | NEXT Data. General purpose data field allowing data from this lookup match to be used as part of the CAM key in the next lookup for this packet processing sequence (is only available for the lookup immediately after the current one). |
| 107-104 | CONT UPDATE | Context Update Select. If non-zero, selects one of 15 available context update registers for the packet processing operation. |
| 108 | EMIRROR | Egress Mirror. When set, requests an Egress Mirror copy of the packet. |
| 109 | IMIRROR | Ingress Mirror. When set, requests an Ingress Mirror copy of the packet. |
| 111-110 | MPLS | MPLS Select. Determines which label in parallel processing should be deemed the active label. i.e. all QoS and Exception processing is done based on that label. |
| 114-112 | EMRK SEL | Egress Mark Select. Selects one of 8 Egress Mark operations. |
| 117-115 | EMRK MASK | Egress Mark Mask. Selects one of 8 Egress Mark Masks. |
| 121-118 | LAI | LAI Index. Allows direct CAM entry sourcing of LAI Index field in AFH. |
| 129-122 | STAT0 INDEX | Stat0 Index. Index for use with Statistics Matrix 0 when using matrix-based statistics. |
| 137-130 | STAT1 INDEX | Stat1 Index. Index for use with Statistics Matrix 1 when using matrix-based statistics. |
| 138 | REPLACE VLAN | Replace VLAN. When set, the working VLAN ID associated with this packet is replaced with that specified by the VLAN ID field in this entry (Vpri and Vtr bits are set to zero). |

FIGURE 32A

| 139 | VPST IGNORE | VPST IGNORE. Ignore the VPST.Forward and Learn Flags when processing this packet lookup operation. |
| 140 | AGE | Age Flag. Packet Age Writes operations will set this bit, Host Age Read-Modify-Write operations will clear it. (NOT implemented in device Revision 0). |
| 142-141 | - | Reserved. |
| 143 | PAR HI | High Parity Bit. Set so that there is odd parity across bits 143:72 of the entry data. |

SYSTEM FOR ACCESSING CONTENT-ADDRESSABLE MEMORY IN PACKET PROCESSOR

This application claims the benefit of U.S. Provisional Application Ser. No. 60/558,039, filed Mar. 30, 2004, which is hereby fully incorporated herein by reference as though set forth in full.

FIELD OF THE INVENTION

This invention relates to the field of packet processing, and more specifically, to accessing a content-addressable memory in packet processing system.

RELATED ART

Current packet processors are under increasing pressure to handle higher and higher data throughputs of, e.g., 10 GB/s or more, and more complex and diverse data packet formats, e.g., embedded packet formats. However, these processors are subject to various bottlenecks and constraints that limit the data throughput that is achievable and the packet formats that can be handled. Hence, there is a need for a packet processor that overcomes the problems of the prior art.

SUMMARY OF THE INVENTION

In a first aspect, the invention provides a system for accessing a content-addressable memory in a packet processing system. The memory has a plurality of locations, each associated with a value of a key and a content value.

The system has a register for holding a data element having a key field, and logic for deriving a value of the key responsive to 1) packet processing state data relating to one or more packets undergoing processing by the packet processing system, and 2) the value of the key field of the data element. This logic is also configured to present the derived value of the key to the memory.

In response, the memory is configured to search for a location associated with the value of the key presented to it by the logic. If such a location is found, the memory is configured to output the content value associated with the location. If such a location is not found, the memory is configured to output a signal indicative of a miss condition.

In one embodiment, the packet processing state data has a size, and the logic is configured to reduce the size of at least a portion of the packet processing state data to form modified state data. In this embodiment, the logic is configured to derive a value of the key for presenting to the content-addressable memory from the modified state information and the value of the key field.

In a second aspect, the invention provides a system for flexibly controlling bandwidth of a pipelined packet processing system. This system has at least one packet processor configured to 1) process in parallel a plurality of packets through at least one pipeline having a plurality slots for placement of packet data, and 2) perform one or more processing sets, wherein, during each of the one or more processing sets, a first predetermined but programmable number of processing operations is performed on each of one or more of the packets having data stored in the slots of the pipeline.

In addition, the system has at least one host processor configured to direct the at least one packet processor to perform one or more host-related processing operations upon or after the completion of a second predetermined but programmable number of processing sets.

The system also has at least one interface through which a user can specify the first and second predetermined but programmable numbers. Through suitable setting of these first and second numbers, the bandwidth of the packet processing system can be flexibly controlled.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2 illustrates an example of the format of a packet header as produced by an embodiment of a packet classification system in a packet processing system.

FIG. 3 is a block diagram of an embodiment of a receive-side packet classification system.

FIG. 22 illustrates an example of the control portion of state data maintained in one embodiment of the processing pipeline for a packet.

FIG. 23 illustrates an example of the AFH portion of state data maintained in one embodiment of the processing pipeline for a packet.

FIG. 24 illustrates an example of the statistics portion of state data maintained in one embodiment of the processing pipeline for a packet.

FIG. 25 illustrates an example of the consolidated state data maintained in one embodiment of the processing pipeline for a packet.

FIGS. 26A-26B illustrate an example of the format of the state data of FIG. 25 at the nibble level of detail.

FIG. 27 illustrates an example of the format of the first 128 bytes of packet data at the nibble level of detail.

FIGS. 28A-28C illustrate an implementation example the format of a SCT entry.

FIG. 30 illustrates one embodiment of SCT-supplied selection data used in the data path logic of FIG. 29.

FIG. 31 illustrates several examples of CAM key formats.

FIGS. 32A-32B illustrates an implementation example of the format of an ARAM entry.

RELATED APPLICATIONS

Figure 1:
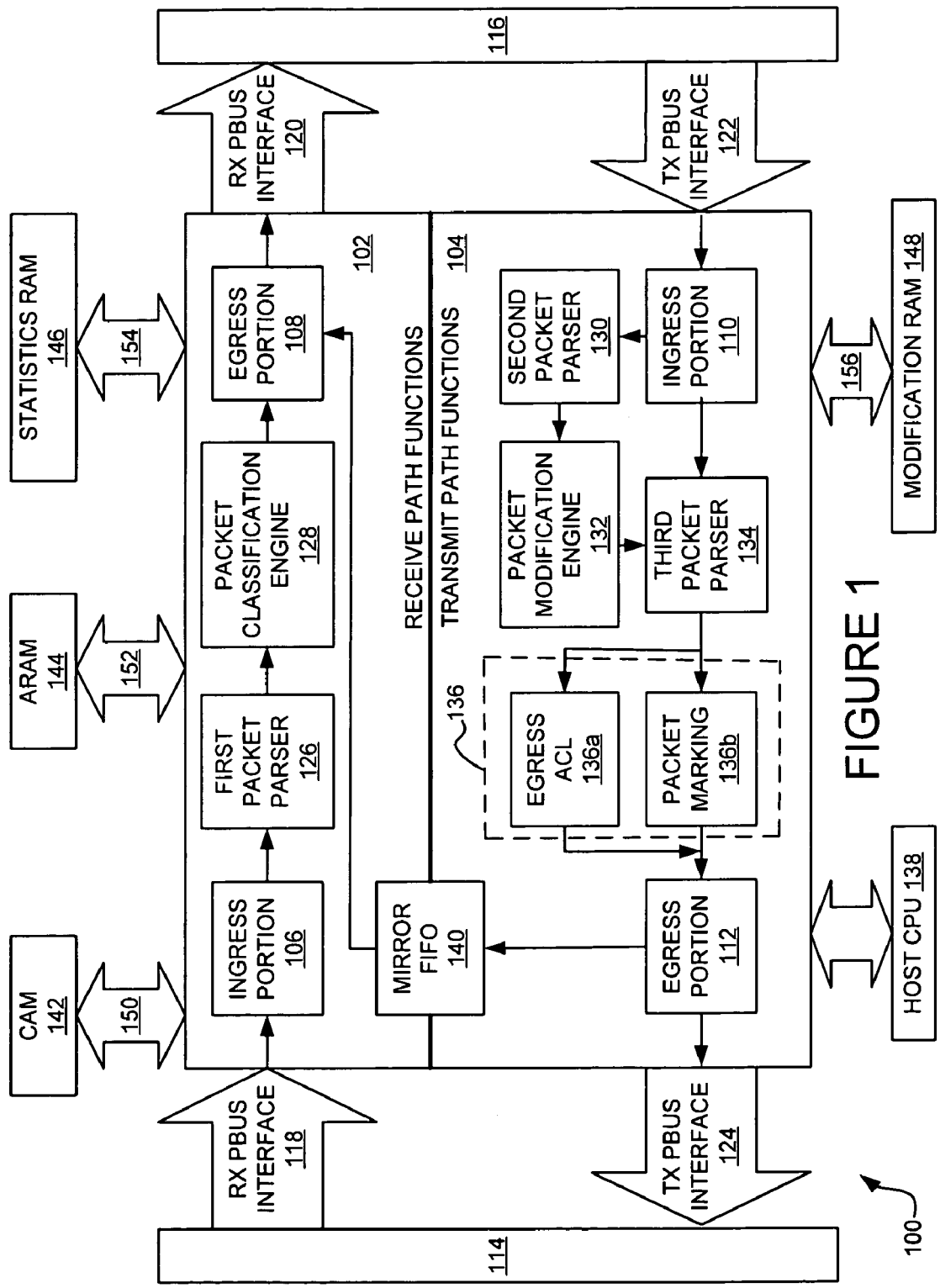
FIG. 1 is a block diagram of an embodiment of a packet processing system that comprises a receive-side packet classification system and a transmit-side packet modification system.

The following applications are commonly owned by the assignee hereof, are being filed on even date herewith, and are each incorporated by reference herein as though set forth in full:

| U.S. Pat. application Ser. No. | Title | Filing date |
| --- | --- | --- |
| 10/814,725 | PACKET PROCESSING SYSTEM ARCHITECTURE AND METHOD | Mar. 30, 2004 |
| 10/814,552 | PACKET PROCESSING SYSTEM ARCHITECTURE AND METHOD | Mar. 30, 2004 |
| 10/814,556 | PACKET DATA MODIFICATION PROCESSOR | Mar. 30, 2004 |
| 10/814,728 | SYSTEM AND METHOD FOR PACKET PROCESSOR STATUS MONITORING | Mar. 30, 2004 |
| 10/814,545 | METHOD AND SYSTEM FOR INCREMENTALLY UPDATING A CHECKSUM IN A NETWORK DATA PACKET | Mar. 30, 2004 |
| 10/814,729 | SYSTEM AND METHOD FOR EGRESS PACKET MARKING | Mar. 30, 2004 |
| 10/813,731 | SYSTEM AND METHOD FOR ASSEMBLING A DATA PACKET | Mar. 30, 2004 |
| 10/814,727 | PACKET DATA MODIFICATION PROCESSOR COMMAND INSTRUCTION SET | Mar. 30, 2004 |
| 10/814,774 | DATA STRUCTURES FOR SUPPORTING PACKET DATA | Mar. 30, 2004 |

-continued

| U.S. Pat. application Ser. No. | Title | Filing date |
|---|---|---|
| 10/835,532 | MODIFICATION OPERATIONS SYSTEM FOR DERIVING PACKET QUALITY OF SERVICE INDICATOR | Concurrently herewith |
| 10/835,272 | PACKET PARSER | Concurrently herewith |
| 10/835,598 | PIPELINED PACKET PROCESSOR | Concurrently herewith |
| 10/834,566 | SYSTEM FOR DERIVING HASH VALUES FOR PACKETS IN A PACKET PROCESSING SYSTEM | Concurrently herewith |
| 10/835,271 | SYSTEMS FOR SUPPORTING PACKET PROCESSING OPERATIONS | Concurrently herewith |
| 10/834,573 | SYSTEM FOR STATISTICS GATHERING AND SAMPLING IN A PACKET PROCESSING SYSTEM | Concurrently herewith |
| 10/835,252 | EXCEPTION HANDLING SYSTEM FOR PACKET PROCESSING SYSTEM | Concurrently herewith |

DETAILED DESCRIPTION

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the terms "software" or "instructions" or commands" include source code, assembly language code, binary code, firmware, macro-instructions, micro-instructions, or the like, or any combination of two or more of the foregoing.

The term "memory" refers to any processor-readable physical or logical medium, including but not limited to RAM, ROM, EPROM, PROM, EEPROM, disk, floppy disk, hard disk, CD-ROM, DVD, queue, FIFO or the like, or any combination of two or more of the foregoing, on which may be stored one or more instructions or commands executable by a processor, data, or packets in whole or in part.

The terms "processor" or "CPU" or "engine" refer to any device capable of executing one or more commands or instructions and includes, without limitation, a general- or special-purpose microprocessor, finite state machine, controller, computer, digital signal processor (DSP), or the like.

The term "logic" refers to implementations in hardware, software, or combinations of hardware and software.

The term "stack" may be implemented through a first-in-first-out memory such as a FIFO.

The term "packet" means (1) a group of binary digits including data and control elements which is switched and transmitted as a composite whole, wherein the data and control elements and possibly error control information are arranged in a specified format; (2) a block of information that is transmitted within a single transfer operation; (3) a collection of symbols that contains addressing information and possibly error detection or correction information; (4) a sequence of characters with a specific order and format, such as destination followed by a payload; (5) a grouping of data of some finite size that is transmitted as a unit; (6) a frame; (7) the logical organization of control and data fields defined for any of the layers or sub-layers of an applicable reference model, including the OSI or TCP/IP reference models, e.g., MAC sub-layer; or (8) a unit of transmission for any of the layers or sub-layers of an applicable reference model, including the OSI or TCP/IP reference models.

The term "layer two of the OSI reference model" includes the MAC sub-layer.

The term "port" or "channel" refers to any point of ingress or egress to or from a switch or other entity, including any port channel or sub-channel, or any channel or sub-channel of a bus coupled to the port.

The term "register" refers to any physical medium for holding a data element, including, but not limited to, a buffer, FIFO, or the like.

The term "packet processing state data" in relation to a packet refers to data representative of at least a portion of the packet, data representative of at least a portion of the state of processing of the packet, or both.

Example Environment

An example environment for the subject invention will now be described. Many others examples are possible, so nothing in this example should be taken as limiting.

A. Overall Packet Processing System

FIG. 1 illustrates an embodiment 100 of a packet processing system comprising a packet classification system 102 and a packet modification system 104. The packet classification system 102 has an ingress portion 106 and an egress portion 108. Similarly, the packet modification system 104 has an ingress portion 110 and an egress portion 112. The ingress portion 106 of the packet classification system 102 is coupled, through interface 118, to one or more network-side devices 114, and the egress portion 108 of the packet classification system 102 is coupled, through interface 120, to one or more switch-side devices 116. The ingress portion 110 of the packet modification system 104 is coupled, through interface 122, to the one or more switch-side devices 116, and the egress portion 124 of the packet modification system 104 is coupled, through interface 112, to the one or more network-side devices 114.

The packet classification system 102 comprises an ingress portion 106, a first packet parser 126 for parsing a packet and providing first data representative thereof, and a packet classification engine 128 for classifying the packet responsive to the first data. The packet modification system 104 comprises a second packet parser 130 for parsing the classified packet (after a round trip through the one or more switch-side devices 116) or a packet derived there-from and providing second data representative thereof, a packet modification engine 132 for modifying some or all of the packet responsive to the second data, a third packet parser 134 for parsing the modified packet and providing third data representative thereof, and a packet post-processor 136 for post-processing the modified packet responsive to the third data.

In one embodiment, the packet undergoing processing by the system has a plurality of encapsulated layers, and each of the first, second and third parsers 126, 130, 134 is configured to parse the packet by providing context pointers pointing to the start of one or more of the encapsulated layers. In a second embodiment, the packet undergoing processing by the system comprises a first packet forming the payload portion of a second packet, each of the first and second packets having a plurality of encapsulated layers, and each of the first, second and third parsers 126, 130, 134 is configured to parse the packet by providing context pointers pointing to the start of one or more of the encapsulated layers of the first packet and one or more of the encapsulated layers of the second packet.

In one implementation, the packet post-processor 136 is configured to compute a checksum for a modified packet responsive to the third data provided by parser 134. In one embodiment, the packet post-processor 136 is configured to independently calculate a layer three (IP) and layer four (TCP/UDP) checksum.

In one embodiment, packet post-processor 136 comprises Egress Access Control List (ACL) logic 136a and Packet Marking logic 136b. The Egress ACL logic 136a is configured to arrive at an ACL decision with respect to a packet. In one implementation, four ACL decisions can be independently performed: 1) default ACL action; 2) CPU copy; 3) mirror copy; and 4) kill. The default ACL action may be set to kill or allow. The CPU copy action forwards a copy of the packet to a host 138 coupled to the system. The mirror copy action implements an egress mirroring function (to be discussed in more detail later), in which a copy of the packet is forwarded to mirror FIFO 140 and then on to the egress portion 108 of the packet classification system 102. The kill action either kills the packet or marks it for killing by a downstream Medium Access Control (MAC) processor.

The Packet Marking logic 136b is configured to implement a packet egress marking function in which certain packet marking control information for a packet generated by the packet classification system 102 is used to selectively modify one or more quality of service (QoS) fields in the packet.

In one embodiment, Content Addressable Memory (CAM) 142 is used by the packet classification system 102 to perform packet searches to arrive at a classification decision for a packet. In one implementation, the CAM searches are ternary in that all entries of the CAM have a data and mask field allowing don't care setting of any bit position in the data field. In another implementation, the CAM searches are binary, or combinations of binary and ternary.

The associated RAM (ARAM) 144 provides associated data for each entry in the CAM 142. The ARAM 144 is accessed using the match address returned by the CAM 142 as a result of a search operation. The ARAM 144 entry data is used to supply intermediate classification information for the packet that is used by the classification engine 128 in making a final classification decision for the packet.

The statistics RAM 146 is used to maintain various packet statistics, including, for each CAM entry, the cumulative number and size of packets that hit or matched that entry.

The modification RAM 148 provides data and control structures for packet modification operations performed by the modification engine 132.

In one implementation, the interfaces 150, 152, 154, and 156 with any of the RAMs or CAMs may be a QDR- or DDR-type interface as described in U.S. patent application Ser. No. 10/655,742, filed Sep. 4, 2003, which is hereby fully incorporated by reference herein as though set forth in full.

FIG. 2 illustrates the format of classification data 200 for a packet as produced by one embodiment of packet classification system 102. The classification data 200 in this embodiment has first and second portions, identified respectively with numerals 202 and 204. The first portion 202 is a 64 bit Address Filtering Header (AFH) which is pre-pended to the packet. The second portion 204 is a 20 bit grouping of flags that are encoded as control bits maintained by the system ~100.

In one embodiment, the Port Tag Index (PTI) field is an identifier of the port or list of ports within interface 124 over which the packet will be sent by the packet modification engine. (The assumption in this embodiment is that the interface 124 is a multi-port interface).

The Egress Quality of Service (EQoS) field may be used to perform an egress queue selection function in a device encountering the packet. In one embodiment, this field also encodes one of the following functions: nothing, pre-emptive kill, normal kill, thermonuclear kill, egress mirror copy, pre-emptive intercept to host, and normal intercept to host.

The Link Aggregation Index (LAI) field may be used to implement physical link selection, ingress alias, echo kill alias, or equal cost multi-path functions in a device encountering the packet.

The JUMBO flag, if asserted, directs a device encountering the packet to perform a JUMBO-allowed check. In one embodiment, the flag is used to implement the policy that the only valid JUMBO packets are IP packets. Therefore, if the packet is a non-IP JUMBO packet, the device either sends it to a host, fragments it, or kills it.

The DON'T FRAG flag, if asserted, directs a device encountering the packet not to fragment it in the course of implementing a JUMBO-allowed check.

The IF TYPE flag indicates whether the ingress interface over which the packet was received is an Ethernet or Packet Over Sonet (POS) interface.

The ROUTE flag, if asserted, indicates that the packet is being bridged not routed, and may be used by devices encountering the packet to implement an echo kill suppress function.

The RANDOM EARLY DROP (RED) flag may be used to implement a random early drop function in devices encountering the packet.

The CTL flag indicates the format of the AFH. FIG. 2 illustrates the format of the header for packets exiting the packet classification system 102 and destined for the one or more switch-side devices 116. Another format applies for packets exiting the one or more switch-side devices 116 and destined for the packet modification system 104. The CTL flag indicates which of these two formats is applicable.

The Transmit Modification Index (TXMI) field is used by the modification engine 132 to retrieve control and data structures from Modification RAM 148 for use in performing any necessary modifications to the packet.

The CPU Quality of Service (CQoS) field may be used to perform an ingress queue select function in a host coupled to the packet processing system.

In one embodiment, the CPU Copy flag, if asserted, directs one or more of the switch-side devices 116 to forward a copy of the packet to a host coupled to the packet processing system. In another embodiment, the CPU Copy flag, if asserted, directs a copy of a packet to be forwarded to the host through a host bus or another PBUS.

The Redirect flag, if asserted, directs one or more of the switch-side devices 116 to forward a copy of the packet to the host for redirect processing. In redirect processing, the host receives the packet copy and redirects it to the sender, with an indication that the sender should switch the packet, not route it.

The Statistical Sample (SSAMPLE) flag, if asserted, indicates to one or more of the switch-side devices 116 that the packet is a candidate for statistical sampling. If the packet is ultimately selected for statistical sampling, a copy of the packet is directed to the host, which performs a statistical analysis of the packet for the purpose of accurately characterizing the network traffic of which the packet is a part.

The LEARN flag, if asserted, directs one or more of the switch-side devices 116 to forward a copy of the packet to the host so the host can perform learn processing. In learn processing, the host analyzes the packet to "learn" the sender's MAC address for future packet switching of packets to that address.

The Egress Mirror (EMIRROR) flag, if asserted, implements egress mirroring by directing one or more of the switch-side devices 116 to send a copy of the packet to mirror FIFO 140. From mirror FIFO 140, the packet passes through the egress portion 108 of the packet classification system 102 en route to the one or more switch-side devices 116.

The Ingress Quality of Service (IQoS) field may be used to perform an ingress queue selection function in a device encountering the packet.

The Egress Mark Select (EMRK SEL) field selects one of several possible egress mark functions. The Egress Mask (EMRK MASK) field selects one of several possible egress masks. Together, the EMRK SEL and EMRK MASK fields forms an embodiment of packet egress marking control information which may be used by packet marking logic 136b to mark the packet, i.e., selectively modify one or more QoS fields within the packet.

The Ingress Mirror (IMIRROR) flag, if asserted, directs one or more of the switch-side devices 116 to forward a copy of the packet to the designated ingress mirror port on the switch.

The Parity Error Kill (PERR KILL) flag, if asserted, directs the interface 120 to kill the packet due to detection of an ARAM parity error.

In one embodiment, the EMIRROR bit is normally in an unasserted state. If the packet classification system 102, after analyzing the packet, determines that egress mirroring of the packet is appropriate, the packet classification system 102 changes the state of the EMIRROR bit to place it in the asserted state.

The packet, along with a pre-pended AFH containing the EMIRROR bit, is then forwarded to the one or more switch-side devices 116. After processing the packet, the one or more devices transmit the packet, with the EMIRROR bit preserved in a pre-pended packet header, back to the packet modification system 104 over interface 122. In response, the packet modification system 104 is configured to detect the state of the EMIRROR bit to determine if egress mirroring of the modified packet is activated, and if so, provide a copy of the modified packet to the egress portion 108 of the packet classification system 102 through the mirror FIFO 140.

In one embodiment, the EQoS, CQoS, IQoS, EMRK SEL and EMRK MASK fields define a multi-dimensional quality of service indicator for the packet. In this embodiment, the EMRK SEL and EMRK MASK fields form packet egress marking control information that is utilized by packet modification system 104 to selectively modify one or more quality of service fields within the packet, or a packet derived therefrom.

The quality of service indicator for a packet may be derived from a plurality of candidate quality of service indicators derived from diverse sources. In one embodiment, a plurality of candidate quality of service indicators are derived for a packet, each with an assigned priority, and a configurable priority resolution scheme is utilized to select one of the plurality of quality of service indicators for assigning to the packet. In one embodiment, one or more of the candidate quality of service indicators, and associated priorities, are derived by mapping one or more fields of the packet into one or more candidate quality of service indicators for the packet and associated priorities. In a second embodiment, one or more searches are conducted to obtain one or more candidate quality of service indicators for the packet and associated priorities. In a third embodiment, a combination of these two approaches is utilized.

In one example, candidate quality of service indicators, and associated priorities, are derived from three sources. The first is a VLAN mapping scheme in which a VLAN from the packet is mapped into a candidate quality of service indicator and associated priority using a VLAN state table (VST). The VLAN from the packet may represent a subnet or traffic type, and the associated priority may vary based on the subnet or traffic type. The second is a CAM-based search that yields an associated ARAM entry that in turn yields a candidate quality of service indicator. A field of an entry in a Sequence Control Table (SCT) RAM, which provides the sequence of commands controlling the operation of one embodiment of the packet classification engine 102, provides the associated priority. The third is a QoS mapping scheme, which operates in one of three modes, as determined by a field in a SCT RAM entry.

In the first mode, the 0.1 p mapping mode, the VST provides the four QSEGment bits. The QSEG and the 0.1 p bits are mapped into a candidate quality of service indicator, and the VLAN itself is mapped into an associated priority using the VST. In the second mode, the MPLS mapping mode, the EXP/QOS fields from the packet are mapped into a candidate quality of service indicator, and a VLAN from the packet is mapped into the associated priority using the VST. In the third mode, the ToS mapping mode, the IPv4 ToS, IPv6 Traffic Class, or Ipv6 Flow Label based QoS fields are mapped into a candidate quality of service indicator, and a VLAN from the packet is mapped into an associated priority using the VST.

In this example, the candidate quality of service indicator with the highest priority is assigned to the packet. Moreover, a candidate from one of the sources can be established as the default, which may be overridden by a candidate obtained from one of the other sources, at least a candidate that has a higher priority than the default selection. For example, the candidate quality of service indicator resulting from the 0.1 p mapping mode can be established as the default selection, and this default overridden only by a candidate quality of service indicator resulting from an ARAM entry in turn resulting from a CAM-based search.

FIG. 3 illustrates an embodiment 300 of a packet classification system. In this embodiment, the packet classification system is coupled to one or more network-side devices through a multi-port packet bus (PBUS) 302, as described in U.S. patent application Ser. Nos. 10/405,960 and 10/405,961, filed Apr. 1, 2003, which are both hereby fully incorporated herein by reference. PBUS ingress logic 304 is configured to detect a start of packet (SOP) condition for packets arriving at the packet classification system over the PBUS.

Upon or after detection of the SOP condition, the packet, or a portion thereof, is stored in slicer 306. Slicer 306 is configured to slice some or all of a packet into portions and provide the portions in parallel over first data path 308 having a first width to classification engine 310. In one embodiment, the slicer 306 is a FIFO which stores the first 128 bytes of a packet (or the entirety of the packet if less than 128 bytes), and provides the 1024 bits thereof in parallel to the packet classification engine 310 over the first data path 308.

Upon or after detection of the SOP condition, parser 312 parses the packet in the manner described previously, and stores the resultant context pointers (and other flags resulting from the parsing process) in parser result RAM 314. Concurrently with this parsing process, the packet is stored in buffer 318, which in one embodiment, is a FIFO buffer.

The packet classification engine 310 is configured to classify the packet responsive to the packet portions received over the first data path 308 and the parser results as stored in the parser result RAM 314, and store data representative of the packet classification in classification RAM 316. In one embodiment, the classification data is the AF header illustrated in FIG. 2.

An associator 320 is configured to associate the data representative of the packet classification with some or all of the packet, and provide the associated packet over a second data path 322 having a second width less than the first width.

The packet classification system is coupled to one or more switch-side devices over a multi-port PBUS 326, and PBUS egress logic 324 is configured to transmit the associated packet over the PBUS 326.

In one embodiment, slicer 306 comprises a plurality of memories configured to store some or all of the packet, and provide the portions thereof in parallel over the first data path 308 to the classification engine 310. In one example, the slicer 306 is configured as eight (8) memories configured to provide the first 1024 bits of the bits of the packet (or less if the packet is less than 128 bytes) in parallel over the first data path 308 to classification engine 310.

In one embodiment, the associator 320 comprises a multiplexor configured to multiplex onto the second data path 322 the data representative of the packet classification as stored in classification RAM 316 and some or all of the packet as stored in buffer 318. In one implementation, the multiplexor multiplexes the first 8 byte portion 202 of the AF data illustrated in FIG. 2 (which may be referred to as the AF header) onto the second data path followed by the packet as stored in buffer 318, thereby effectively pre-pending the AF header to the packet. In this implementation, control logic 328 controls the operation of the multiplexor through one or more signals provided over control data path 334.

More specifically, the multiplexor in this implementation is configured to select one of three inputs and output the selected input to the second data path 322 under the control of the control logic 328. The first input is the classification data as stored in classification RAM 316. The second input is the packet as stored in buffer 318. The third input is the output of the mirror FIFO 140. This third input is selected when the egress mirroring function, discussed previously, is activated.

In one embodiment, the control logic 328 is also configured to maintain first and second FIFO buffers, identified respectively with numerals 330 and 332, the first FIFO buffer 330 for identifying those packets which are awaiting classification by the packet classification system, and the second FIFO buffer 332 for identifying those packets which are undergoing classification by the classification system.

In this embodiment, the control logic 328 is configured to place an identifier of a packet on the first FIFO buffer 330 upon or after receipt of the packet by the packet classification system, pop the identifier off the first FIFO buffer 330 and place it on the second FIFO buffer 332 upon or after initiation of classification processing of the packet by the packet classification system, and pop the identifier off the second FIFO buffer 332 upon or after completion of classification processing of the packet by the packet classification system.

The control logic 328 is configured to prevent the packet classification system from outputting a packet onto PBUS 326 while an identifier of the same is placed on either the first or second FIFO buffers 330, 332, and allows the packet classification system to output the packet onto PBUS 326 upon or after the identifier of the packet has been popped off the second FIFO buffer 332. In one implementation, the control logic 328 prevents the associator 320 from outputting data on the second data path 322 through one or more signals provided over control data path 334. In one implementation, the control logic 328 is a state machine.

In one embodiment, the control logic 328 forms the basis of a packet statistics maintaining system within the packet classification system. In this embodiment, the control logic 328 is configured to maintain a pool of packet size determiners, and allocate a packet size determiner to a packet from the pool upon or after receipt thereof by the packet classification system.

In one implementation, the control logic 328 allocates a packet size determiner to a packet upon or after the PBUS ingress logic 304 signals a SOP condition for the packet. The packet size determiner is configured to determine the size of the packet, and the control logic 328 is configured to return the packet size determiner to the pool upon or after the same has determined the size of the packet. In one implementation example, the packet size determiners are counters.

Statistics RAM 330 in this embodiment maintains packet statistics, and statistics update logic 336 is configured to update the packet statistics responsive to the determined size of the packet. In one implementation, the statistics update logic 336 includes a queue for queuing statistics update requests issued by the control logic 328.

In one configuration, the packet statistics maintaining system is configured to maintain packet statistics indicating the cumulative size of packets which have met specified processing conditions or hits, and the statistics update logic 336, upon or after a packet size determiner has determined the size of a packet, is configured to increment a cumulative size statistic for a particular processing condition or hit by the determined size of the packet if the packet satisfies that particular processing condition or hit. In one example, the system maintains statistics indicating the cumulative size and number of packets that have resulted in each of a plurality of ternary CAM 142 hits.

Figure 4A:
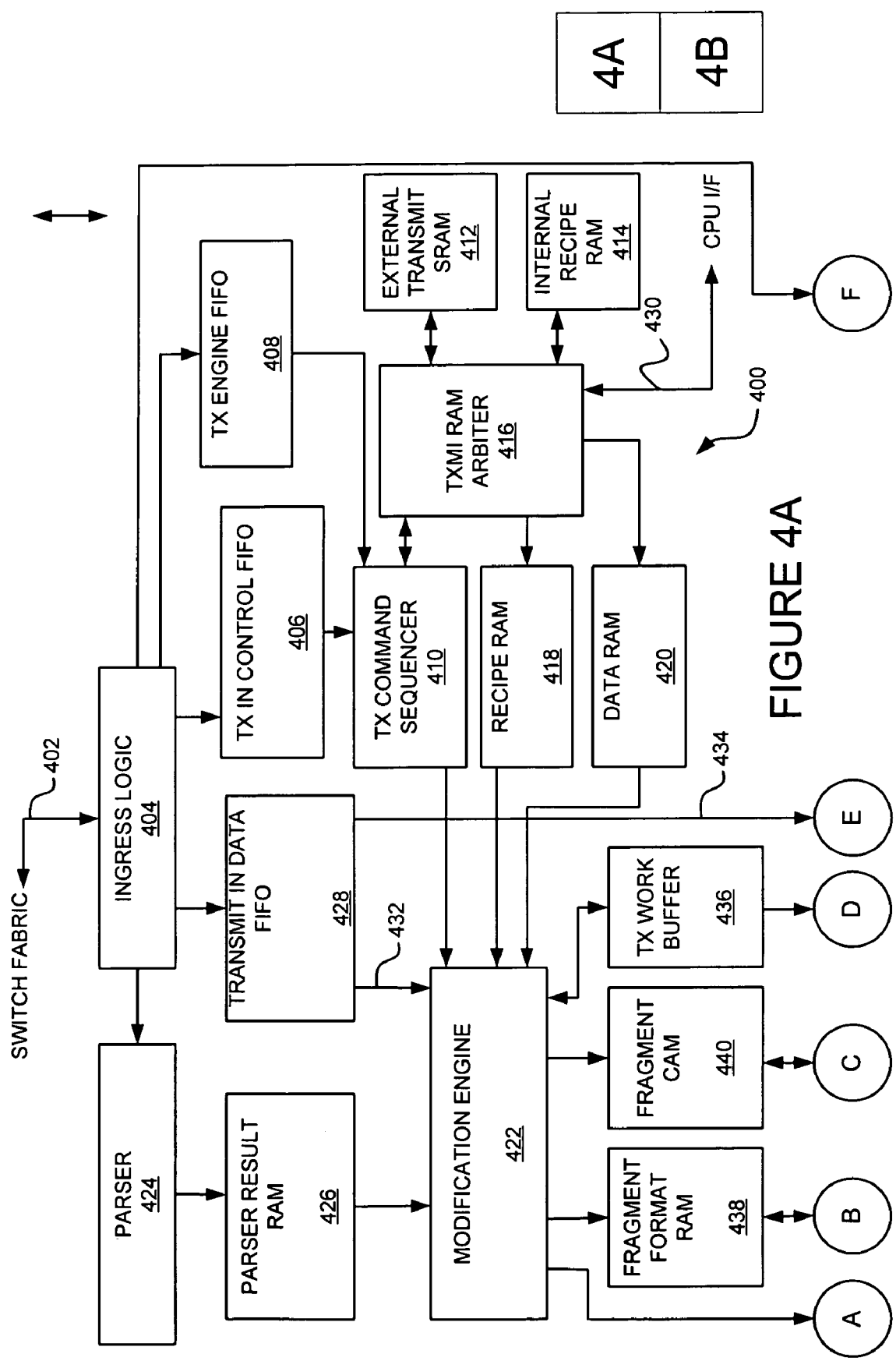
FIGS. 4A-4B are a block diagram of an embodiment of a transmit-side packet modification system.
Figure 4B:
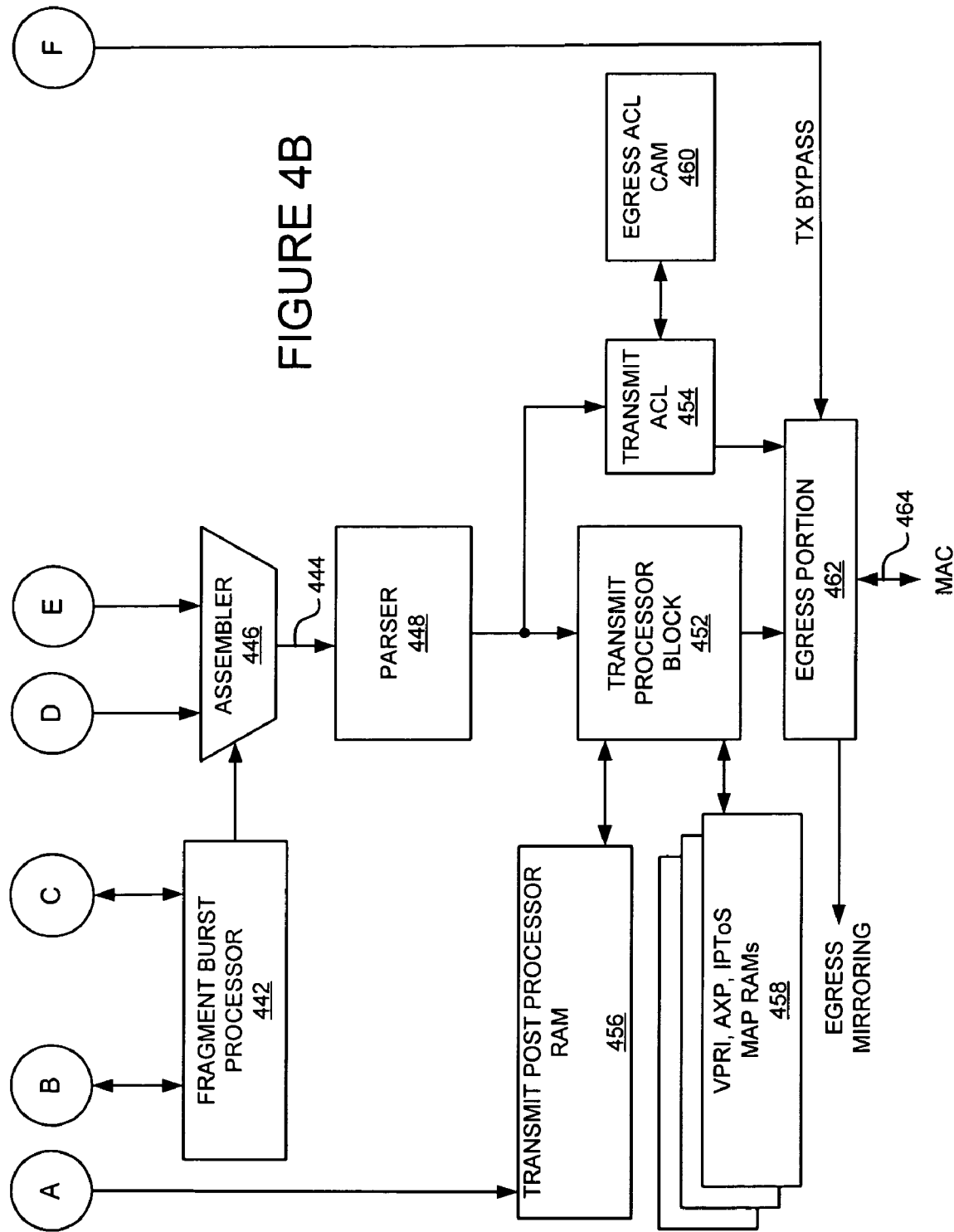

FIGS. 4A-4B illustrate an embodiment 400 of a packet modification system having PBUS ingress logic 404 that is coupled to one or more switch-side devices through PBUS 402. In this embodiment, the packets are received over the PBUS channels in bursts. The PBUS ingress logic 404 is configured to monitor the PBUS channels in a round robin fashion. When the PBUS ingress logic 404 detects a SOP condition on one of the channels, the Transmit Modification Index (TXMI) is extracted from the AF header of the packet, and it, along with the length of the initial packet burst, and an end of packet (EOP) marker if the packet length is less than or equal to the burst length, is placed on Transmit In Control FIFO 406. The packet or packet burst is stored in Transmit In Data FIFO 428, and a pointer to the start of the packet or packet burst (SOP pointer) is stored in Transmit Engine FIFO 408, along with an identifier of the PBUS channel over which the packet or packet burst was received. In one implementation, the packet bursts are 128 bytes in length.

Transmit In Data FIFO 428 stores the packet data such that portions of the packet can be passed in parallel over a first data path 402 having a first width to a modification engine 422. In one implementation, the Transmit In Data FIFO 428 comprises a plurality of FIFOs, with the outputs of the FIFOs coupled in parallel to the modification engine 422 and collectively forming the first data path 402. Incoming packet or packet bursts are copied into each of the plurality of FIFOs, thereby providing the modification engine with sliced portions of the packets or packet bursts in parallel.

The incoming packets or packet bursts are also input to the second packet parser 424, which parses the packets or packet bursts in the manner described previously. The context pointers and status bits resulting from the parsing process are stored in parser result RAM 426.

The Transmit Command Sequencer 410 is configured to read a SOP pointer and channel from the Transmit Engine FIFO 408, and utilize this information to locate the packet or packet bursts in the Transmit In Control FIFO 406. The Transmit Modification Index (TXMI) within the AF header of this packet or packet burst is then located and used to access a TXMI link in External Transmit SRAM 412, an SRAM located off-chip in relation to modification engine 422. The TXMI link may either be 1) an internal recipe link to a recipe of modification commands stored in Internal Recipe RAM 414, an on-chip RAM in relation to modification engine 422, and related data structures stored in External Transmit SRAM 412, or 2) an external recipe link to a recipe of modification commands stored in External Transmit SRAM 412 and related data structures also stored in External Transmit SRAM 412.

The sequencer 410 also assigns a sequence number to the packet to prevent packet re-ordering. It then directs the Transmit RAM arbiter 416 to read the recipe of modification commands stored in the External Transmit SRAM 412 (assuming the TXMI link is an external recipe link) or Internal Recipe RAM 414 (assuming the TXMI link is an internal recipe link) and store the same in Recipe RAM 418, an on-chip RAM in relation to modification engine 422. It further directs the arbiter 416 to read the data structures associated with the specified internal or external recipe command sequence, and store the same in Data RAM 420, another on-chip RAM in relation to modification engine 422.

The sequencer 410 then awaits an available slot in the pipeline of the modification engine 422. When such is available, the sequencer 410 passes to the engine 422 for placement in the slot a pointer to the recipe as stored in Recipe RAM 418 and other related information.

The sequencer 410 assigns a fragment buffer to the packet. The fragment buffer is a buffer within a plurality of fragment buffers which collectively may be referred to as TX work buffer 436. The modification engine then executes the recipe for the packet or packet burst, through one or more passes through the modification engine pipeline. In one embodiment, the recipe comprises one or more entries, and one or more passes through the pipeline are performed to execute each entry of the recipe.

In the process of executing the recipe, the modification engine 422 stores the modified fragments of the packet in the fragment buffer allocated to the packet in TX work buffer 436. At the same time, the modification engine 422 stores, in ascending order in fragment format RAM 438, pointers to the modified fragments of the packet as stored in the fragment buffer and pointers to the unmodified fragments of the packet as stored in Transmit In Data FIFO 428.

When all the recipe entries have been executed, the modification engine 422 writes an entry to the fragment CAM 440, the entry comprising the PBUS channel over which the packet was received, the sequence number for the packet, the SOP pointer to the packet (as stored in the Transmit In Data FIFO 428), a packet to be filled flag, a packet offset in the Transmit In Data FIFO 428, and the total length of the list of fragments as stored in the fragment format RAM 438. This completes the processing of the packet by the modification engine 422.

Fragment/burst processor 442 assembles the packets for ultimate egress from the system. To prevent packet re-ordering, the fragment/burst processor 442 processes, for each PBUS channel, the packets in the order in which they were received by the modification system 400. More specifically, the fragment/burst processor 442 maintains an expected next sequence number for each PBUS channel, and then performs, in round robin fashion, CAM searches in fragment CAM 440 for an entry bearing the expected next sequence number for the channel. If an entry is found with that sequence number, the fragment/burst processor 442 processes it. If such an entry is not found, the fragment/burst processor 442 takes no action with respect to the channel at that time, and proceeds to process the next channel.

When a fragment CAM entry with the expected next sequence number is located, the fragment/burst processor 442 directs assembler 446 to assemble the packet responsive to the fragment list for the packet as stored in the fragment format RAM 438. In one embodiment, the assembler 446 is a multiplexor, which is directed to multiplex between outputting on second data path 444, responsive to the fragment list, the modified packet fragments as stored in the TX work buffer 436 and the unmodified packet fragments as stored in the Transmit In Data FIFO 428 (as provided to the multiplexor 446 over data path 434). Through this process, the packet is assembled in ascending order on second data path 444. In one embodiment, the second data path 444 has a width less than the width of the first data path 402. In one implementation, the fragment/burst processor 442 outputs the packets over data path 444 in the form of bursts.

The assembled packet is parsed by the third packet parser 448 in the manner described previously. The resultant context pointers and status flags are then passed, along with the packet, for concurrent processing by Transmit Processor Block 452 and Transmit ACL Logic 454:

The Transmit Processor Block 452 performs two main functions. First, it performs egress mark processing by selectively modifying one or more QoS fields in the packet responsive to the egress mark control information from the packet stored by the modification engine in Transmit Post Processor RAM 456. In one example, any of the VLAN VPRI, MPLS EXP, and IPv4/IPv6 TOS fields may be modified through this process utilizing the VPRI/EXP/IPToS RAMs 458 as appropriate. The egress mark control information may be derived from one or more egress mark commands specified by an AFH pre-pended to the packet, or from one or more egress mark commands within a recipe for the packet. Second, it performs OSI Layer 3/Layer 4 checksum calculation or modification.

The Transmit ACL logic 454 conducts a CAM search for the packet in Egress ACL CAM 460 to determine if the packet should be killed, a copy sent to the host, or mirrored to the egress mirror FIFO 140. The packet then exits the packet modification system 400 through the egress portion 462 of the system 400, and is output onto PBUS 464.

Figure 5:
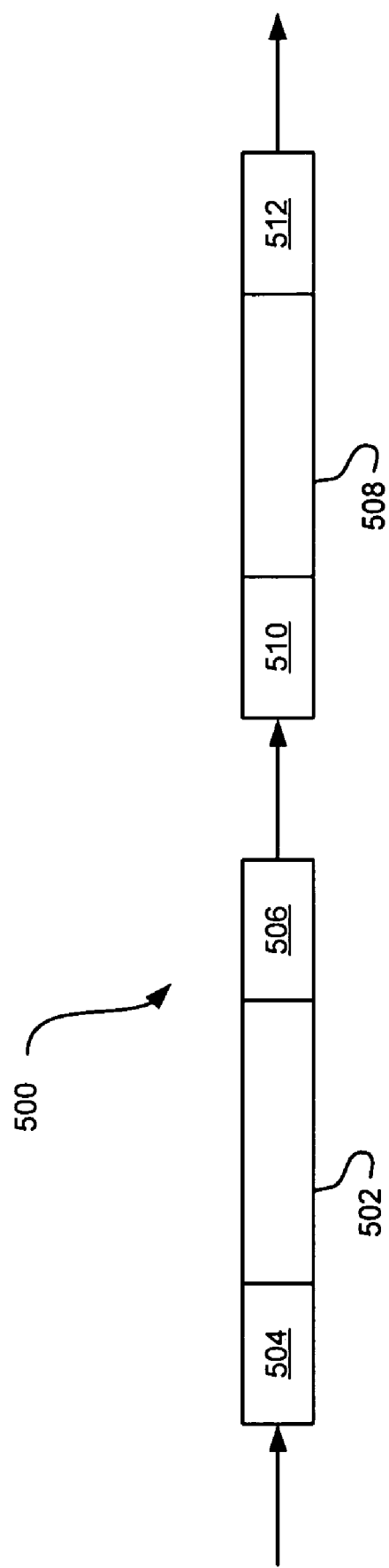
FIG. 5 is a block diagram of an embodiment of a cascade of multiple packet processing systems.

FIG. 5 illustrates a cascaded combination 500 of multiple, replicated packet systems, each of which is either a packet classification system or a packet modification system. In one embodiment, the cascaded combination comprises a first one 502 of the replicated packet systems having ingress and egress portions, identified respectively with numerals 504 and 506, and a second one 508 of the replicated packet systems having ingress and egress portions, identified respectively with numerals 510 and 512.

In this embodiment, the egress portion 506 of the first packet system 502 is coupled to the ingress portion 510 of the second packet system 508. Moreover, the first one 502 of the replicated packet systems is configured to perform partial processing of a packet, either classification or modification processing as the case may be, and the second one 508 of the replicated packet systems is configured to complete processing of the packet.

In one configuration, packet system 508 forms the last one of a plurality of systems in the cascaded combination, and packet system 502 forms either the first or the next to last one of the systems in the cascaded combination.

In one example, each of the replicated systems performs a limited number of processing cycles, and the number of replicated systems is chosen to increase the number of processing cycles to a desired level beyond that achievable with a single system.

In a second example, a complete set of processing functions or tasks is allocated amongst the replicated systems. In one configuration, a first replicated system is allocated ACL and QoS classification processing tasks, and a second replicated system is allocated. PTI/TXMI classification processing tasks.

Figure 6:
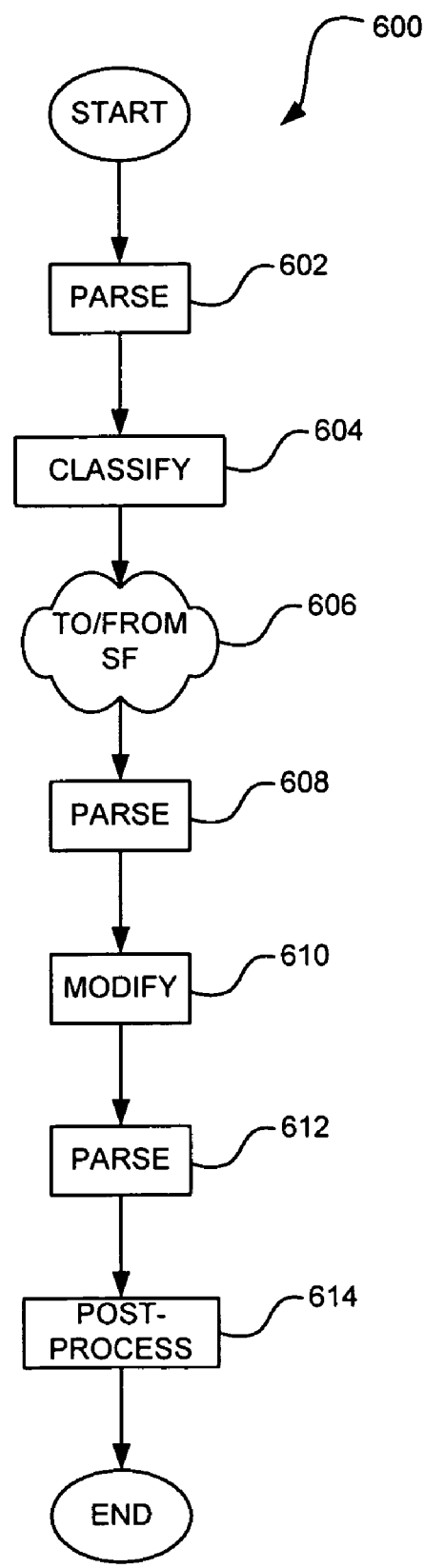
FIG. 6 is a flowchart of an embodiment of method of processing a packet which comprises multiple parsing steps.

FIG. 6 is a flowchart of one embodiment 600 of a method of processing a packet. In this embodiment, the method comprises step 602, parsing a packet and providing first data representative thereof, and step 604, classifying the packet responsive to the first data.

In step 606, the packet is forwarded to and received from switching fabric, which may perform additional processing of the packet. Step 608 comprises parsing the packet received from the switching fabric (which may be the packet forwarded to the switching fabric, or a packet derived therefrom), and providing second data representative thereof.

Step 610 comprises modifying the packet responsive to the second data, and step 612 comprises parsing the modified packet and providing third data representative thereof. Step 614 comprises post-processing the modified packet responsive to the third data.

In one embodiment, the packet undergoing processing has a plurality of encapsulation layers, and each of the first, second and third parsing steps 602, 608, 612 comprising providing context pointers pointing to the start of one or more of the encapsulated layers of the packet.

In a second embodiment, the packet undergoing processing comprises a first packet forming the payload portion of a second packet, each of the first and second packets having a plurality of encapsulation layers, and each of the first, second and third parsing steps 602, 608, 612 comprises providing context pointers pointing to the start of one or more of the encapsulated layers of the first packet and one or more of the encapsulated layers of the second packet.

In one implementation, the post-processing step comprises computing a checksum for the modified packet. In a second implementation, the post-processing step comprises egress marking of the packet. In a third implementation, the post-processing step comprises the combination of the foregoing two implementations.

Figure 7:
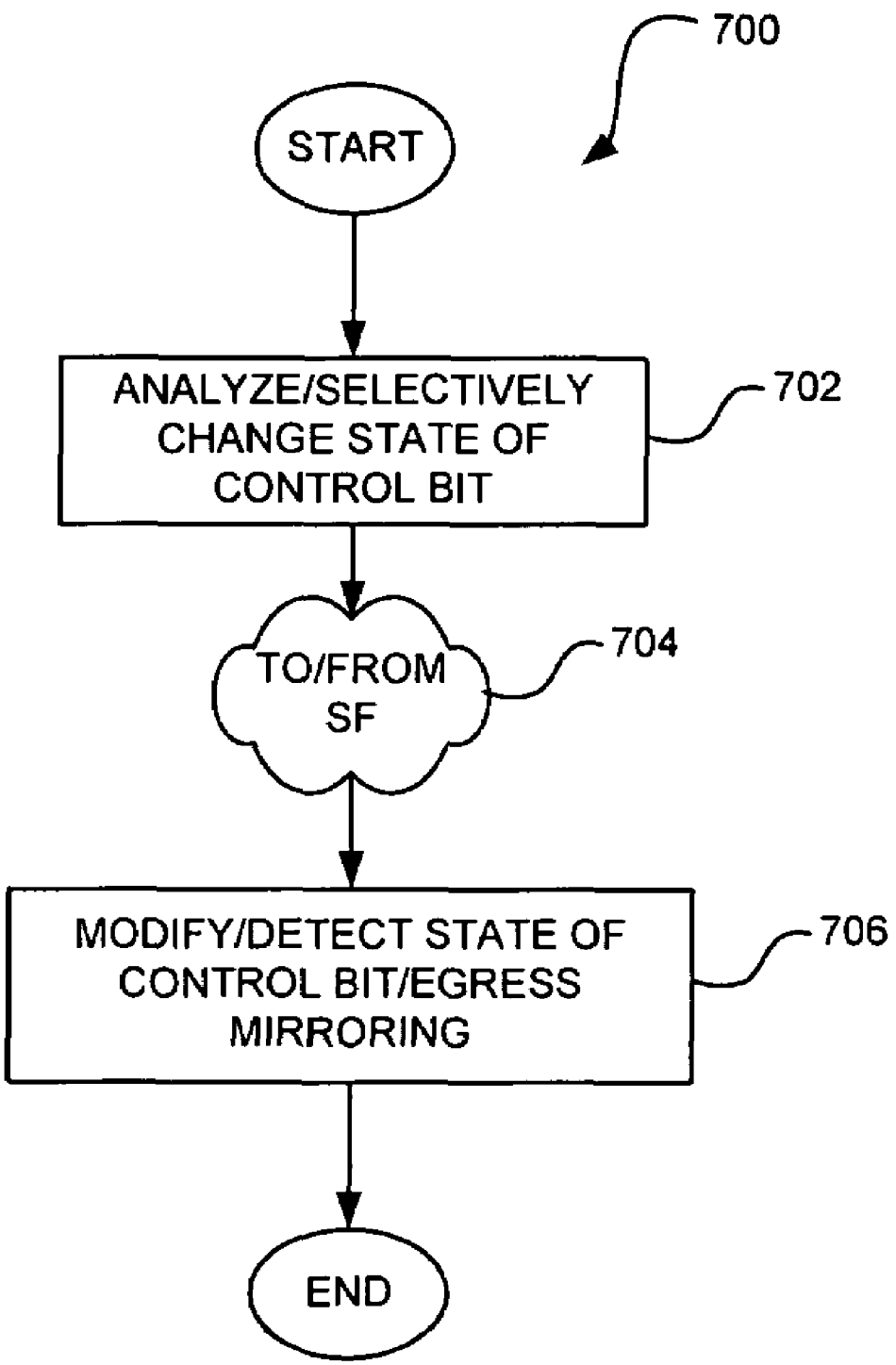
FIG. 7 is a flowchart of an embodiment of a method of performing egress mirroring of a packet.

FIG. 7 is a flowchart of a second embodiment 700 of a method of processing a packet. In this embodiment, step 702 comprises analyzing a packet in a packet classification system and, responsive thereto, selectively changing the state of a control bit from a first state to a second state. Step 704 comprises forwarding the packet to and from switching fabric. Step 706 comprises modifying, in a packet modification system, the packet received from the switching fabric (either the packet forwarded to the switching fabric, or a packet derived there-from), detecting the control bit to determine if egress mirroring of the modified packet is activated, and if so, providing a copy of the modified packet to the packet classification system.

In one implementation, the control bit is associated with the packet received from the switching fabric. In one example, the control bit is in a packet header pre-pended to the packet received from the switching fabric.

Figure 8:
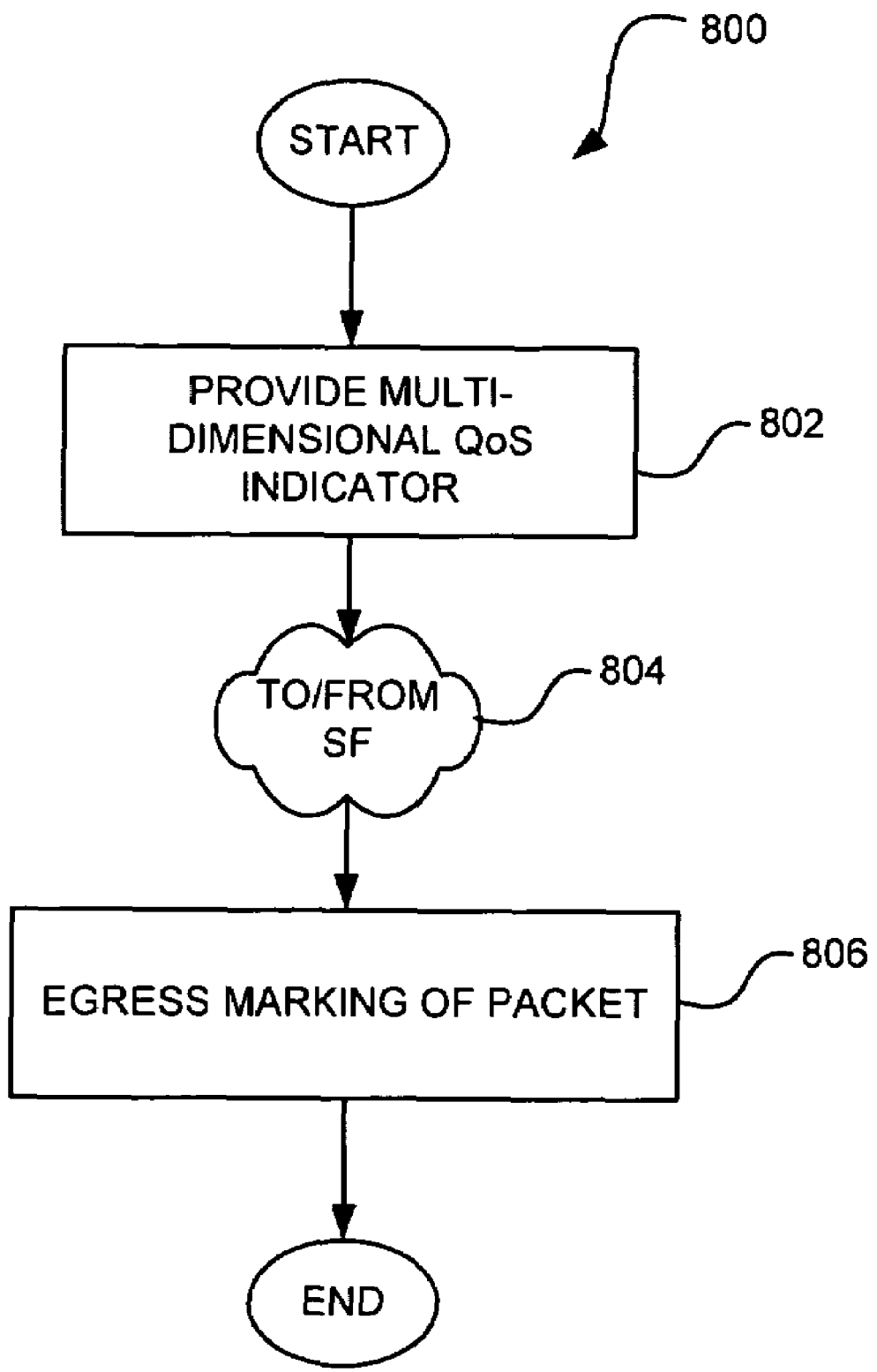
FIG. 8 is a flowchart of an embodiment of a method of performing egress marking of a packet.

FIG. 8 is a flowchart of a third embodiment 800 of a method of processing a packet. Step 802 comprises providing a multi-dimensional quality of service (QoS) indicator for a packet. Step 804 comprises forwarding the packet to and from switching fabric. Step 806 comprises egress marking of the packet received from the switching fabric (either the packet forwarded to the switching fabric, or a packet derived therefrom), responsive to at least a portion of the multi-dimensional QoS indicator.

In one implementation, step 806 comprises selectively modifying one or more quality of service fields within the packet received from the switching fabric responsive to at least a portion of the multi-dimensional quality of service indicator.

In one configuration, the multi-dimensional quality of service indicator comprises an ingress quality of service indicator, an egress quality of service indicator, and packet marking control information, and step 806 comprises selectively modifying one or more quality of service fields within the packet received from the switching fabric responsive to the packet marking control information. In one example, the multi-dimensional quality of service indicator further comprises a host quality of service indicator.

In one embodiment, the method further comprises utilizing the ingress quality of service indicator as an ingress queue select. In a second embodiment, the method further comprises utilizing the egress quality of service indicator as an egress queue select. In a third embodiment, the method further comprises utilizing the host quality of service indicator as an ingress queue select for a host.

Figure 9:
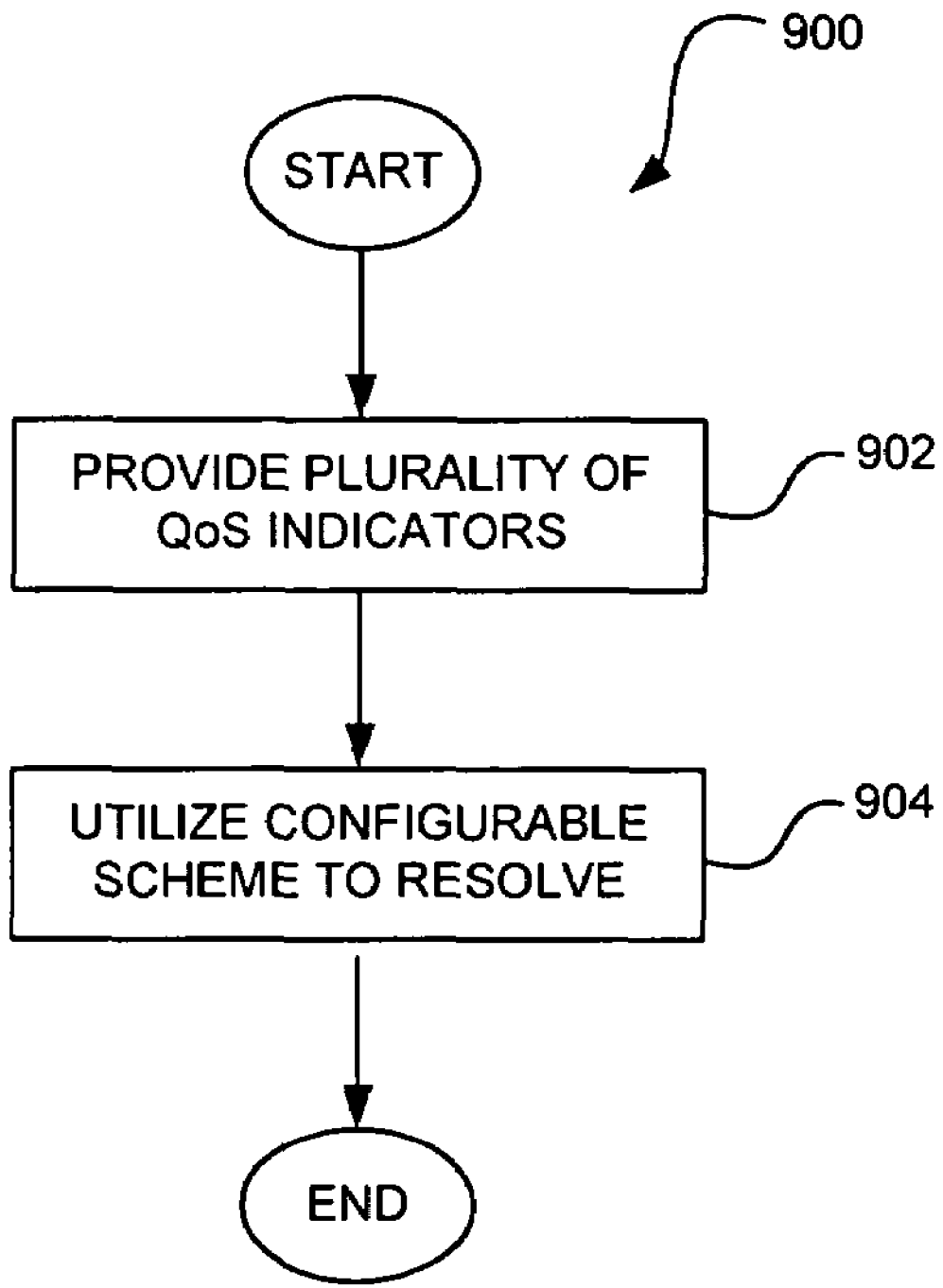
FIG. 9 is a flowchart of an embodiment of a method of resolving a plurality of quality of service (QoS) indicators for a packet utilizing a configurable priority resolution scheme.

FIG. 9 is a flowchart of an embodiment 900 of assigning a quality of service indicator to a packet. In this embodiment, step 902 comprises providing a plurality of quality of service indicators for a packet, each with an assigned priority, and step 904 comprises utilizing a configurable priority resolution scheme to select one of the plurality of quality of service indicators for assigning to the packet.

In one implementation, step 902 comprises mapping one or more fields of the packet into a quality of service indicator for the packet and an associated priority. In a second implementation, step 902 comprises performing a search to obtain a quality of service indicator for the packet and an associated priority. A third implementation comprises a combination of the foregoing two implementations.

Figure 10:
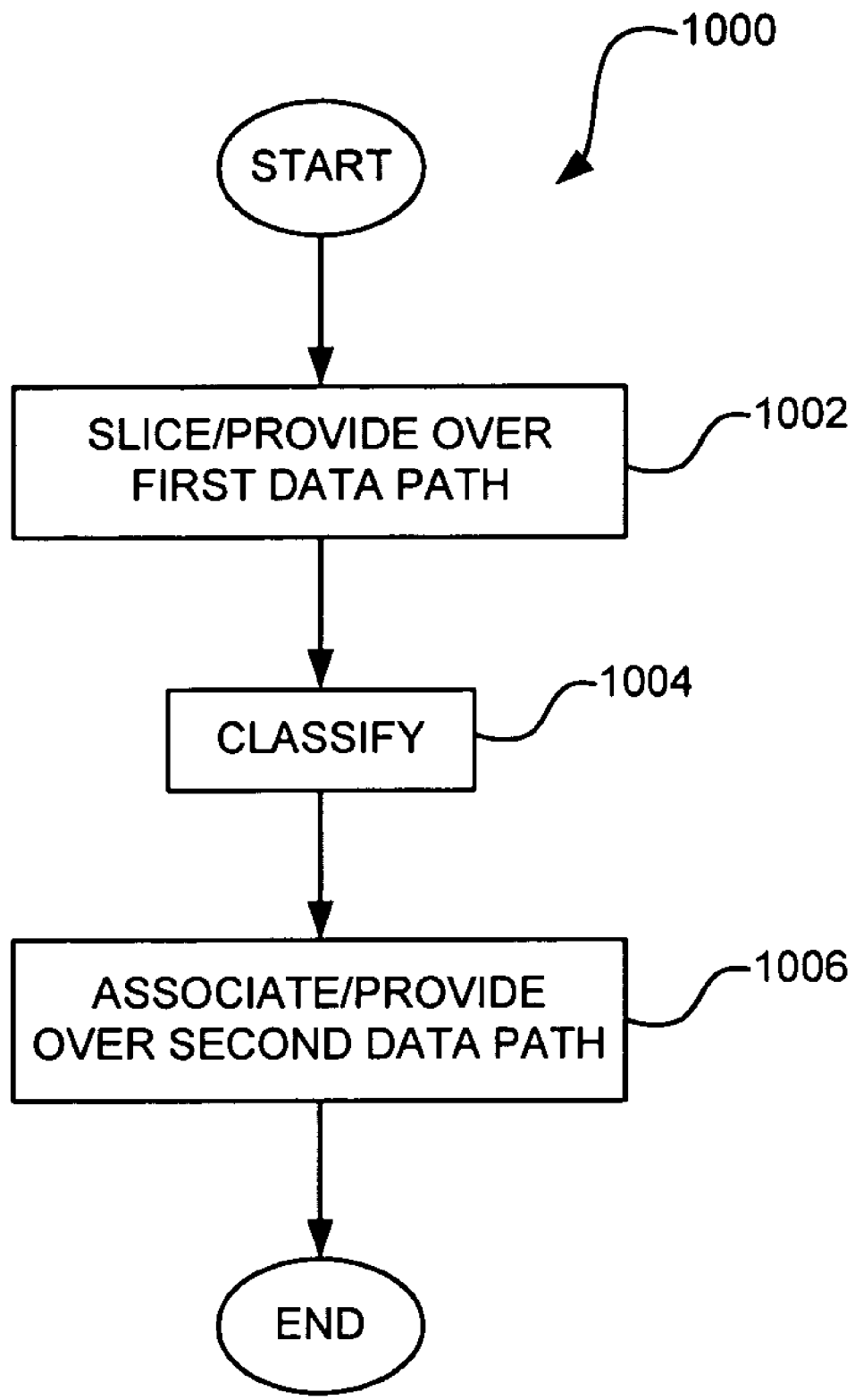
FIG. 10 is a flowchart of an embodiment of a method of classifying a packet in which sliced packet data is provided to a packet classification engine over a wide data path.

FIG. 10 is a flowchart of an embodiment 1000 of a method of classifying a packet. In this embodiment, step 1002 comprises slicing some or all of a packet into portions and providing the portions in parallel over a first data path having a first width to a classification engine. Step 1004 comprises classifying, in the packet classification engine, the packet responsive to the packet portions received over the first data path and providing data representative of the packet classification. Step 1006 comprises associating the data representative of the packet classification with the packet to form an associated packet, and providing the associated packet over a second data path having a second width less than the first width.

In one implementation, the step of providing the packet portions over the first data path comprises providing each of the bits of some or all of the packet in parallel over the first data path to the classification engine.

In a second implementation, the associating step comprises multiplexing the data representative of the packet classification and some or all of the packet onto the second data path.

Figure 11:
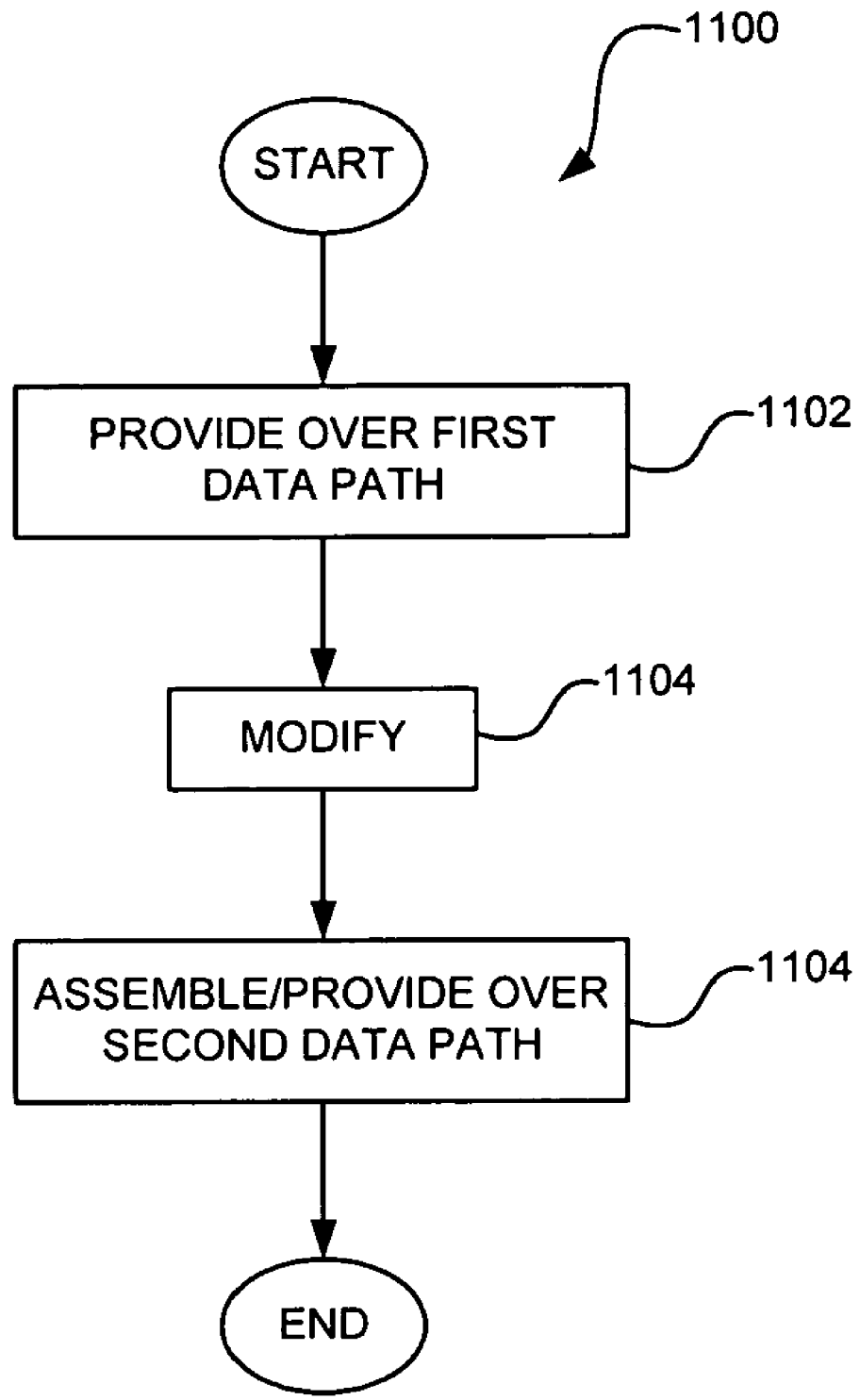
FIG. 11 is a flowchart of an embodiment of a method of modifying a packet in which sliced packet data is provided to a packet modification engine over a wide data path.

FIG. 11 is a flowchart of an embodiment 1100 of a method of modifying a packet. Step 1102 comprises providing some or all of a packet as packet portions and providing the portions in parallel over a first data path having a first width to a modification engine. Step 1104 comprises modifying, in the modification engine, one or more of the packet portions. Step 1106 comprises assembling a packet from the one or more modified and one or more unmodified packet portions, and providing the assembled packet over a second data path having a second width less than the first width.

Figure 12:
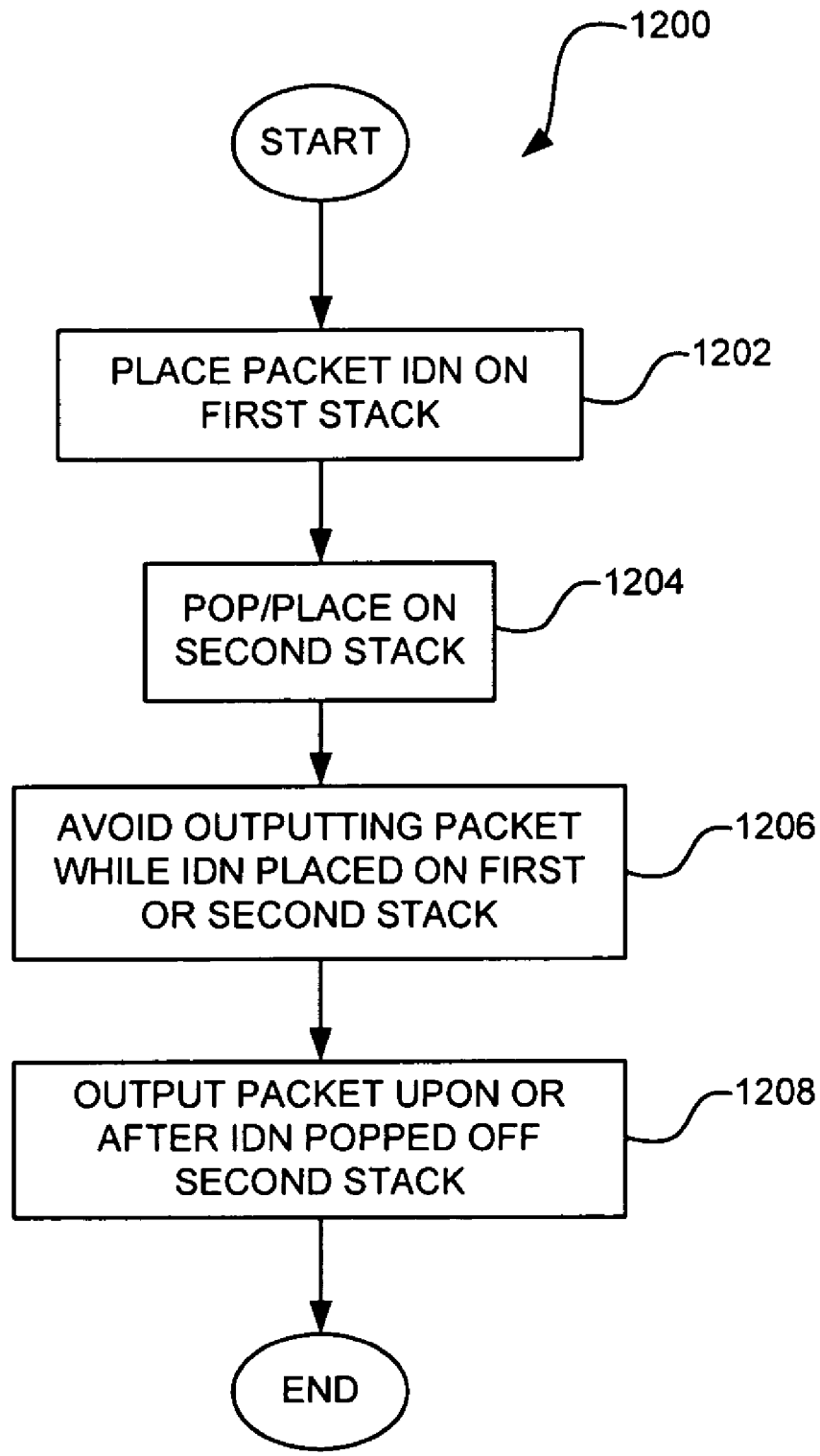
FIG. 12 is a flowchart of an embodiment of a method of controlling packet classification processing of a packet through first and second stacks.

FIG. 12 is a flowchart 1200 of an embodiment of a method of classifying a packet. Step 1202 comprises placing an identifier of a packet on a first FIFO buffer. Step 1204 comprises popping the identifier off the first FIFO buffer and placing it on a second FIFO buffer upon or after initiation of classification processing of the packet. Step 1206 comprises avoiding outputting the packet while an identifier of the same is placed on either the first or second FIFO buffers. Step 1208 comprises outputting the packet upon or after the identifier of the packet has been popped off the second FIFO buffer.

Figure 13:
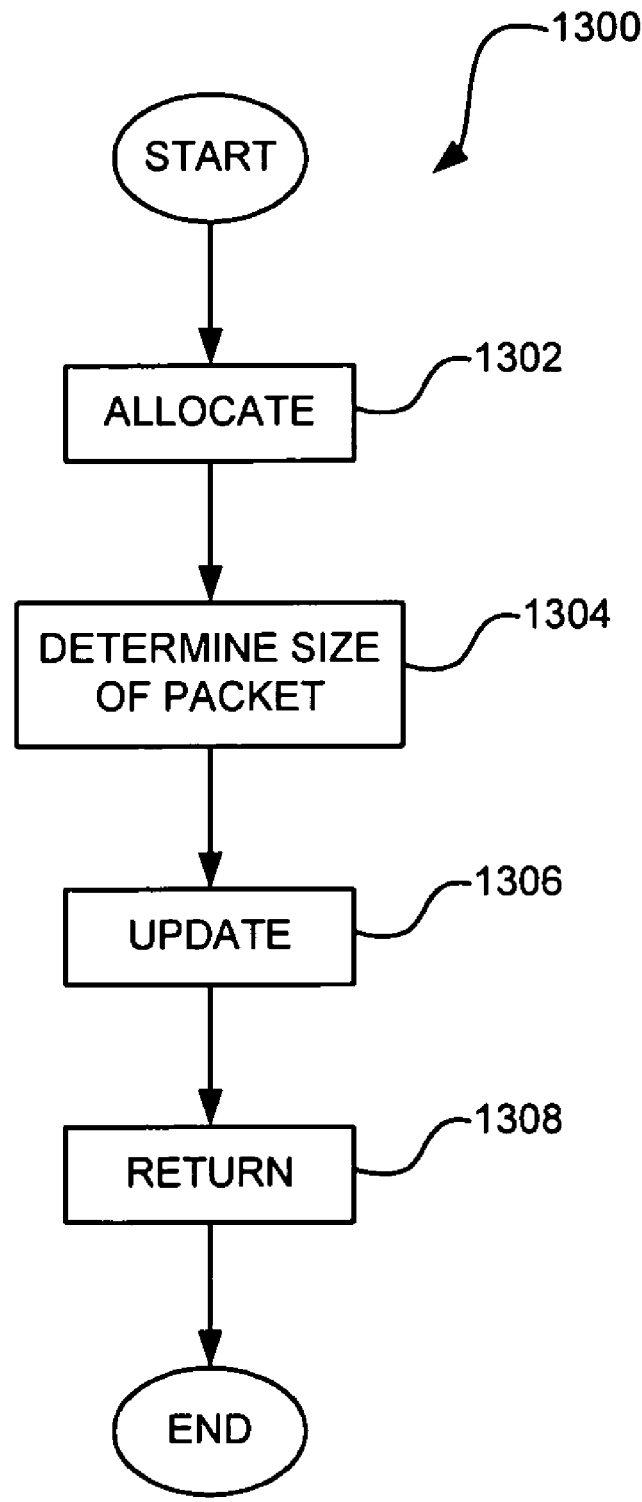
FIG. 13 is a flowchart of an embodiment of a method of maintaining packet statistics which involves allocating a packet size determiner to a packet from a pool of packet size determiners.

FIG. 13 is a flowchart illustrating an embodiment 1300 of a method of maintaining packet statistics. Step 1302 comprises allocating a packet size determiner to a packet from a pool of packet size determiners. Step 1304 comprises using the packet size determiner to determine the size of the packet. Step 1306 comprises updating one or more packet statistics responsive to the determined size of the packet. Step 1308 comprises returning the packet size determiner to the pool upon or after the same has determined the size of the packet.

In one implementation, the packet size determiner is a counter that counts the size of the packet. In a second implementation, the method further comprises queuing one or more statistics update requests.

In one implementation example, the one or more packet statistics indicate the cumulative size of packets which have met specified processing conditions or hits, and step 1306 comprises incrementing a cumulative size statistic for a particular processing condition or hit by the determined size of the packet if the packet meets that particular processing condition or hit.

Figure 14:
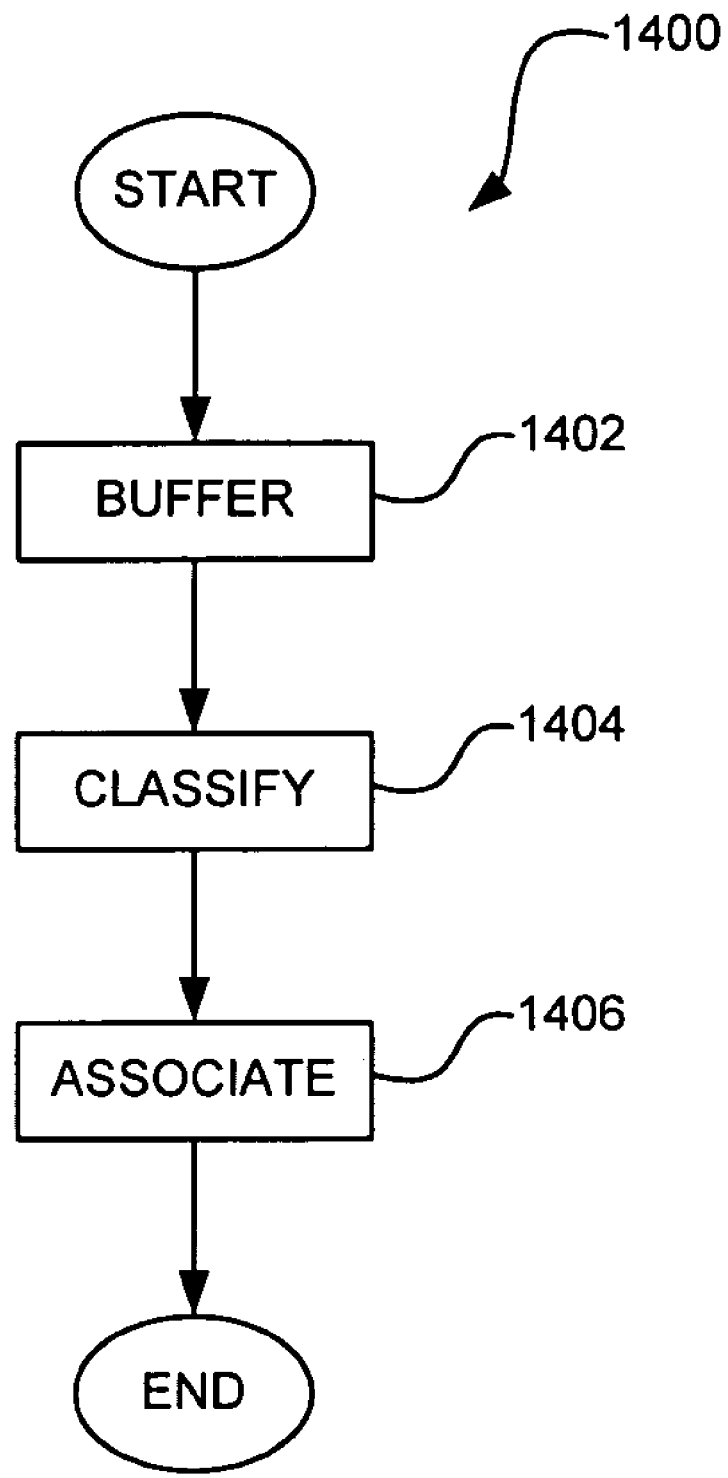
FIG. 14 is a flowchart of an embodiment of a method of classifying a packet which involves buffering the packet in a buffer upon or after ingress thereof, and associating packet classification data with the packet as retrieved directly from the buffer to form a classified packet on an egress data path.

FIG. 14 illustrates an embodiment 1400 of a method of classifying a packet. Step 1402 comprises buffering a packet in a buffer upon or after ingress thereof. Step 1404 comprises classifying the packet and providing data representative of the packet classification. Step 1406 comprises associating the data representative of the packet classification with some or all of the packet as directly retrieved from the buffer to form a packet on an egress data path.

In one implementation, step 1406 comprises multiplexing the data representative of the packet classification onto a data path followed by some or all of the packet as directly retrieved from the buffer.

Figure 15:
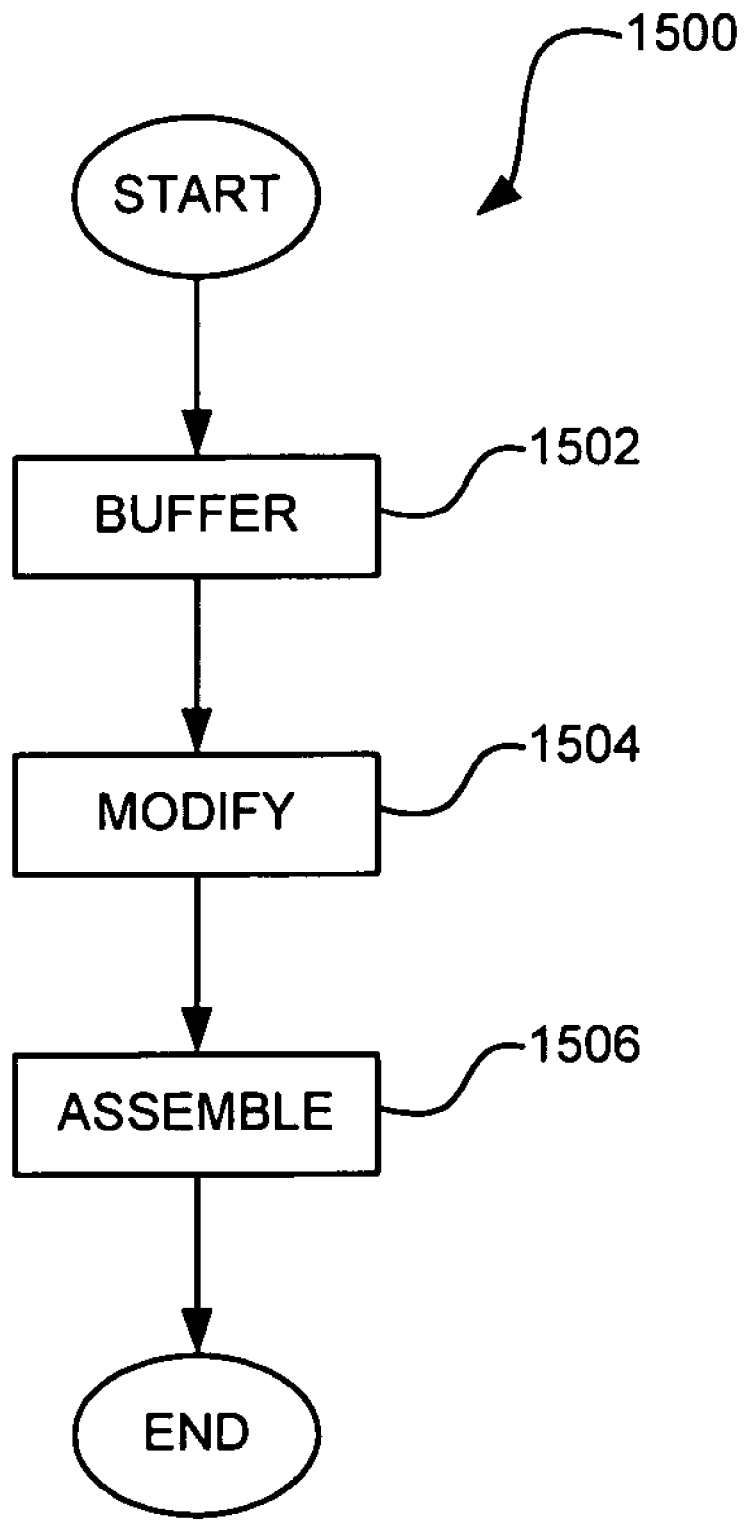
FIG. 15 is a flowchart of an embodiment of a method of modifying a packet which involves buffering the packet in a buffer upon or after ingress thereof, and assembling a packet on an egress data path from one or more modified portions of the packet, and one or more unmodified portions as retrieved directly from the buffer.

FIG. 15 illustrates an embodiment 1500 of a method of modifying a packet. Step 1502 comprises buffering the packet in a buffer upon ingress thereof. Step 1504 comprises modifying one or more portions of the packet. Step 1506 comprises assembling the one or more modified portions of the packet with one or more unmodified portions of the packet as retrieved directly from the buffer to form an assembled packet on an egress data path.

In one implementation, the method comprises providing a list indicating which portions of the assembled packet are to comprise modified portions of an ingress packet, and which portions are to comprise unmodified portions of the ingress packet, and step 1506 comprises assembling the assembled packet responsive to the list.

Figure 16:
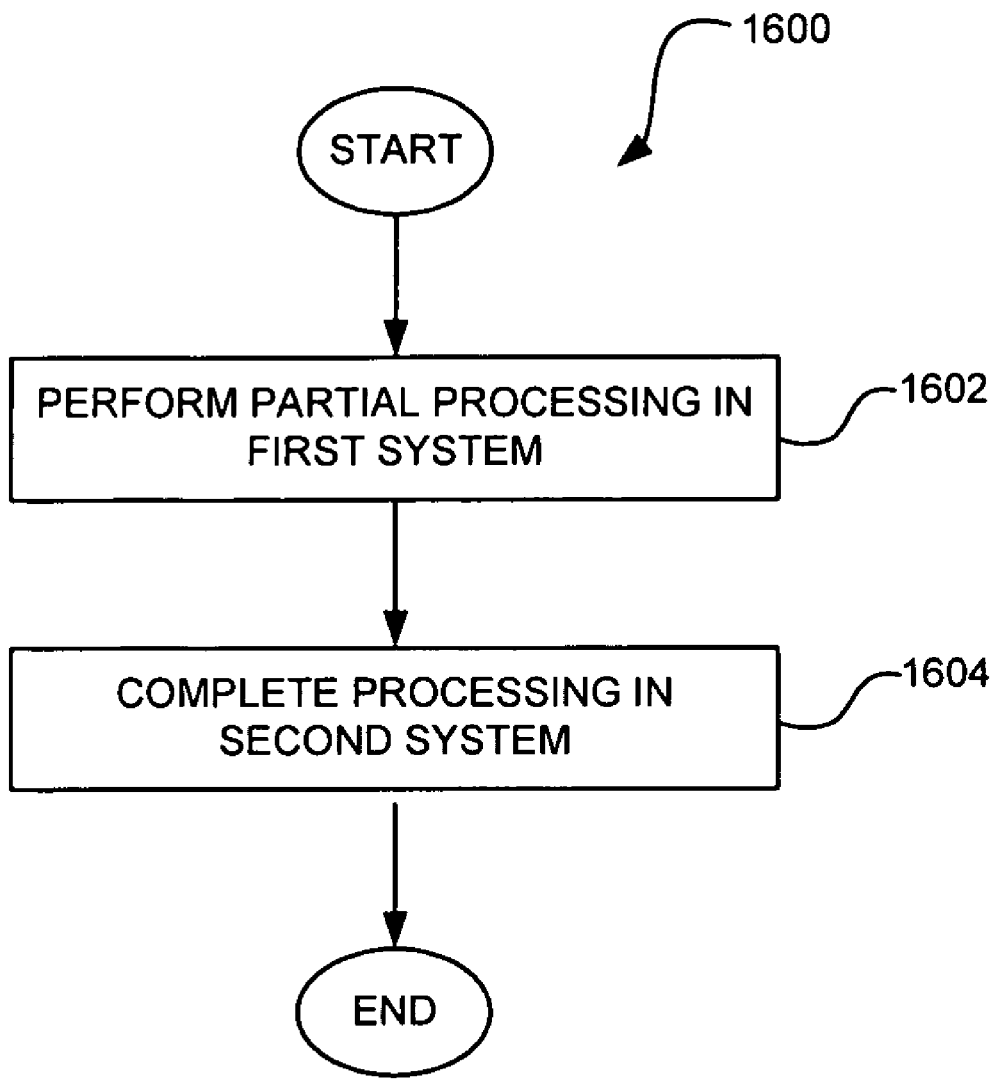
FIG. 16 is a flowchart of an embodiment of a method of performing classification processing of a packet in a cascaded combination of multiple, replicated packet classification systems.

FIG. 16 illustrates an embodiment 1600 of a method of processing a packet in a cascaded combination of multiple, replicated packet processing systems. In one implementation, each of systems is either a packet classification system or a packet modification system, and the processing which is performed by each system is either classification processing or modification processing as the case may be. Step 1602 comprises performing partial processing of a packet in a first of the replicated packet processing systems, and step 1604 comprises completing processing of the packet in a second of the replicated packet processing systems.

In one implementation, the second packet processing system is the last of a plurality of replicated packet processing systems, and the first packet processing system is either the first or next to last packet processing system in the plurality of packet processing systems, wherein partial processing of a packet is performed in the first replicated packet processing system, and processing is completed in the second replicated packet processing system.

Figure 17:
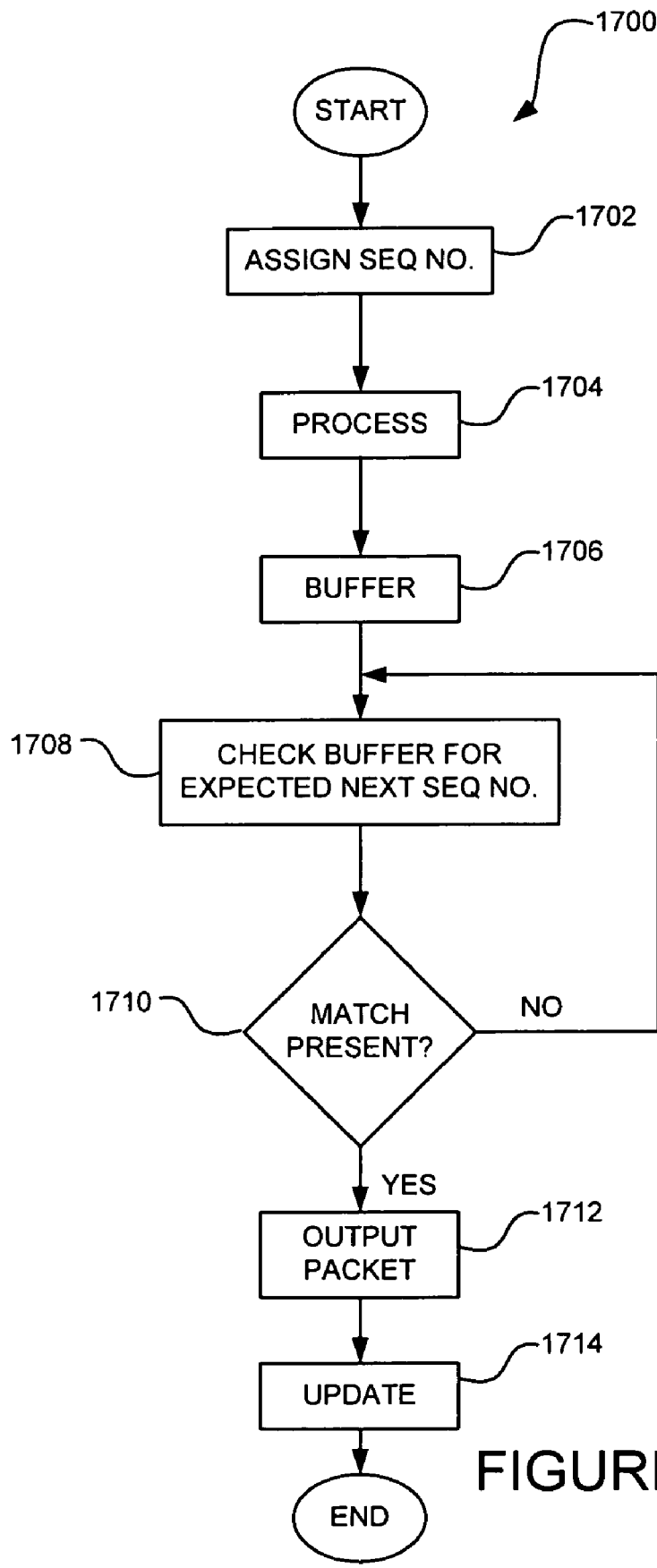
FIG. 17 is a flowchart of an embodiment of a method of preventing re-ordering of packets in a packet processing system.

FIG. 17 illustrates an embodiment 1700 of a method of preventing re-ordering of packets in a packet processing system. Step 1702 comprises assigning a sequence number to a packet upon or after ingress thereof to the system. Step 1704 comprises processing the packet. Step 1706 comprises storing data representative of the packet in a buffer. Step 1708 comprises checking the buffer for an entry matching an expected next sequence number. Inquiry step 1710 comprises determining if a match is present. If so, steps 1712 and 1714 are performed. Step 1712 comprises outputting the corresponding packet, and step 1714 comprises updating the expected next sequence number to reflect the outputting of the packet. If not, the method loops back to step 1708, thus deferring outputting a packet if a match is not present.

In one implementation, steps 1708-1714 comprise maintaining an expected next sequence number for each of a plurality of output channels, checking the buffer for a match for each of the channels, outputting the corresponding packet on a channel if a match for that channel is present and updating the expected next sequence number for that channel, and deferring outputting a packet on a channel if a match for that channel is not present.

B. Pipelined Packet Processing System

Figure 18:
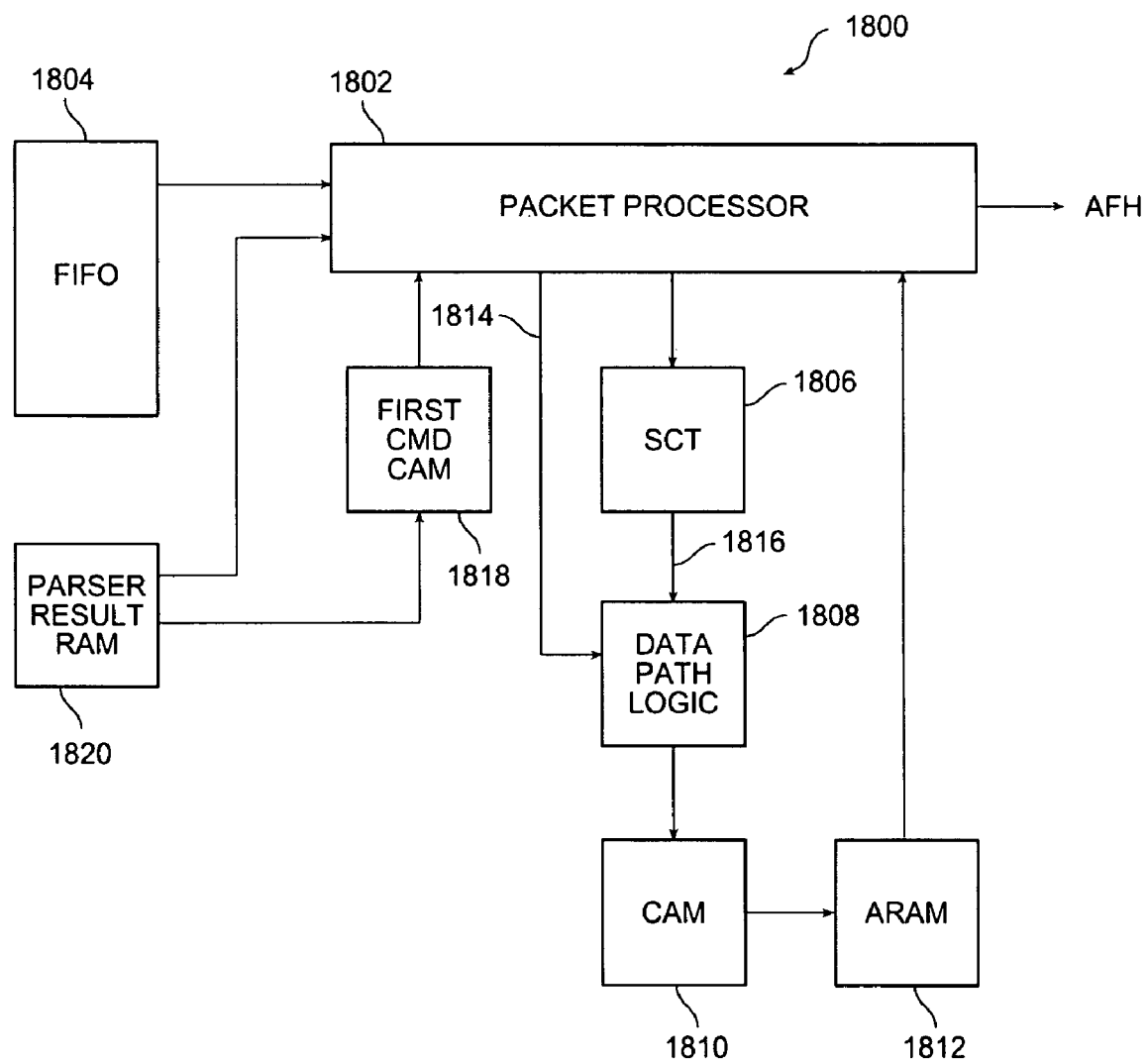
FIG. 18 is a block diagram of an embodiment of a pipelined packet processing system.
Figure 19:
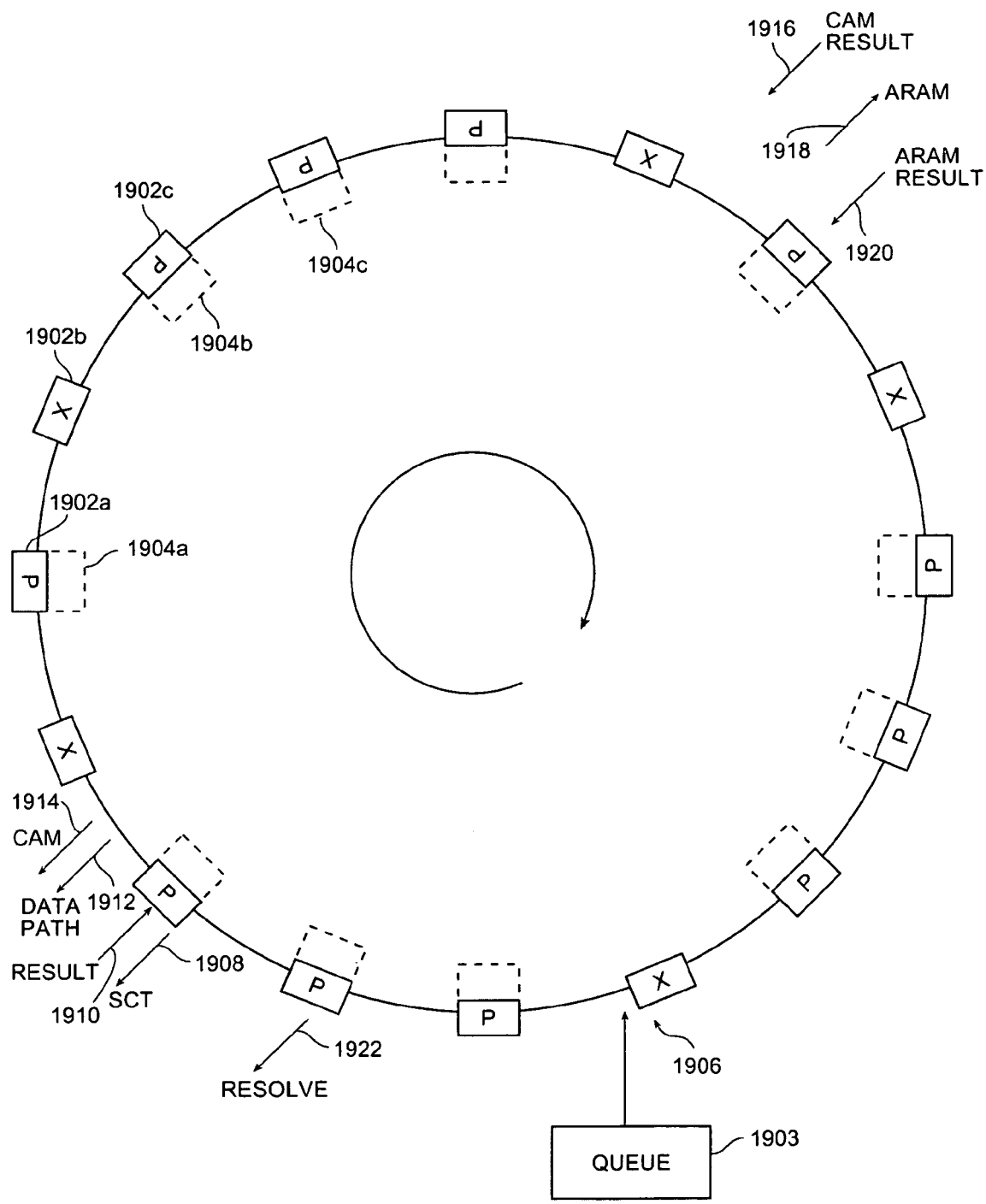
FIG. 19 is a diagram illustrating operation of the pipeline in one embodiment of the system of FIG. 18.

An embodiment of a pipelined packet processing system 1800 is illustrated in FIG. 18. The system 1800 comprises a packet processor 1802 that maintains at least one pipeline having a predetermined number of slots, such as illustrated in FIG. 19, for placement of packet data. Three such slots are identified in FIG. 19 with numerals 1902a, 1902b, and 1902c. The packet processor 1802 is configured to load each of one or more empty ones of the slots with available packet data, process each of one or more filled ones of the slots in sequence during a cycle of processing, and process each of the one or more filled ones of the slots for a predetermined number of cycles of processing.

In one embodiment, the processor 1802 is configured to process the data in a filled slot during a cycle by accessing one or more resources responsive to state data corresponding to the packet data stored in the slot, retrieving data from the one or more resources, and selectively updating the state data responsive to the data retrieved from the one or more resources.

Upon or after the data in the filled slot has undergone the predetermined number of cycles of processing, the processor 1802 is configured to unload the data, and derive packet classification or forwarding information from the state data for the packet. In one embodiment, the processor 1802 assigns the packet classification or forwarding information to the packet such as by pre-pending it to the packet.

In one application, the processor 1802 forms the packet classification engine 128 illustrated in FIG. 1, or the classification engine 310 illustrated in FIG. 3, and the packet classification or forwarding information derived by the processor 1802 is the AFH, illustrated in FIG. 2, which is pre-pended to the packet.

Turning back to FIGS. 18 and 19, in one implementation, the processor 1802 is configured to fill the one or more of the unfilled ones of the slots 1902a, 1902b, 1902c during a loading mode of operation, and process one or more of the filled ones of the slots during a subsequent processing mode of operation that commences after the loading mode of operation has been completed.

In one embodiment, the processor 1802 is configured to fill the one or more of the unfilled slots with available packet data as obtained from a queue 1903. In one example, the processor 1802 is configured to bypass unfilled ones of the slots if and while the queue is empty. Thus, in FIG. 19, filled ones of the slots are identified with "P" while unfilled ones of the slots are identified with "X." In one configuration, the packet data that is taken from queue 1903 and stored in a slot is an identifier of packet data as stored in FIFO buffer 1804. In one application, the queue 1903 is the queue 330, illustrated in FIG. 3, which maintains identifiers of packets that are awaiting classification, and the FIFO buffer 1804 is slicer 306.

In one embodiment, working state data is stored in the slots along with the corresponding packet data. In FIG. 19, this working state data is shown in phantom and identified with numerals 1904a, 1904b, 1904c.

In one implementation example, the predetermined number of slots maintained by the processor 1802 is a programmable variable having a default value of 20 slots, and the predetermined number of processing cycles that each slot undergoes is also a programmable variable having a default value of 5 cycles. In this implementation example, identifiers of packets awaiting processing by processor 1802 are stored in the queue 1903. During a loading mode of operation, each of the slots 1902a, 1902b, 1902c in the pipeline are sequentially loaded with packet identifiers popped off the queue 1903. The process of loading slots is identified in FIG. 19 with numeral 1906. During the loading mode of operation, if the queue 1903 is empty when a slot is presented for loading, the slot is bypassed and not loaded with packet data. This process continues until all the slots have either been filled or bypassed. At that point, the processor enters a processing mode of operation, during which each of the filled slots undergoes the predetermined number of cycles of processing.

Turning back to FIG. 18, the processor 1802 performs a cycle of processing on a slot by retrieving an entry from sequence control table (SCT) 1806. During the first cycle of processing of the data in the slot, the address of the command in the SCT is obtained from an entry in First Command CAM 1818. That entry is obtained from a search of the First Command CAM 1818 using a key derived from the results of parsing the packet as stored in Parser Result RAM 1820. During subsequent cycles of processing of the data in the slot, the address of the command is obtained from working state data stored in the slot itself alongside the corresponding packet data. In one implementation, this address is stored in the slot at the conclusion of the previous cycle of processing. In one example, this address is derived during the previous cycle of processing from the SCT command that is being executed during that cycle of processing. In one application, the Parser Result RAM 1820 is the Parser Result RAM 314 identified in FIG. 3.

Turning back to FIG. 18, in one implementation example, the command from SCT 1806 is processed by data path logic 1808 to form a key to CAM 1810. In this implementation example, a matching entry in the CAM 1810 is located. This matching entry identifies a corresponding entry in associated RAM (ARAM) 1812. The ARAM and/or SCT entries either provide working state data for the packet undergoing processing, or provide data from which that working state data is updated. In one application, CAM 1810 forms the CAM 142 illustrated in FIG. 1, and ARAM 1812 forms the ARAM 144 illustrated in FIG. 1.

The steps of updating the working state information for a packet are reflected in FIG. 19. In particular, once a slot is loaded with packet data as identified with numeral 1906, in one implementation example, the slot conceptually moves through the pipeline in a counter-clockwise fashion. At the point identified with numeral 1908, an access is made to SCT 1806 for the command to be executed. As discussed, during the first cycle of processing of a slot, the address of this first command is obtained from First Command CAM 1818. During subsequent cycles of processing, the address of the command is obtained from the working state for the packet stored in the slot alongside the packet.

At the point identified with numeral 1910, the SCT command resulting from this access is obtained. At the point identified with numeral 1912, this command is processed by data path logic 1808 to result in a CAM key. At the point identified with numeral 1914, an access is made to CAM 1810 using this key. Because of the latency of this CAM, the result of this access is not available until the point identified with numeral 1916. At the point identified with numeral 1918, the CAM entry resulting from this access is used to access a corresponding entry in ARAM 1812. At the point identified with numeral 1920, the result of this access is available. At the point identified with numeral 1922, data resulting from the ARAM access and/or the SCT command data is resolved with the current working state data for the packet. For priority-based items, an element of the ARAM/SCT data supersedes an existing element of state data if it has a higher priority. For non-priority based items, an element of the ARAM/SCT data may supersede an existing element of state data without regard to priority.

In one embodiment, as discussed, the working state data for a packet is stored in the corresponding slot alongside the packet data. In a second embodiment, an identifier of the working state data as stored in a buffer is stored in the corresponding slot along with the packet data.

In one embodiment, the working state data for a packet is control data, such as, for example, pipeline management information, packet process state data, or static packet information. In a second embodiment, the working state data for a packet is packet classification or forwarding information for the packet such as, for example, priority-based packet classification/forwarding information or non-priority-based packet classification/forwarding information. In a third embodiment, the working state data for the packet is statistical information relating to the packet. In a fourth embodiment, the working state data for a packet is any combination of the foregoing.

Figure 20:
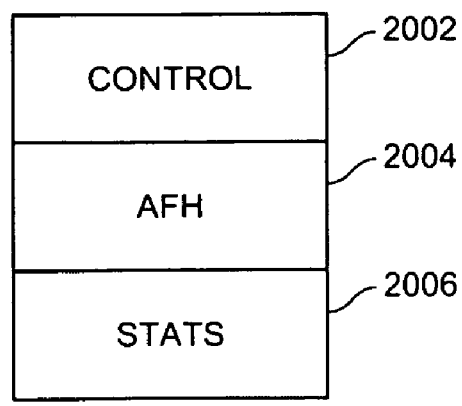
FIG. 20 illustrates one example of the categories of working state information in the system of FIG. 18.

In one implementation example, as illustrated in FIG. 20, the working state data maintained for a packet comprises control data 2002, AFH data 2004, and statistical information 2006. In this implementation example, the working state data is stored in the slot along with an identifier of the packet as stored in a buffer (such as slicer 306 in FIG. 3). In one configuration, the control data 2002 comprises:

Pipeline management data, including:
host/packet indicator, indicating whether the slot is occupied by packet data or data from a CPU host.
cycle count, the number of cycles of processing data in the slot has undergone to date.
first/done indicators, indicating respectively whether the current cycle of processing is the first cycle for the data in the slot, and whether the slot has completed all required cycles of processing.
Packet process state data, including:
Page selector, the page selector applicable to the current processing cycle.
VLAN selector, the VLAN selector applicable to the current processing cycle.
IP selector, the IP header selector applicable to the current processing cycle.
ARAM VLAN flag, indicating whether the working VLAN for the packet is to be taken from the ARAM entry.
SCT index, identifying the address of the next SCT command to be executed.
Static packet information, including:
Packet length.
Packet pointer, a pointer to the packet as stored in a buffer.
Interface type, e.g., EtherNet or POS.
Ingress port number, an identifier of the ingress port of the packet.
Port State flag, a flag indicating whether the Port State Table is being used for this processor slot.
Debug management information.
In one configuration, the AFH data 2004 comprises:
Priority based information, including:
PTI.
TXMI.
IQoS, EQoS, CQoS.
Egress Mark data.
Non-priority based information, including the following "sticky" flags that, once set, remain set:
Learn flag, a flag that, if asserted, directs a switch-side device to forward a copy of the packet to the host for learn processing.
Redirect flag, a flag that, if asserted, directs a switch-side device to forward a copy of the packet to the host for redirect processing.
Ingress Mirror flag, a flag that, if asserted, directs a switch-side device to forward a copy of the packet to a designated ingress mirror port on the switch.
Egress Mirror flag, a flag that, if asserted, directs a switch-side device to forward a copy of the packet to a designated mirror FIFO on the switch.
Random Early Drop flag, a flag that, if asserted, increases the priority of the packet for dropping.
Jumbo check flag, a flag that, if asserted, directs a device encountering the packet to perform a Jumbo-allowed check.
In one configuration, the statistical data comprises:
Matrix mode statistics, whereby a multi-dimensional statistic for a packet is accumulated over each of the processing cycles undertaken by the packet.

Figure 21:
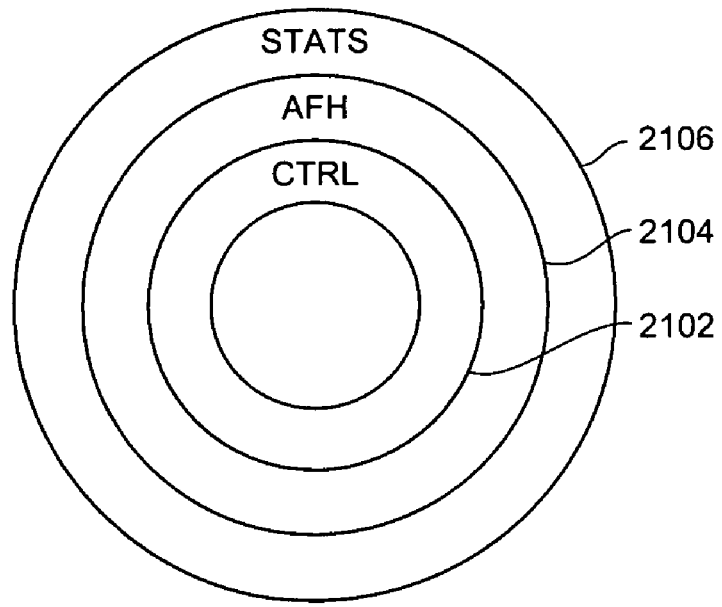
FIG. 21 illustrates one implementation of the pipeline of FIG. 19, as configured to process the multiple categories of state information illustrated in FIG. 20.

In one embodiment, the pipeline of FIG. 19 comprises three separate but related pipelines, identified with numerals 2102, 2104, 2106 in FIG. 21, that are respectively used to update the control, AFH, and statistical portions of the working state data.

FIG. 22 illustrates an implementation example of the control data portion of the state data corresponding to a packet, FIG. 23 is an implementation example of the AFH portion of the state data corresponding to a packet, and FIG. 24 is the statistics data portion of the state data corresponding to a packet. The functions of the various bits and fields illustrated in FIG. 22 are as follows:

BUSY—a bit that, if asserted, indicates the pipeline slot is processing a packet.
CPU—a bit that, if asserted, indicates the pipeline slot is processing a CPU or host access.
FIRST—a bit that, if asserted, indicates the current cycle is the first processing cycle for the packet.
DONE PEND—a bit that, if asserted, indicates that the packet has undergone all required cycles of processing and that an AFH assignment to the packet is pending.
PTR—a pointer or reference handle to the packet in a receive FIFO.
LEN—packet length up to 128 bytes total
IF TYPE—ingress interface type; 0=Ethernet, 1=POS.
IF PST ACTIVE—an indicator of whether the Port State Table is active during this processor cycle.
PORT—the ingress port of the packet being processed.
VLAN—the working VLAN for the current processing cycle.
C1—the C1 context pointer for the current processing cycle.
C2—the C2 context pointer for the current processing cycle.
C3—the C3 context pointer for the current processing cycle.
C4—the C4 context pointer for the current processing cycle.
C5—the C5 context pointer for the current processing cycle.
C6—the C6 context pointer for the current processing cycle.
LKUP COUNT—a count of the number of cycles of processing undertaken to date for the packet.
SCT—the SCT index for the current processing cycle.
PAGE SEL—the page selector for the current processing cycle.
VLAN SEL—the VLAN selector for the current processing cycle.
L3 SEL—the L3 Header selector for the current processing cycle.
VLAN ARAM—an indicator that the working VLAN for the current processing cycle was derived from an ARAM entry.
DEBUG ACTIVE—a flag that, if asserted, indicates that a Debug Process is active.
DEBUG LAST SLOT—an indicator to the Debug Process that the current slot is the last slot in the pipeline.
DEBUG LAST LKUP—an indicator to the Debug Process that the current processing cycle is the last processing cycle in the pipeline.
DEBUG VALID—Debug Valid bits to control debug triggering. The functions of the bits and fields illustrated in FIG. 23 are as follows:
PTI—see discussion of FIG. 2.
TXMI—see discussion of FIG. 2.
EQoS—see discussion of FIG. 2.

IQoS—see discussion of FIG. 2.
CQoS—see discussion of FIG. 2.
CPU Copy—see discussion of FIG. 2. In one implementation, set when a QoS source returns a valid CPU QoS value.
EMRK SEL—see discussion of FIG. 2.
PERR KILL—see discussion of FIG. 2.
LAI—see discussion of FIG. 2.
LAI KEEP—an indicator whether the LAI was supplied by ARAM.
EMIRROR—see discussion of FIG. 2. In one implementation, this flag is set if the ARAM EMirror flag is set or if an Egress QoS is returned with a special Mirror Copy encode value.
IMIRROR—see discussion of FIG. 2. In one implementation, this flag is set if either the ARAM IMirror or VPST Mirror flags are set.
ROUTE—see discussion of FIG. 2. In one implementation, this flag is set when any SCT entry in the lookup sequence for the packet requests that it be set.
LEARN—see discussion of FIG. 2. In one implementation, this flag may be set when an SCT-enabled comparison indicates that the ingress port does not equal the least significant bits of the PTI obtained from a matching CAM entry, or that the CAM search did not result in a match (also subject to VPST.Learn enable control).
REDIRECT—see discussion of FIG. 2. In one implementation, this flag is set when an SCT-enabled comparison determines that the ingress and egress (ARAM-supplied) VLANs are equal.
JUMBO—see discussion of FIG. 2. In one implementation, this flag is set when any SCT entry in the lookup sequence for the packet requests that it be set.
DON'T FRAG—see discussion of FIG. 2. In one implementation, this flag is always set for IPv6 processing, and set for IPv4 processing if the Don't Fragment bit in the IPv4 header is set. In one example, unlike the other flags in this table, which are all persistent, i.e. once set, remain set, this flag is pseudo-persistent, i.e., once set, normally remains set, but may be overwritten in limited circumstances. For example, the bit may be initially set based on the processing of an outer IP header, but then is updated (through a SCT request) based on the processing of an inner UDP header.
RED—see discussion of FIG. 2. In one implementation, this flag is set when a QoS source returns this flag set.
IF TYPE—see discussion of FIG. 2.
PTI PRI—current PTI priority.
TXMI PRI—current TXMI priority.
EQoS PRI—current EQoS priority.
IQoS PRI—current IQoS priority.
CQoS PRI—current CQoS priority.
EMS/EMM PRI—current Egress Mark Select/Mask priority.
SSAMPLE BIN—Statistical Sample bin.
SAMPLE ARAM—indicator that Statistical Sample bin is supplied by ARAM.

The functions of the bits and fields illustrated in FIG. 24 are explained in co-pending U.S. patent application Ser. No. 10/834,573.

In one embodiment, the data of FIGS. 22, 23 and 24 is consolidated with other data to form the process data illustrated in FIG. 25. In particular, the control data of FIG. 22 forms the 116 bit CONTROL SET referred to in FIG. 25; the AFH data of FIG. 23 forms the 112 bit AFH SET referred to in FIG. 25; and the statistics data of FIG. 24 forms the 56 bit STATS SET referred to in FIG. 25. This process data, which includes a pointer to the corresponding packet, forms the state data that is stored in a slot. The functions of the other fields referred to in FIG. 25 are as follows:

CID—an identifier of the CAM key as used in the current processing cycle.
RID—a Router identifier as obtained from the PST or VST during the current processing cycle.
PORT—the ingress port of the packet being processed.
CONSTANT—the CONSTANT field from the SCT used in the current processing cycle.
RT0-RT3 RESULTS—the results, respectively, of Reduction Tables 0-3 during the current processing cycle.
IP PROTOCOL—the IP protocol field of the IP Header currently being processed.
ARAM DATA—the ARAM entry data from the previous processing cycle.

This process data forms a 128 byte, nibble addressable data structure that is represented in FIGS. 26A-26B. This process data is to be contrasted with a 128 bytes nibble addressable data structure, representing the first 128 bytes of packet data, which is also maintained. This data structure is illustrated in FIG. 27.

In one embodiment, the first cycle of processing is preceded by the following initialization steps of the CONTROL SET data:

current SCT index loaded with initial SCT index as obtained from the Fist Command CAM 1808.
current PAGE SEL set to 0 (representing Page 0).
current VLAN SEL set to 0 (representing the only or outer VLAN of Page 0).
current VLAN set to Page 0, VLAN0 (or in the case of a routed POS service, the current VLAN is set to the VLAN supplied by the First Command CAM 1818).
current context pointer set (C1-C6) loaded with Page 0 context pointers.
current L3 SEL set to 0 (representing the only or outer L3 Header of Page 0).
current IP control set (consisting of Fragment Type, Don't_Fragment, Protocol, Next Header, and Exception Control values) to Page 0 L3 0 (representing the only or outer Header of Page 0).
LKUP COUNT reset to 0 (if counting upwards) or predetermined number of cycles per packet (if counting down).

All the data in the AFH SET is initialized to 0. The data in the STATISTICS SET is initialized to values specified in the PST/VST table.

In one embodiment, a cycle of processing comprises the following steps:

fetch SCT entry based on current SCT index value.
form CAM key (using data path logic 1808).
execute CAM search.
select active Exception Handler, as described in U.S. patent application Ser. No. 10/835,252.
execute QoS mapping operations, using PST, VST and QoS Map tables as described in U.S. patent application Ser. No. 10/835,532.
execute VPST access, as described in U.S. patent application Ser. No. 10/835,271.
if CAM hit, fetch corresponding ARAM entry.
selectively update process and statistics data based on SCT and/or ARAM entry data (as well as QoS mapping operations, VPST access, and exception handling operations).
unload operation if last cycle of processing for packet.

In one example, CAM 1810 is organized so that higher priority entries precede lower priority entries. If there are multiple matches or hits with the CAM key, the first such match or hit is selected, consistent with the higher priority of this entry compared to the other entries.

In one implementation example, the format of a SCT entry is as illustrated in FIGS. 28A-28C. The following elements of the SCT entry format of FIGS. 28A-28C are relevant to this discussion:

NEXT SCT HIT—the index of the next SCT command assuming a CAM hit during this processing cycle.

NEXT SCT MISS—the index of the next SCT command assuming a CAM miss during this processing cycle.

PTI PRIORITY—the priority of the PTI during this processing cycle

TXMI PRIORITY—the priority of the TXMI during this processing cycle.

EQoS PRIORITY—the priority of the ARAM-supplied EQoS field during this processing cycle.

IQoS PRIORITY—the priority of the ARAM-supplied IQoS field during this processing cycle.

CQoS PRIORITY—the priority of the ARAM-supplied CQoS field during this processing cycle.

LEARN OP—enable Learn processing operation

ROUTE OP—set the Unicast Route flag during the current processing cycle.

DON'T FRAG OP—enable Don't Frag processing operation during the current processing cycle.

JUMBO OP—enable a Jumbo processing operation during the current processing cycle.

CAM KEY SEL NIBBLE 0-17—Eighteen CAM Key Selection Fields, discussed below.

In one implementation, the CAM key used to search through CAM 1810 during a processing cycle is derived by the data path logic 1808 of FIG. 18 from the process and packet data for that processing cycle, as well as the current SCT entry. In FIG. 18, the packet and process data is provided to the data path logic 1808 over one or more signal lines 1814, and selection data, used to narrow the combined 256 bytes of data represented by this process and packet data down to the desired size of the CAM key, is provided to the data path logic 1808 from the current SCT entry over one or more signal lines 1816.

Figure 29:
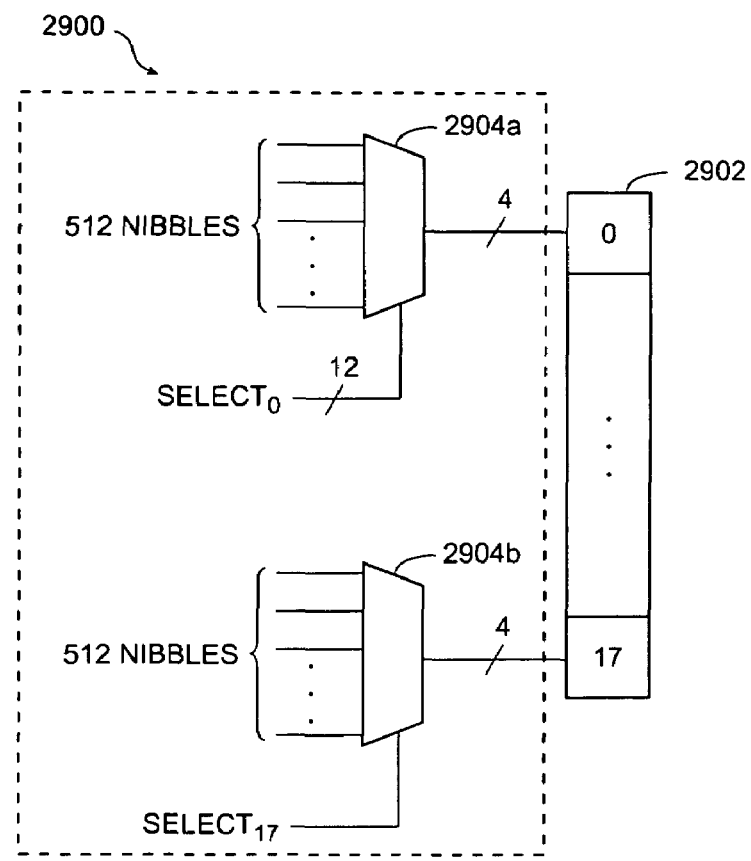
FIG. 29 illustrates one embodiment of data path logic for deriving a CAM key.

FIG. 29 illustrates one example 2900 of the data path logic 1808. In this particular example, the data path logic produces a 72 bit CAM key 2902 that comprises 18 4-bit nibbles. Each of the nibbles is produced by a corresponding 4-bit wide multiplexor. Thus, in FIG. 29, nibble 0 of CAM key 2902 is produced by multiplexor 2904a, while nibble 17 of CAM key 2902 is produced by multiplexor 2904b. Each of these multiplexors receives the same inputs in the same order, 512 4-bit nibbles, 256 nibbles representing the process data, and 256 nibbles representing the packet data. Each of these multiplexors receives its own 12-bit selection field from the current SCT entry. Thus, multiplexor 2904a receives the 12-bit $SELECT_0$ field, referred to in FIGS. 28A-28C as CAM KEY SEL NIBBLE 0, while multiplexor 2904b receives the 12-bit $SELECT_{17}$ field, referred to in FIGS. 28A-28C as CAM KEY SEL NIBBLE 17. There are a total of 18 selection fields represented in FIGS. 28A-28C, which may be referred to respectively as CAM KEY SEL NIBBLE 0-17, each of which is assigned its own multiplexor in the implementation of data path logic illustrated in FIG. 29.

FIG. 30 illustrates the format of each of these 12-bit selection fields. The functions performed by the bits and fields in this format are as follows:

NIBBLE SELECT—selects one of the two nibbles in the selected byte.

BYTE SELECT—selects one of 128 bytes in the selected data structure (either process or packet data).

PROCESS PACKET DATA SELECT—selects either the process or packet data structures.

CONTEXT SELECT—must be 0 if the process data structure is selected; otherwise, selects one of seven packet contexts as follows:

0—Context 0—beginning of packet.
1—Context 1—MAC Header Start.
2—Context 2—Encapsulation/EtherType Start.
3—Context 3—MPLS Start.
4—Context 4—L3 Outer Start.
5—Context 5—L3 Inner Start.
6—Contect 6—L4 Start.
7—Reserved.

In a second example, a 144 bit CAM key is formed using the structure of FIG. 29 from two successive retrievals of SCT entries over two successive half cycles. The selection fields from the two successive SCT entries are successively input to the multiplexors of FIG. 29 with the same process and packet data as inputs. Through this process, two 72 data structures are formed that are concatenated to form the 144 bit CAM key. Other examples are possible, so nothing in this or the previous example should be taken as limiting. FIG. 31 illustrates several possible examples of 72 bit keys.

Once formed, the CAM key is used to search through CAM 1810. If there is a hit, the process yields an ARAM entry. In one implementation, the format of an ARAM entry is as illustrated in FIGS. 32A-32B.

Figure 32B:
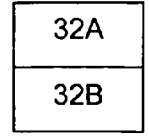

The following elements of the ARAM entry format of FIGS. 32A-32B are relevant to this discussion:

PTI—see discussion of FIG. 2.
TXMI—see discussion of FIG. 2.
EQoS—see discussion of FIG. 2.
IQoS—see discussion of FIG. 2.
CQoS—see discussion of FIG. 2.
PTI VALID—indicates whether ARAM-supplied PTI field is valid.
TXMI VALID—indicates whether ARAM-supplied TXMI field is valid.
EQoS VALID—indicates whether ARAM-supplied EQoS field is valid.
IQoS VALID—indicates whether ARAM-supplied IQoS field is valid.
CQoS VALID—indicates whether ARAM-supplied CQoS field is valid.
RED—if asserted, sets the AFH RED flag.
Next SCT—the next SCT address or index (depending on state of NEXT SCT VALID flag)
NEXT SCT VALID—a flag that, if asserted, indicates the Next SCT field is valid.
VLAN ID—replaces the working VLAN for the packet if REPLACE VLAN flag asserted (see below).
CONT UPDATE—a 4 bit field that, if non-zero, selects one of 15 context update registers for updating the packet context for the current processing cycle.
EMIRROR—when asserted, selects egress mirroring.
IMIRROR—when asserted, selects ingress mirroring.
REPLACE VLAN—when asserted, specifies that the VLAN represented by the VLAN ID field becomes the next working VLAN for the packet.

In one embodiment, the current SCT and/or ARAM entries yield data that is used to selectively update the state data for the slot. Other resources may be accessed as well for the purpose of retrieving data for use in updating the current state data as described herein and in U.S. patent application Ser. No. 10/835,271.

In one implementation example, the state data for a slot is the process data illustrated in FIG. 25. In one implementation, this process data is selectively updated at the conclusion of a processing cycle in the following order: CONTROL SET, AFH SET, and STATS SET.

Figure 33:
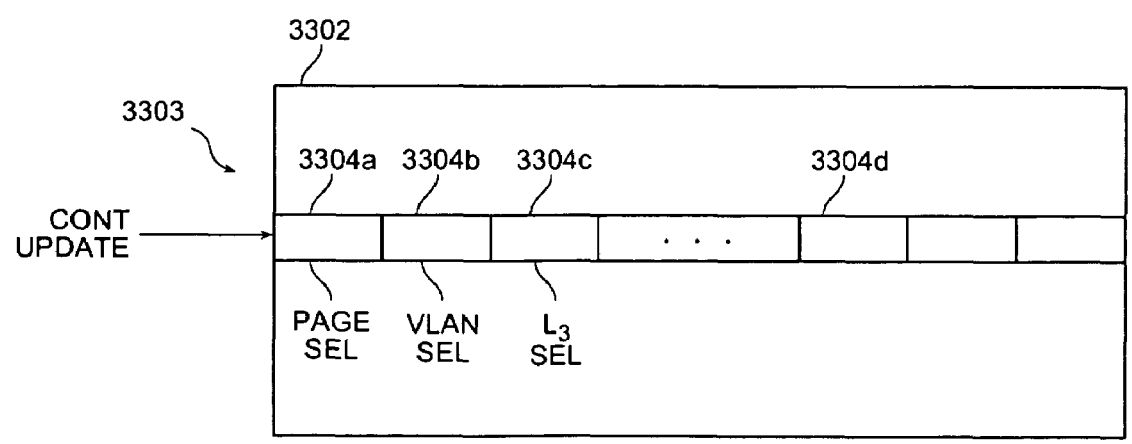
FIG. 33 illustrates an embodiment of logic for updating context select values.

The CONTROL SET data is updated in part based on the ARAM field CONT UPDATE. As illustrated in FIG. 33, this field, if non-zero, is used to select one of fifteen registers is register bank 3302. A first predetermined bit 3304a in the selected register 3303 forms the updated value of PAGE SEL. A second predetermined bit 3304b in the selected register 3303 forms the updated value of VLAN SEL. A third predetermined bit 3304c in the selected register 3303 forms the updated value of L3 SEL. In one embodiment, one or more selected bits in the selected register 3303, such as the bit identified with numeral 3304d, may be used to selectively update specific context pointers to handle, for example, the situation in which the parser did not recognize the corresponding protocol and thus inaccurately determined the context pointer. The selected bit may be used to replace the selected context pointer with an updated value in this embodiment.

Figure 34:
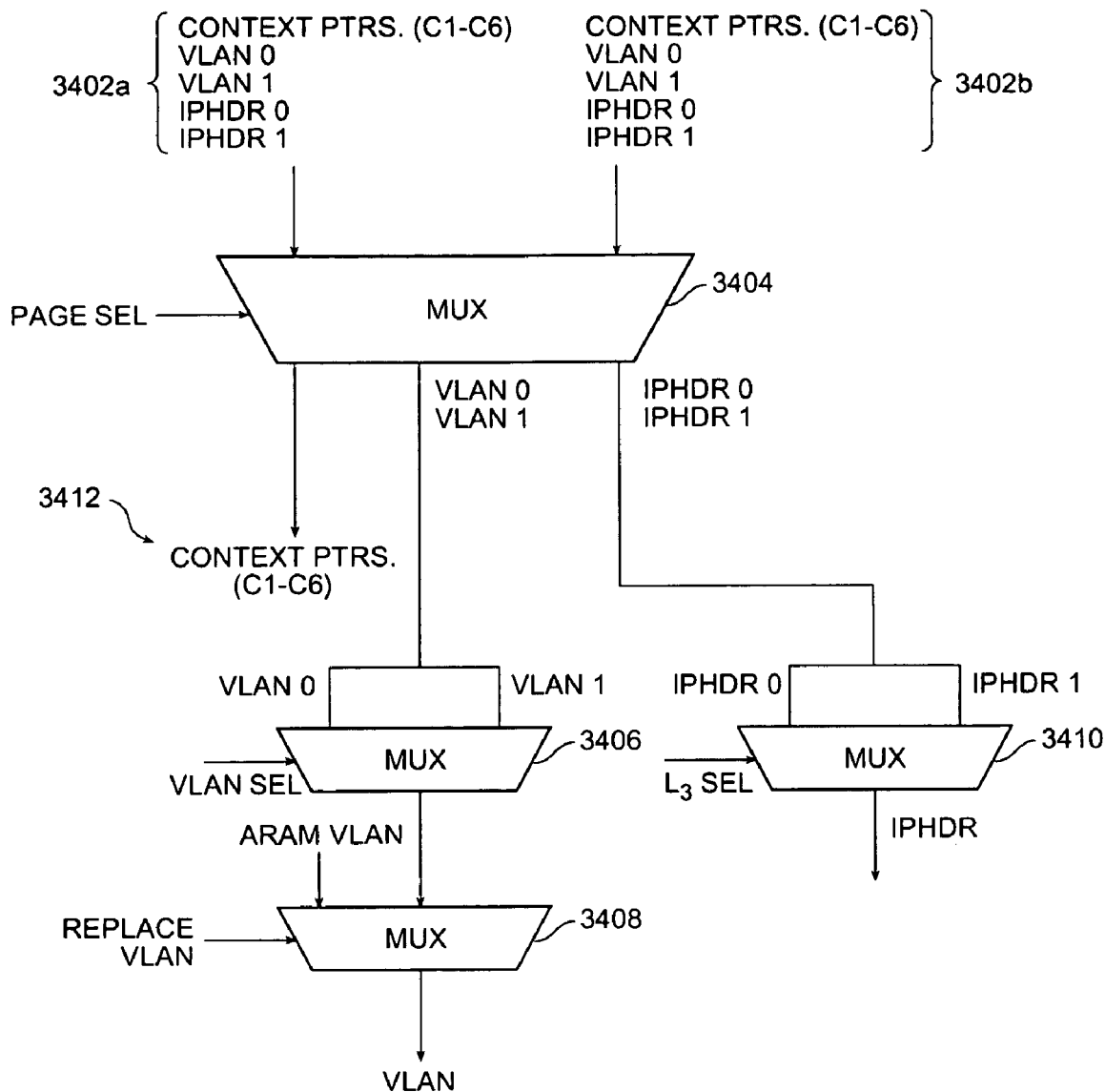
FIG. 34 illustrates an embodiment of logic for updating packet context pointers, current working VLAN, and current L3 Header using the context select values of FIG. 33.

The updated PAGE SEL, VLAN SEL, and L3 SEL values form part of the updated state data for the current slot, but they are used to update other portions of this state data, such as the context pointers C1-C6, and the working VLAN. An embodiment of multiplexing logic for updating this other state data, which may be part of processor 1802 or data path logic 1808, is illustrated in FIG. 34. Numeral 3402a identifies page 0 context information, while numeral 3404b identifies page 1 context information. The page 0 context information comprises the C1-C6 context pointers, up to two VLANs, VLAN0 and VLAN1, and up to two nested L3 IP Headers, IPHDR0 and IPHDR1. Similarly, the page 1 context information comprises the C1-C6 context pointers, up to two VLANs, VLAN0 and VLAN1, and up to two nested L3 IP Headers, IPHDR0 and IPHDR1.

Multiplexor 3404 selects between these two groupings of information based on the value of PAGE SEL. If two L3 IP headers are present in the selected page, multiplexor 3410 selects between these two headers based in the value of L3 SEL. Similarly, if two VLANs are present in the selected page, multiplexor 3406 selects between these two VLANs based on the value of VLAN SEL. And multiplexor 3408 selects between the VLAN selected by multiplexor 3406 and any ARAM-supplied VLAN based on the value of REPLACE VLAN (from the ARAM entry).

The output of multiplexor 3408 forms the updated working VLAN in the CONTROL SET portion of the process data. Similarly, the selected C1-C6 context pointers output by multiplexor 3404, identified with numeral 3412, form the updated C1-C6 context pointers in the CONTROL SET portion of the process data, except that the C3 context pointer may be modified if there are nested L3 headers in the selected page and the inner header is selected by multiplexor 3410 as the current L3 header. In that case, the C3 context pointer is updated to pointer to the inner L3 header.

Figure 35:
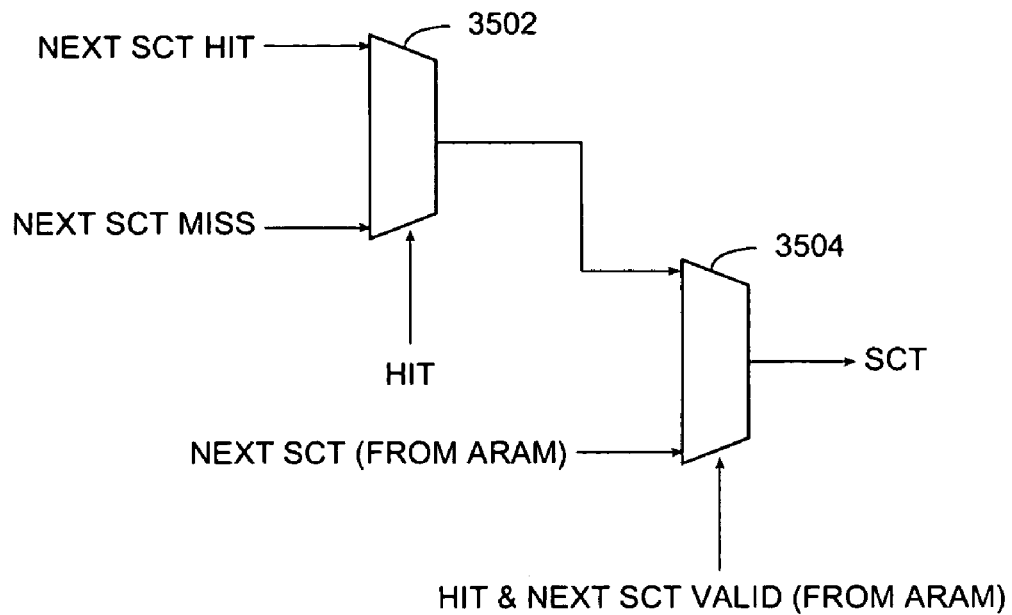
FIG. 35 illustrates an embodiment of logic for updating the index of the next SCT entry.

The value of LKUP COUNT in the CONTROL SET portion of the process data is incremented by one. In one embodiment, the SCT field in this CONTROL SET, representing the index of the next SCT entry, is updated using the logic illustrated in FIG. 35, which may be part of the processor 1802 or the data path logic 1808. As illustrated, multiplexor 3502 selects between the NEXT SCT HIT and NEXT SCT MISS values provided by the current SCT entry based on HIT, an indicator of whether there was a CAM hit or not. If a CAM hit occurred, NEXT SCT HIT is selected. If a CAM miss occurred, NEXT SCT MISS is selected.

Multiplexor 3504 selects between the selected SCT-supplied next SCT index output by multiplexor 3502 and the ARAM-supplied next SCT index (NEXT SCT) based on the logical ANDing of HIT and the ARAM-supplied NEXT SCT VALID field. In other words, if there was a CAM hit and the ARAM-supplied next SCT index is valid, the ARAM-supplied next SCT index (NEXT SCT) is selected. Otherwise, the selected SCT-supplied next SCT index (output by multiplexor 3504) is selected. The selected value output by multiplexor 3504 forms the SCT field in the CONTROL SET portion of the process data.

Figure 36:
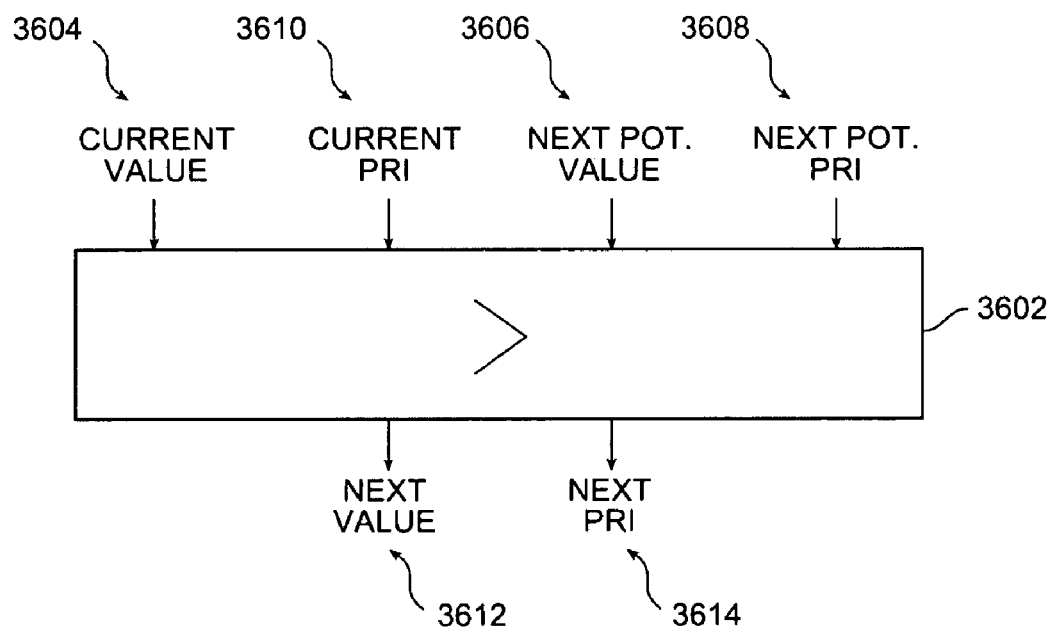
FIG. 36 illustrates an embodiment of logic for updating priority-based working state information.

The updating of the AFH SET portion of the process data will now be described. FIG. 36 illustrates an embodiment in which logic 3602 updates priority-based values within this AFH SET, such as PTI, IQoS, EQoS, CQoS, EMS/EMM, TXMI, and LAI. This logic, which may either be part of processor 1802 or data path logic 1808, is configured to updates the current value of a priority-based element 3604, such as PTI or TXMI, if two conditions are met. First, if the next potential value 3606 of this element is valid. Second, if the priority 3608 of the next potential value exceeds the priority 3610 of the current value 3604. If these two conditions are met, the next potential value 3606 replaces the current value 3604 in the state data, and the priority 3608 of the next potential value replaces the priority 3610 in the state data.

In one implementation, the specific manner of updating several elements of the AFH SET proceeds as follows:

PTI—the possible sources of the next PTI field include an ARAM entry, if any, corresponding to a CAM hit, and one or more of the Exception Handlers. If there is a tie, the first value is used. The ARAM-supplied PTI value has a priority determined by the current SCT entry, and the priority of any Exception Handler value is supplied by the Exception Handler. The next PTI is taken to be the PTI value from any of these sources that has the highest priority that exceeds the current priority. If there is no CAM hit, a default PTI value is obtained from one or more of the Exception Handlers. This default value only supplants the current PTI if its priority exceeds that of the current PTI.

IQoS—the possible sources of the next IQoS field include any of 0.1 p, MPLS, or ToS QoS mapping (if enabled by the current SCT entry), the PST (or VST), and the current ARAM entry (assuming a CAM hit). The SCT supplies the priority associated with the ARAM-supplied IQoS. A 4-bit PST (or VST) resident field is used to select a QoS Priority control structure from 16 possible structures. This structure indicates the priority for the PST, VST, 0.1 p, MPSL, and ToS IQoS values. The next IQoS value is taken to be the IQoS value from any of these sources that has the highest priority that exceeds the current priority. If there is a tie, the first value is used. In the case of MPLS parallel label processing, as described in U.S. patent application Ser. No. 10/835,271, parallel IQoS mappings are performed for each of the MPLS labels, and an ARAM supplied field (the MPLS field) is used to select the next IQoS value from these parallel operations.

EQoS—EQoS updating is performed the same way as IQoS, but using an independent set of resources. In one mode of operation, the least significant bits of the EQoS value encodes the following egress side decisions:

None.
Pre-emptive Kill.
Normal Kill.
Thermonuclear Kill.
Egress Mirror Copy.
Pre-emptive Intercept (to CPU or host).
Normal Intercept (to CPU).
CQoS—CQoS updating is performed the same way as IQoS, but using an independent set of resources. The assertion of a CQoS valid flag for any resource that wins the priority context causes a copy of the packet to be sent to the CPU regardless of the setting of any CPU_Copy or CPU_Alert flags.
EMS/EMM—EMS/EMM updating is performed the same way as IQoS, but using an independent set of resources.
TXMI—assuming a CAM hit, the SCT-supplied priority of the ARAM-supplied TXMI value is compared with the current priority, and if it exceeds the current priority, the ARAM-supplied TXMI value becomes the next TXMI value.
LAI—the next LAI may be supplied by two possible methods. First, if the ARAM-supplied LAI VALID field is asserted, the next LAI value is taken to be the value of the ARAM-supplied LAI field. Second, the next LAI value may be accumulated over one or more of the processing cycles using a hash-based lookup scheme as described in U.S. patent application Ser. No. 10/834,566.

The process of updating values in the STATS SET portion of the process data, and the process of updating the statistics data structures as maintained in the Statistics RAM 146 at the end of a processing cycle is described in U.S. patent application Ser. No. 10/834,573.

Figure 37:
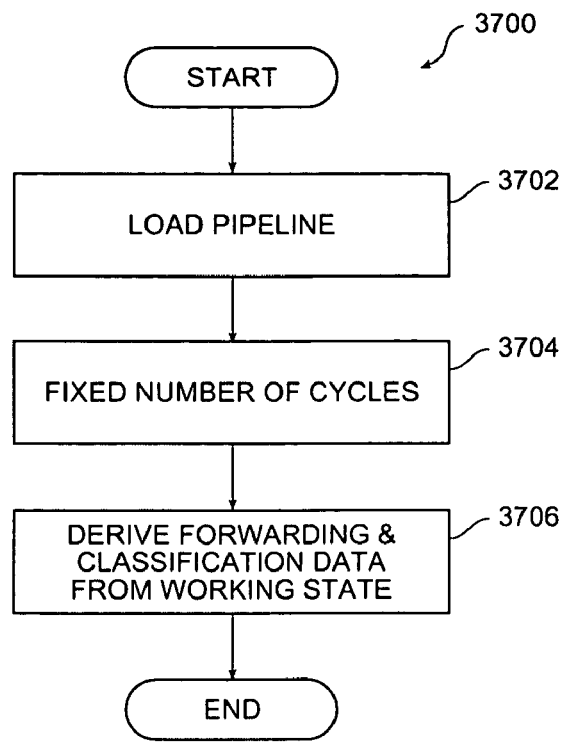
FIG. 37 is a flowchart of one embodiment of a method of performing pipelined processing of a packet.

FIG. 37 illustrates one embodiment 3700 of a method of performing pipelined processing of one or more packets in a pipeline having a predetermined number of slots for placement of packet data. The method comprises step 3702, loading each of one or more empty ones of the slots of the pipeline with available packet data. The method further comprises step 3704, processing the data in each of one or more filled ones of the slots in sequence during a cycle of processing, and also processing the data in each of one or more filled ones of the slots for a predetermined number of cycles of processing, occurs. The method further comprises step 3706, unloading the data in each of one or more filled ones of the slots upon or after the data in the filled slot has undergone the predetermined number of cycles of processing, and deriving classification or forwarding information for the packet from related state information for the packet.

In one embodiment, the predetermined number of slots in the pipeline is fixed. In another embodiment, it is a programmed variable. In one implementation, the step of loading the pipeline comprises filling one or more unfilled ones of the slots with packet data as obtained from a queue. In one example, the step further comprises bypassing one or more unfilled ones of the slots if and while the queue is empty.

In one implementation example, the packet data loaded into a slot is an identifier of the packet as stored in a buffer. In another implementation example, the state data relating to a packet is stored in a slot along with the packet data corresponding to the packet.

In one configuration, the related state data for a packet is control data, such as pipeline management data, or packet process state data. In one example, the control data is static packet information. In another example, the related state data is packet classification/forwarding information, such as priority-based packet classification/forwarding information or non-priority-based packet classification/forwarding information. The related state data may also comprise one or more "sticky" flags relating to the packet, or statistical information relating to the packet, including statistical information relating to each of a plurality of processing cycles performed on the corresponding packet data.

Figure 38:
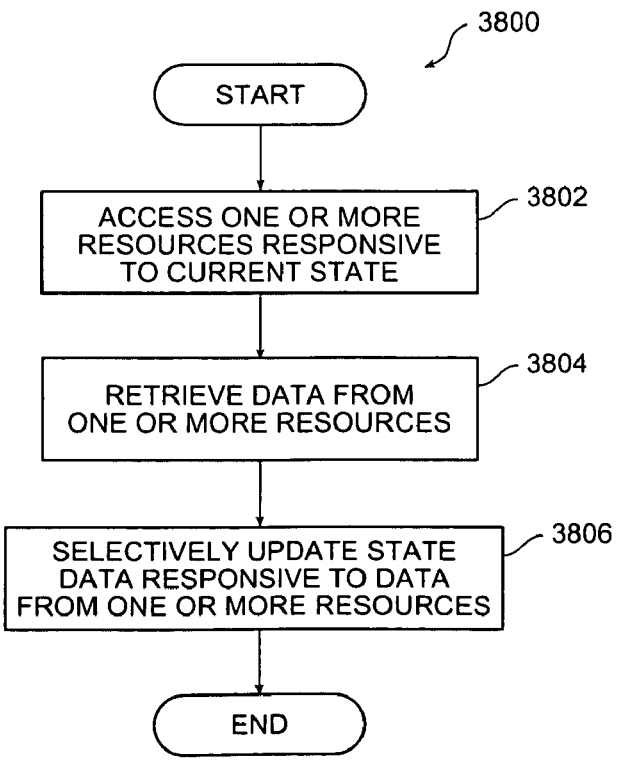
FIG. 38 is a flowchart of one embodiment of a method of performing a cycle of processing on the data in a filled slot of the pipeline.

FIG. 38 illustrates an embodiment 3800 of a method of processing the data in a filled slot of the pipeline during a processing cycle. As illustrated, in this embodiment, the method comprises step 3802, accessing one or more resources responsive to current working state data corresponding to the slot. The method also comprises step 3804, retrieving data from one or more of the resources. In one implementation, this step comprises retrieving an SCT entry using an SCT index as obtained from the working state data, deriving a CAM key from this entry, using this CAM key to perform a CAM search. If the search results in a hit, a corresponding ARAM entry is retrieved. The data in the SCT and/or ARAM entries form the data retrieved in step 3804. In one implementation, data from other resources besides the SCT and ARAM are retrieved in this step, including but not limited to QoS mapping tables, PST, VST or VPST tables, Exception Handlers, etc.

The method further comprises step 3806, selectively updating the working state data responsive to the data retrieved in step 3804.

PREFERRED EMBODIMENTS OF THE INVENTION

Figure 39:
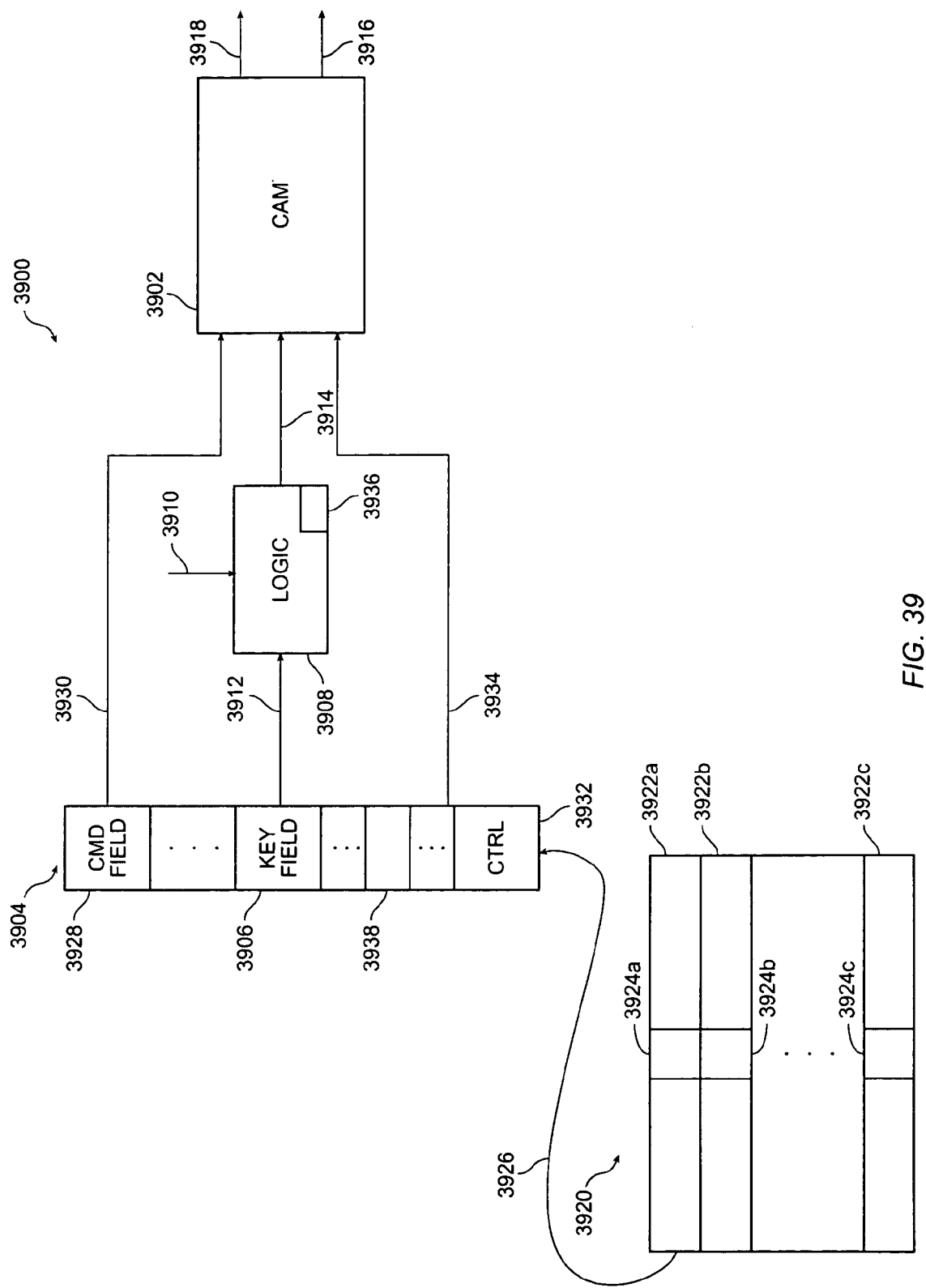
FIG. 39 is a block diagram of an embodiment of a system for accessing a content-addressable memory in a packet processing system.

FIG. 39 illustrates an embodiment 3900 of a system for accessing a content-addressable memory 3902 in a packet processing system. The memory 3902 has a plurality of locations, each associated with a value of a key and a content value. A register 3904 is configured to hold a data element having a key field 3906, the key field having a value. Logic 3908 is configured to derive a value of the key responsive to 1) packet processing state data relating to one or more packets, provided to the logic 3908 over one or more signal lines 3910, and 2) the value of the key field of the data element, provided to the logic 3908 over one or more signal lines 3912. The logic 3908 is further configured to present the derived value to the memory 3902 over one or more signal lines 3914.

The memory 3902 is configured to search for a location associated with the value of the key presented to it by the logic 3908. If such a location is found, the memory 3902 is configured to output the content value associated with the location over one or more signal lines 3916. In one embodiment, the memory 3902 also outputs, over one or more signal lines 3918, a signal indicative of a hit condition. If such a location is not found, the memory 3902 is configured to output, over one or more signal lines 3918, a signal indicative of a miss condition.

In one embodiment, the system further comprises a second memory 3920 holding a plurality of data elements 3922*a*, 3922*b*, 3922*c*, each having a key field 3924*a*, 3924*b*, 3924*c* set to a value, wherein the register 3904 may be loaded with any of the data elements 3922*a*, 3922*b*, 3922*c* over one or more signal lines 3926, thereby varying the value of the key field presented to the memory 3902.

In one embodiment, the packet processing system (not shown) is a pipelined packet processing system that has packet processing state data for each of one or more packets undergoing processing by the pipelined packet processing system. In this embodiment, the logic 3910 is configured to derive the value of the key responsive to 1) packet processing state data relating to the packet currently undergoing processing by the pipelined packet processing system; and 2) the value of the key field 3906.

In one implementation, the data element held in the register 3904 has a command field 3928, the command field 3928 having a value. In this implementation, the content-addressable memory 3902 is configured to perform one of several possible predetermined functions responsive to the value of the command field 3928 of the data element held in the register 3904. An example of such a function is a search or read operation. A second example of such a function is a write operation.

In one implementation example, the data element held in the register 3904 has a control field, specifying one or more control flags or values, that are provided to memory 3902 over one or more signal lines 3934.

In one configuration, the logic 3908 is configured to derive a value of the key for presenting to the content-addressable memory 3902 by selecting a subset of the packet processing state data relating to a packet, provided to the logic 3908 over one or more signal lines 3910, responsive to the value of the key field 3906.

In one embodiment, the data element held in the register 3904 has one or more reduction fields 3938 specifying a first subset of the packet processing state data, and the logic 3908 includes one or more data structures 3936 configured to map the first subset of the packet processing state data into mapped state data having reduced size. The logic 3908 is configured to select a second subset of the packet processing state data, as augmented by the mapped state data of reduced size, responsive to the value of the key field 3906.

Figure 40:
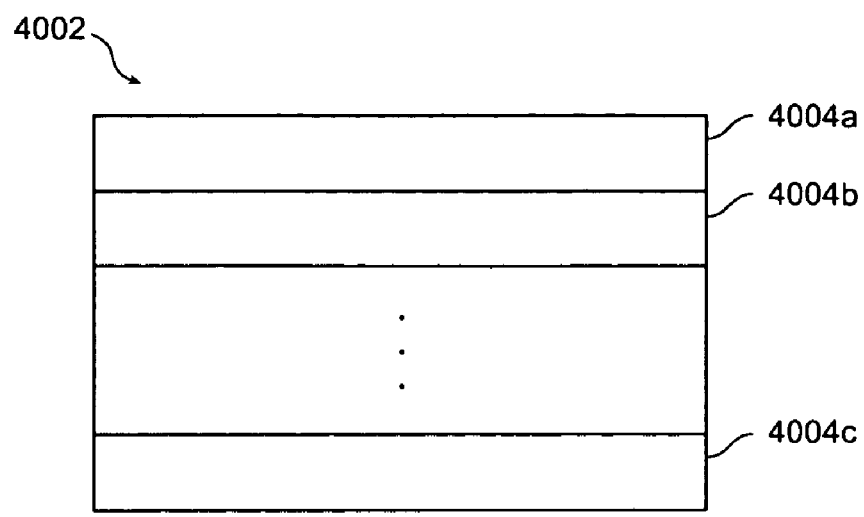
FIG. 40 is an implementation of a reduction table for reducing the size of a selected portion of state information representing the state of at least a portion of the packet processing system.

In one implementation, illustrated in FIG. 40, the one or more data structures 3938 comprise one or more tables 4002, each having entries 4004*a*, 4004*b*, 4004*c*. In one implementation example, the table 4002 has 256 entries, each comprising a 4 bit nibble. The table in this example is configured to map a selected byte of state data into a 4 bit nibble. The selected byte forms the address of an entry in the table, and the 4-bit nibble forming the content of the selected value, forms the mapped state data of reduced size that replaces the selected byte in the state data.

Figure 41A:
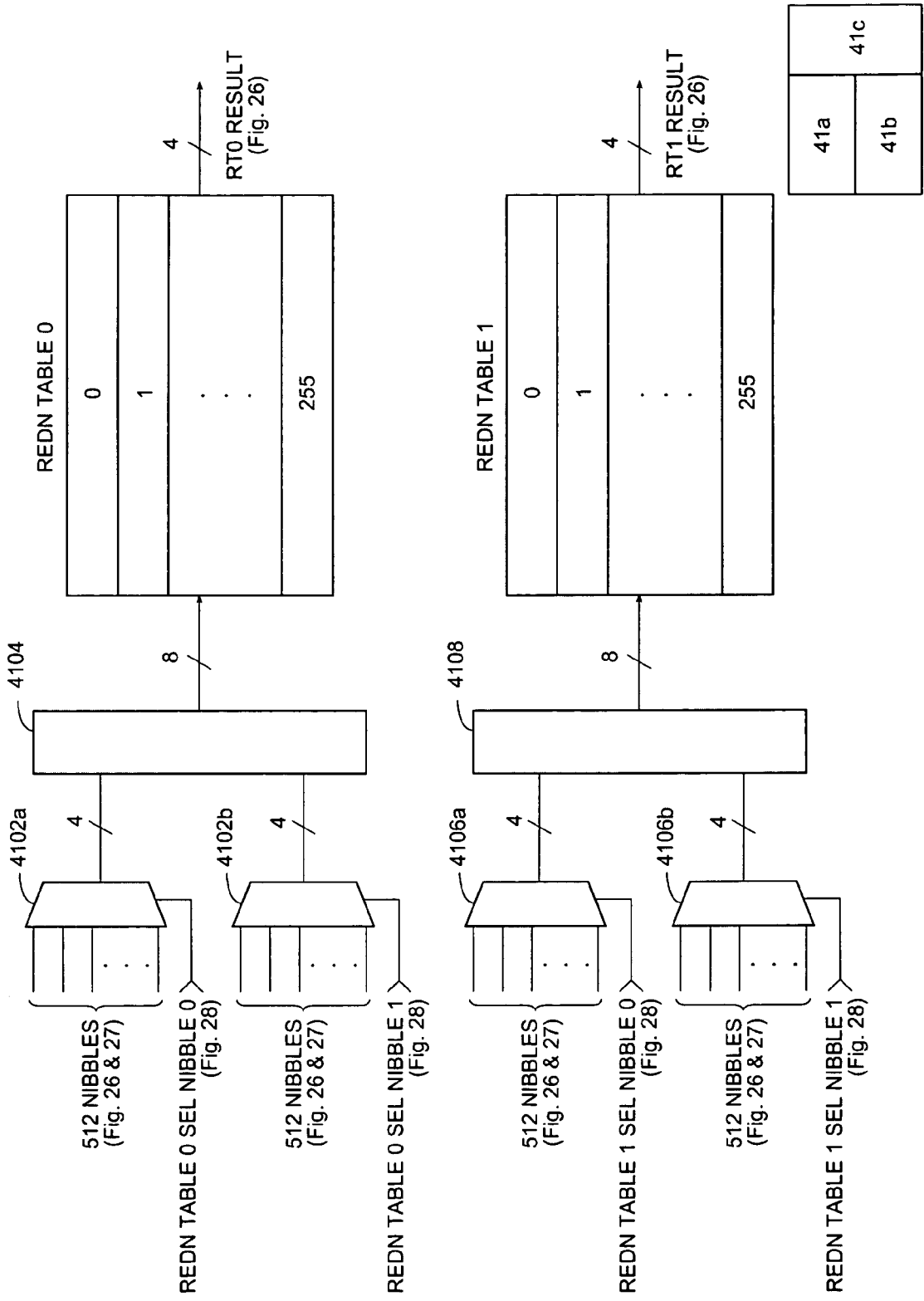
FIGS. 41A-41C is an implementation example of logic for deriving the value of a key for searching a content-addressable memory in a packet processing system.
Figure 41B:
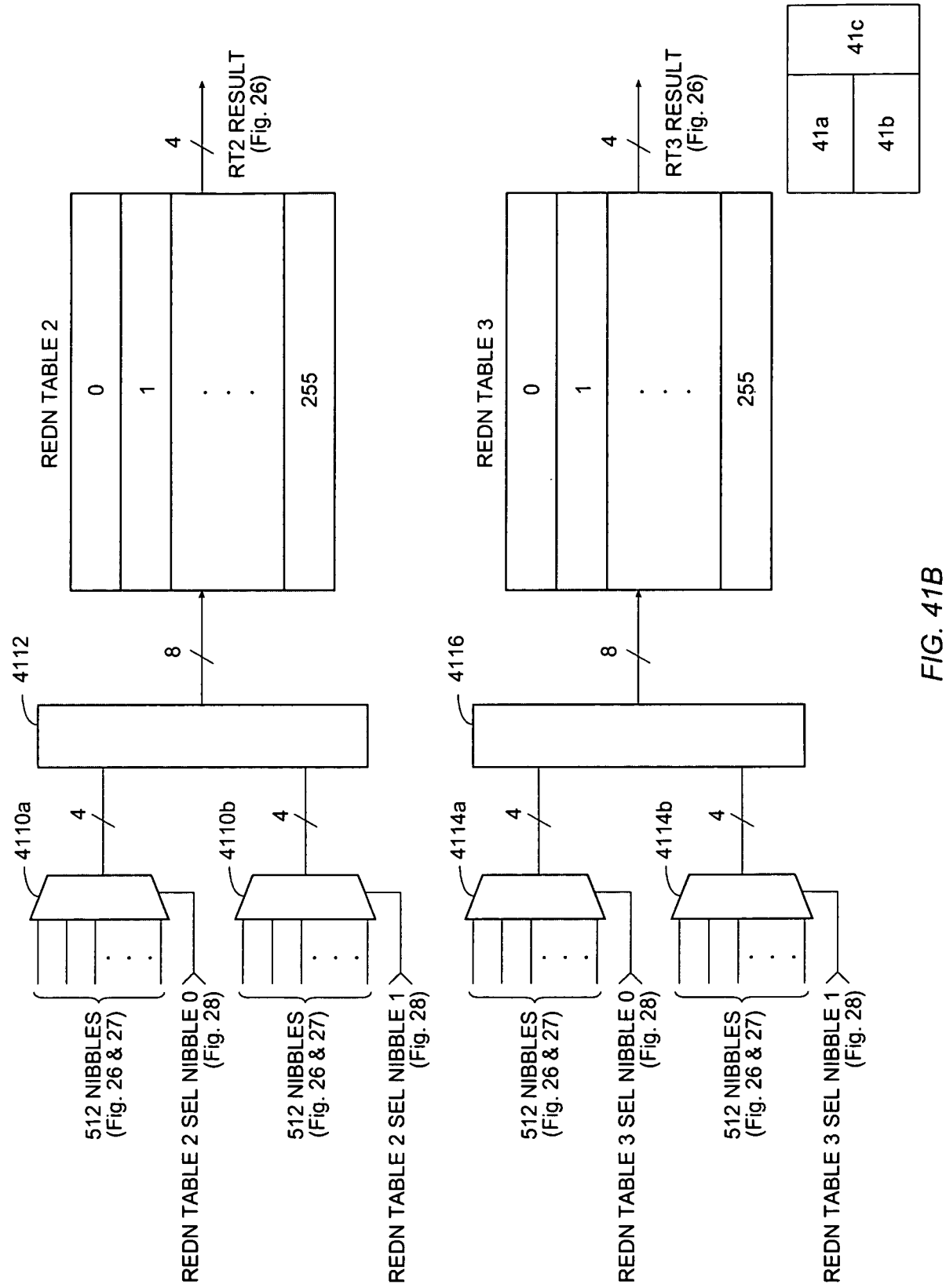
Figure 41C:
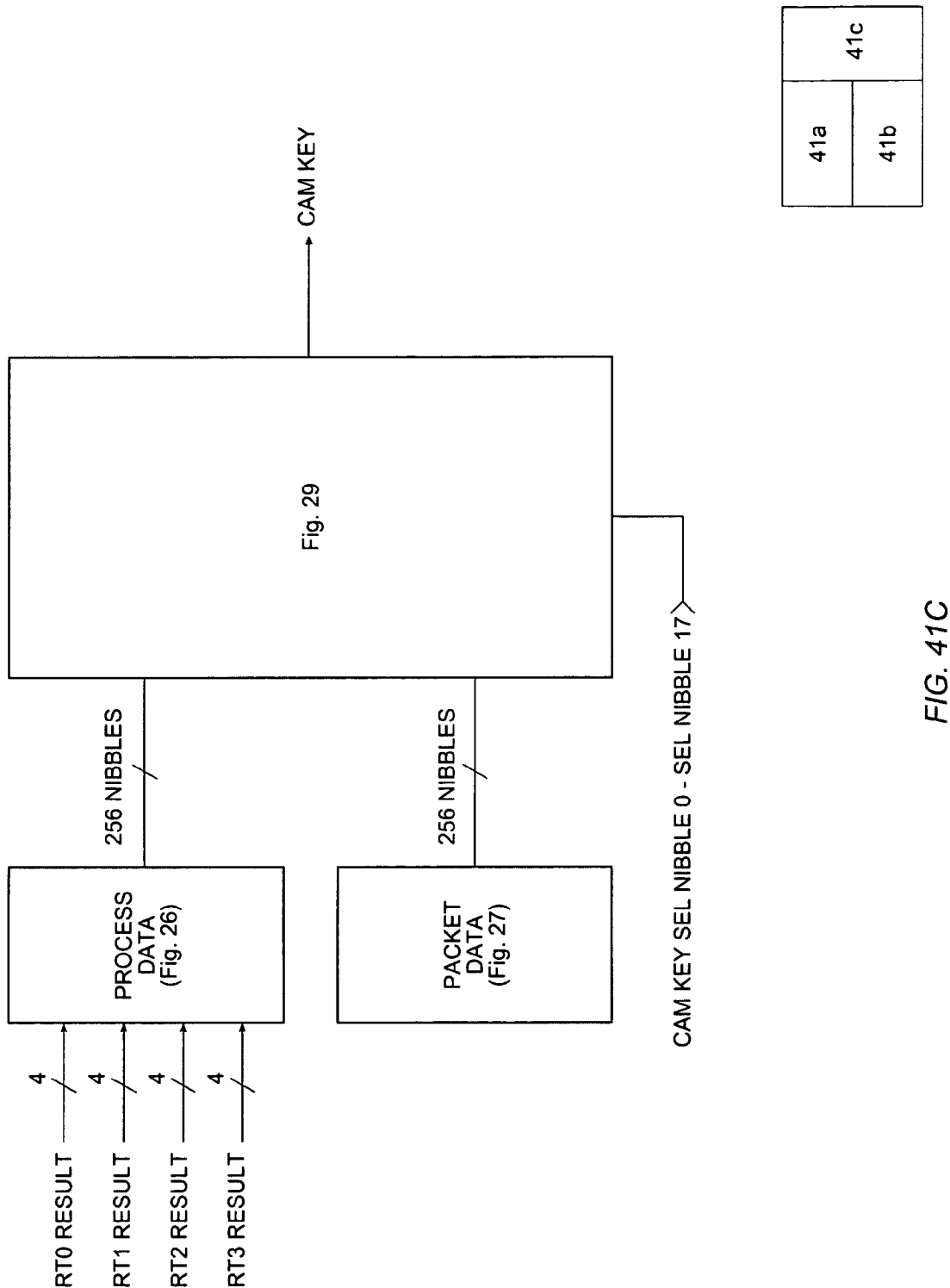

FIGS. 41A-41C illustrate an implementation example in which the data element is an SCT entry having the format illustrated in FIGS. 28A-28C, the memory 3902 is CAM 1810, and the second memory 3920 is the SCT 1806. The key field 3906 in this example comprises the eighteen CAM key selection fields CAM KEY SEL NIBBLE 0-CAM KEY SEL NIBBLE 17 in FIGS. 28A-28C. The command field 3928 comprises the CAM CMD field in FIGS. 28A-28C, and the control field 3932 comprises the CAM MISC field in FIGS. 28A-28C.

The packet processing state data in this example is the combined process data (illustrated in FIGS. 25 and 26) and packet data (illustrated in FIG. 27). There are four reduction fields in this example, one for each of four reduction tables, REDN TABLE 0-REDN TABLE 3, each comprising a 256 entry table that maps an 8-bit byte into a 4-bit nibble.

The first reduction field actually comprises the two fields REDN TABLE 0 SEL NIBBLE 0 and REDN TABLE 0 SEL NIBBLE 1 fields in FIGS. 28A-28C; the second reduction field comprises the two fields REDN TABLE 1 SEL NIBBLE 0 and REDN TABLE 1 SEL NIBBLE 1 in FIGS. 28A-28C; the third reduction field comprises the two fields REDN TABLE 2 SEL NIBBLE 0 and REDN TABLE 2 SEL NIBBLE 1 fields in FIGS. 28A-28C; and the fourth reduction field comprises the two fields REDN TABLE 3 SEL NIBBLE 0 and REDN TABLE 3 SEL NIBBLE 1 fields in FIGS. 28A-28C. Each of these fields has the format illustrated in FIG. 30.

The logic 3908 in this example comprises the logic shown of FIGS. 41A-41C. The 512 nibbles of packet processing state data (the combination of the process data of FIGS. 25 and 26 and the packet data of FIG. 27) are input to each of the multiplexors 4102*a*, 4102*b*, 4106*a*, 4106*b*, 4110*a*, 4110*b*, 4114*a*, 4114*b*. The REDN TABLE 0 SEL NIBBLE 0 field selects one of these nibbles, and provides the selected nibble on the output of multiplexor 4102*a*, and the REDN TABLE 0 SEL NIBBLE 1 field selects one of these nibbles, and provides the selected nibble on the output of multiplexor 4102*b*; Together, these two nibbles are combined in register 4104 to form a byte that is input to the first reduction table REDN TABLE 0. The output of REDN TABLE 0 is the nibble RT0 RESULT.

The REDN TABLE 1 SEL NIBBLE 0 field selects one of these nibbles, and provides the selected nibble on the output of multiplexor 4106*a*, and the REDN TABLE 1 SEL NIBBLE 1 field selects one of these nibbles, and provides the selected nibble on the output of multiplexor 4106*b*. Together, these two nibbles are combined in register 4108 to form a byte that is input to the second reduction table REDN TABLE 1. The output of REDN TABLE 1 is the nibble RT1 RESULT.

The REDN TABLE 2 SEL NIBBLE 0 field selects one of these nibbles, and provides the selected nibble on the output of multiplexor 4110*a*, and the REDN TABLE 2 SEL NIBBLE 1 field selects one of these nibbles, and provides the selected nibble on the output of multiplexor 4110*b*. Together, these two nibbles are combined in register 4112 to form a byte that is input to the third reduction table REDN TABLE 2. The output of REDN TABLE 2 is the nibble RT2 RESULT.

The REDN TABLE 3 SEL NIBBLE 0 field selects one of these nibbles, and provides the selected nibble on the output of multiplexor 4114*a*, and the REDN TABLE 3 SEL NIBBLE 1 field selects one of these nibbles, and provides the selected nibble on the output of multiplexor 4114*b*. Together, these two nibbles are combined in register 4116 to form a byte that is input to the first reduction table REDN TABLE 3. The output of REDN TABLE 3 is the nibble RT3 RESULT.

Together, these reduction tables allow up to 4 eight-bit bytes of process or packet data to be reduced to 4-bit nibbles, thus increasing the amount of information that can be represented in the CAM key. In general, any byte representing a sparsely populated data field is a good candidate for this reduction operation. In one example, the IP PROTOCOL byte, illustrated in FIG. 25, is a good candidate for reduction because it consumes 8 bits to represent only a few possible IP protocols, e.g., TCP, UDP, ICMP, etc.

These nibbles form part of the 256 nibbles of process data illustrated in FIGS. 25 and 26. As illustrated in FIG. 41C, these 256 nibbles are input to the logic of FIG. 29 along with the 256 nibbles of packet data illustrated in FIG. 27. This logic derives the CAM key in the manner described previously using the CAM key fields CAM KEY SEL NIBBLE 0-SEL NIBBLE 17.

Figure 42:
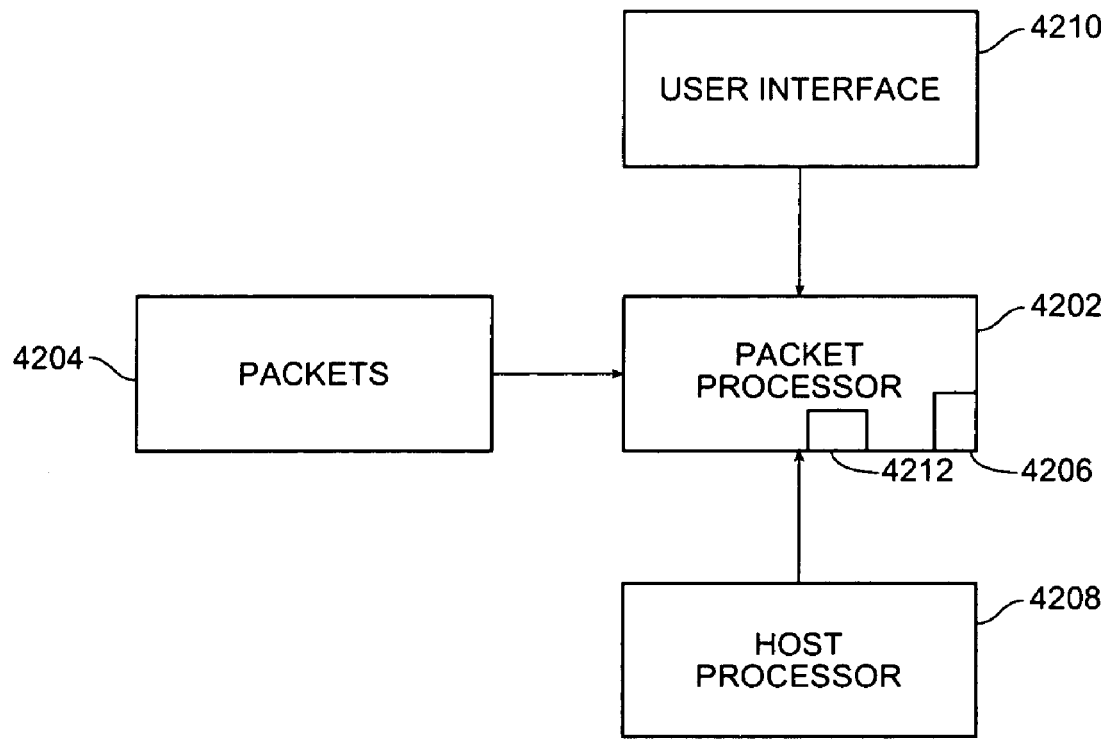
FIG. 42 is a block diagram of an embodiment of a system for flexibly controlling the bandwidth of a packet processing system in which at least one host processor is allowed to selectively direct at least one packet processor in the packet processing system to perform host-related processing operations.

FIG. 42 illustrates a system for flexibly controlling bandwidth of a pipelined packet processing system. In one embodiment, the system comprises at least one packet processor 4202 configured to 1) process in parallel a plurality of packets 4204 through at least one pipeline 4206 having a predetermined number of slots for placement of packet data, and 2) perform one or more processing sets, wherein, during a processing set, the at least one packet processor 4202 is configured to perform a first predetermined but programmable number of processing operations on each of one or more of the packets having data stored in the slots of the pipeline.

The system further comprises at least one host processor 4208 configured to direct the at least one packet processor 4202 to perform one or more host-related processing operations upon or after the completion of a second predetermined but programmable number of processing sets.

The system further comprises at least one interface 4210 through which a user can specify the first and second predetermined but programmable numbers, whereby the bandwidth of the packet processing system can be flexibly controlled through suitable setting of the first and second programmable numbers.

In one embodiment, the at least one host processor 4208 is configured to direct the at least one packet processor to perform a third predetermined number, equal to one or more, of host-related processing operations upon or after the completion of the second predetermined but programmable number of processing sets. In this embodiment, the at least one interface 4210 is configured to allow the user to specify the third predetermined but programmable number.

Figure 43:
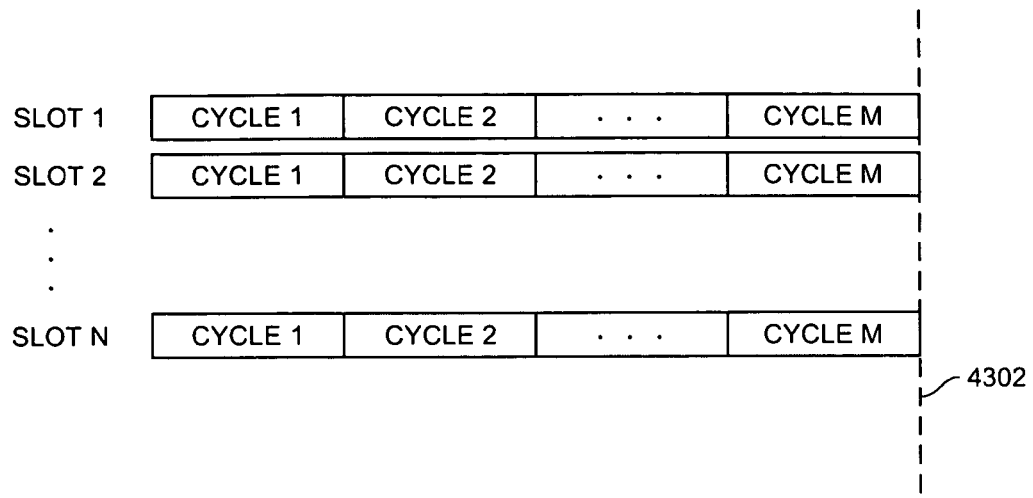
FIG. 43 is a diagram illustrating one example of a processing set performed by the at least one packet processor in the system of FIG. 42.

In one implementation, illustrated in FIG. 43, the pipeline has a fixed number n of slots, slot 1, slot 2, . . . , slot n, each of which is loaded with packet data representing a packet. During a processing set, the packet data is each of the n slots undergoes m cycles of processing, where m is the first predetermined but programmable number. The host processor 4208 in this implementation example is only able to have host-related processing operations performed at the conclusion of a processing set, identified with numeral 4302 in FIG. 43. In fact, in one example, the host processor 4208 is only able to have host-related processing operations performed at the conclusion of a predetermined number r of processing sets, where r is an integer of one or more. In this example, the number r is programmable and is the second predetermined but programmable number referred to above.

Figure 44:
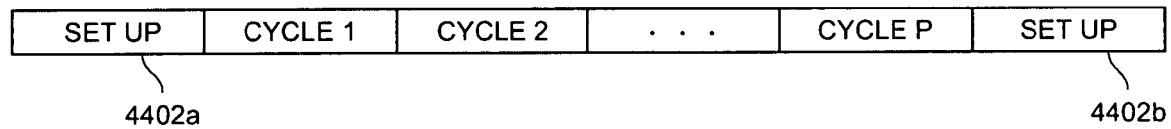
FIG. 44 is a diagram illustrating one example of host-directed processing operations performed by the at least one packet processor in the system of FIG. 42.

As illustrated in FIG. 44, once the host processor 4208 is given control of the packet processor 4202, it may direct the packet processor to perform a predetermined number p of processing operations. These operations may be performed for various purposes, such as debugging. In one example, the number p may be specified by a user through the user interface 4210. In this example, the number p is the third predetermined but programmable number referred to above.

In one configuration, the host processor 4208 indicates its desire to take control of the packet processor 4202 by posting a suitable message in a mailbox 4212. The packet processor 4202 may either monitor the mailbox in real-time or do so only at selected times, such as the conclusion of a processing set. In one example, the host-directed processing cycles do not begin immediately after control is passed to the host processor 4208. Instead, as represented by numeral 4402a in FIG. 44, execution of the host-directed processing cycles may be deferred for one or more setup cycles 4402a. Similarly, in this example, at the conclusion of the predetermined number p of host-directed processing cycles, execution of packet-related processing cycles by the packet processor 4202 is deferred for one or more setup cycles 4402b.

In this configuration, a user sets the values of m, r and p in a configuration register through a suitable interface, such as a screen-driven menu, and the packet processor 4202 retrieves these values from the register, and configures its pipelined packet processing operations accordingly. In this configuration, these values together determine the latency of the system, and hence bandwidth or throughput of packet processing operations. In particular, reducing the value of m, increasing the value of r, and reducing the value of p each increases the throughput of packet processing, while increasing the value of m, reducing the value of r, and increasing the value of p each decreases the throughput of packet processing. In one example, the numbers m, r and p are each integers of one or more.

Figure 45:
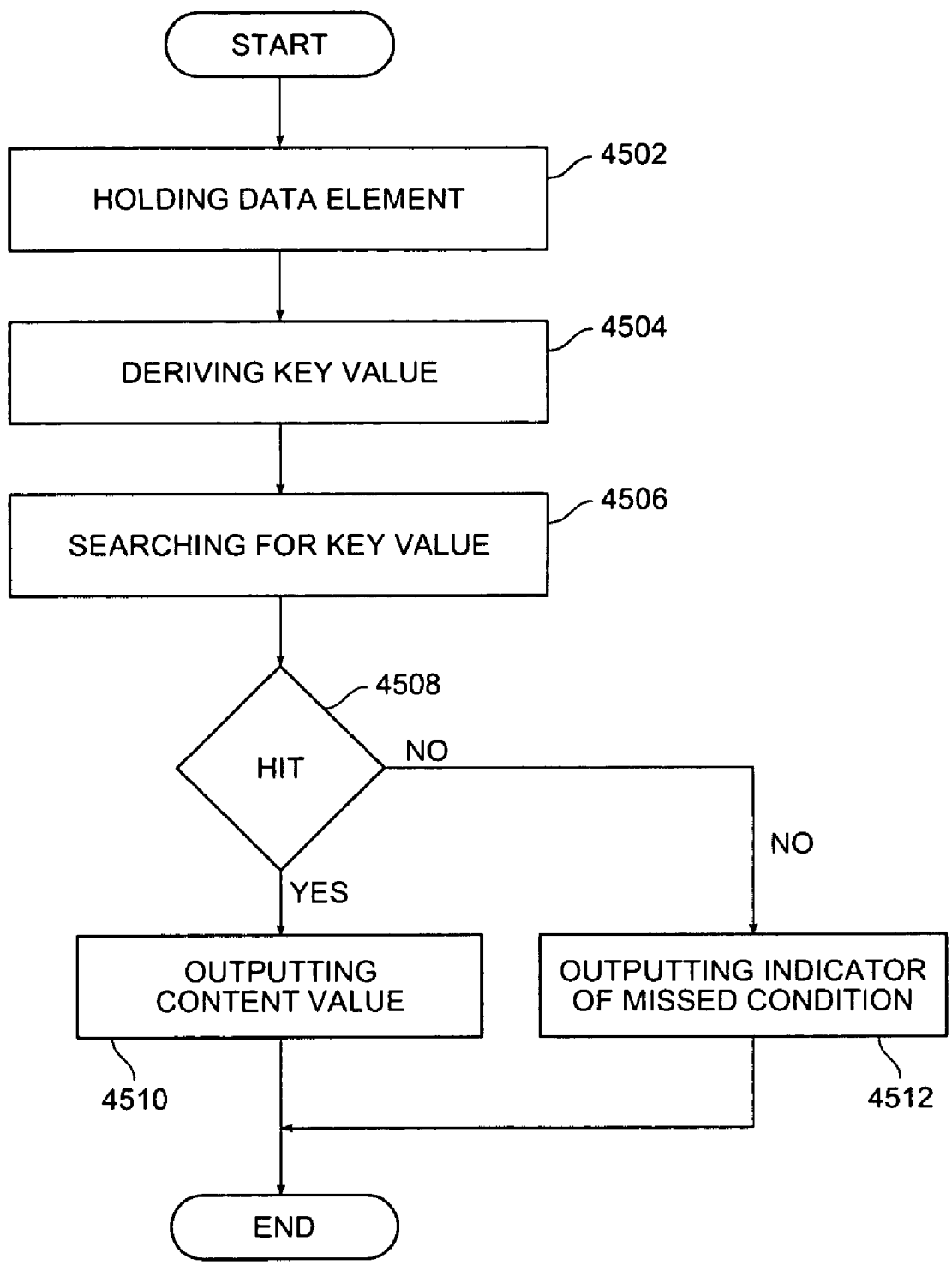
FIG. 45 is a flowchart illustrating one embodiment of a method of deriving a key for accessing a content-addressable memory in a packet processing system.

FIG. 45 illustrates a method of accessing a content-addressable memory in a packet processing system, the memory having a plurality of locations, each associated with a value of a key and a content value. In one embodiment, the method comprises step 4502, holding a data element having a key field, the key field having a value.

In this embodiment, the method also comprises step 4504, deriving a value of the key responsive to 1) packet processing state data relating to one or more packets, and 2) the value of key field of the data element, and presenting that value to the memory.

The method further comprises step 4506, searching in the memory for a location associated with the value of the key presented to it, and step 4508, inquiring whether the search resulted in a hit or not. If such a location is found, step 4510, outputting the content value associated with the location, is performed. In one implementation, the method also outputs a signal indicative of a hit condition. If such a location is not found, step 4512, outputting a signal indicative of a miss condition, is performed.

In one implementation, the method further comprises retrieving the data element from a second memory holding a plurality of data elements, each having a key field set to a value.

In one implementation example, the packet processing system is a pipelined packet processing system having packet processing state data for each of one or more of the packets undergoing processing by the pipelined packet processing system, and the deriving step 4504 comprises deriving the value of the key responsive to the packet processing state data relating to the packet currently undergoing processing by the pipelined packet processing system.

In one embodiment, the deriving step 4504 comprises deriving a value of the key for presenting to the content-addressable memory by selecting a subset of the packet processing state data responsive to the value of the key field.

In a second embodiment, the deriving step 4504 comprises reducing the size of at least a portion of the state data to form modified state data, and deriving a value of the key for presenting to the content-addressable memory responsive to the modified state data and the value of the key field.

In one implementation of this embodiment, the held data element has one or more reduction fields specifying a first subset of the packet processing state data, and the deriving step comprises deriving a value of the key for presenting to the content-addressable memory by 1) mapping the first subset of state data into mapped state data having reduced size, and 2) selecting a second subset of the state data, as augmented by the mapped state data of reduced size, responsive to the value of the key selection field.

Figure 46:
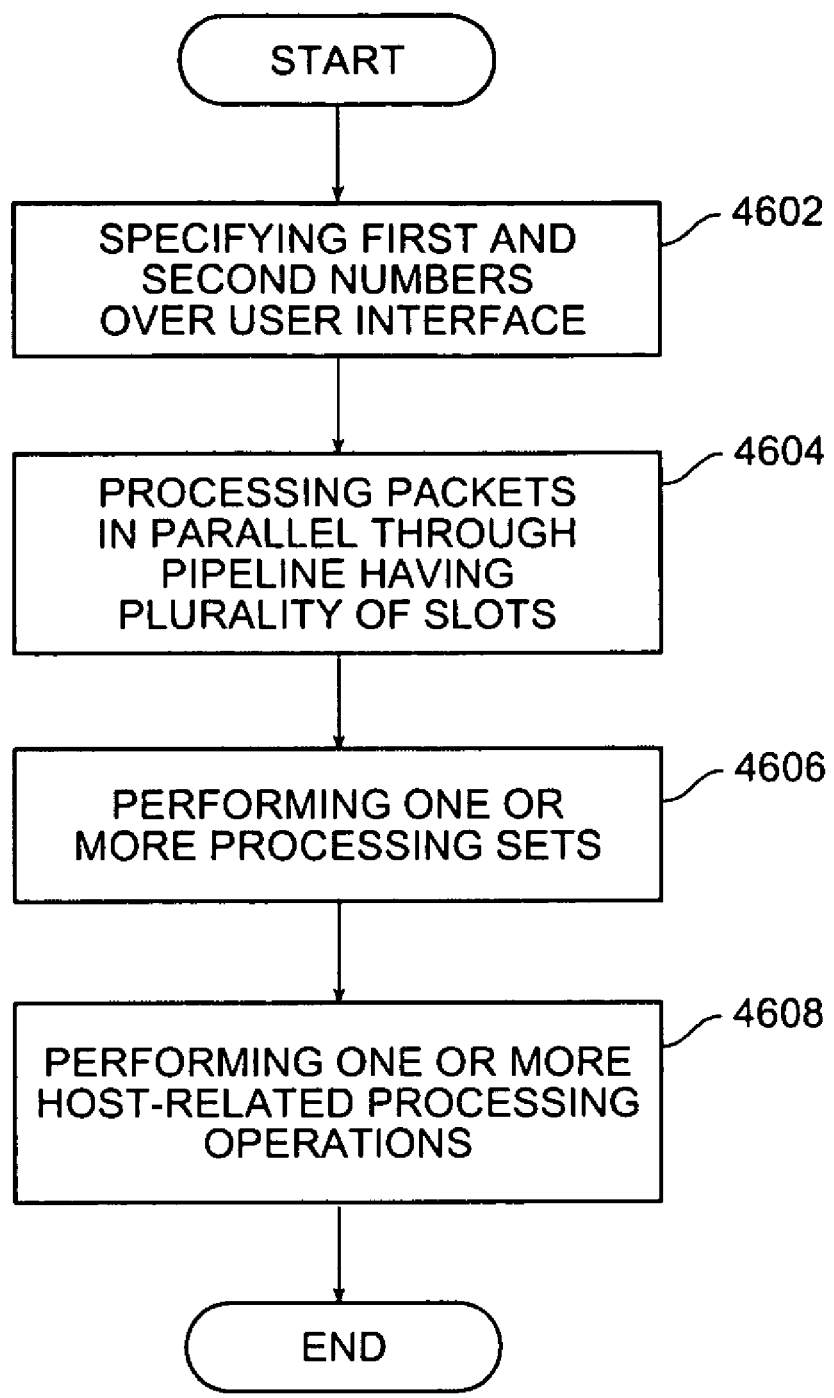
FIG. 46 is a flowchart illustrating one embodiment of a method of flexibly controlling the bandwidth of a packet processing system in which at least one host-processor is allowed to selectively direct the at least one packet processor to perform host-related processing operations.

FIG. 46 illustrates a method of flexibly controlling bandwidth of pipelined packet processing. In one embodiment, the method comprises step 4602, specifying first and second predetermined but programmable numbers through at least one user interface.

The method further comprises step 4604, processing in parallel a plurality of packets through at least one pipeline having a predetermined number of slots for placement of packet data.

The method further comprises step 4606, performing one or more processing sets, wherein, in each such set, the first predetermined but programmable number of processing operations are performed on each of one or more of the packets having data stored in the slots of the pipeline.

The method further comprises step 4608, performing one or more host-related processing operations upon or after the completion of the second predetermined but programmable number of processing sets.

In one embodiment, the specifying step 4602 further comprises specifying a third predetermined but programmable number through the at least one user interface, and the last performing step 4608 comprises performing the third predetermined number of host-related processing operations upon or after the completion of the second predetermined but programmable number of processing sets.

In one implementation example, any of the foregoing systems and methods may be implemented or embodied as one or more application specific integrated circuits (ASICs).

While various embodiments of the invention have been described, it will be apparent to those of ordinary skill in the art that many more embodiments and implementations are possible that are within the scope of this invention.

What is claimed is:

1. A system for accessing a content-addressable memory in a pipelined packet processing system, the memory having a plurality of locations, each associated with a value of a key and a content value, comprising:
   a register for holding a data element having a key field, the key field having a value; and
   logic for deriving a value of the key responsive to 1) packet processing state data indicating state of processing of one or more packets undergoing processing by the pipelined packet processing system, and 2) the value of the key field of the data element held by the register, and presenting the derived value to the memory;
   wherein the memory is configured to search for a location associated with the derived value of the key presented to it by the logic, and, if such a location is found, output the content value associated with the location, and, if such a location is not found, outputting a signal indicative of a miss condition;
   wherein the packet processing state data comprises a sequence control table index.

2. The system of claim 1 further comprising a second memory holding a plurality of data elements, each having a key field set to a value, wherein the register may be loaded with any of the data elements, thereby varying the value of the key field presented to the memory;
   wherein the register is coupled to the logic and the register is coupled to the content-addressable memory.

3. The system of claim 1 wherein the pipelined packet processing system has packet processing state data for each of one or more packets undergoing processing by the pipelined packet processing system, and the logic is configured to derive the value of the key responsive to packet processing state data relating to the packet currently undergoing processing by the pipelined packet processing system.

4. The system of claim 3 wherein the data element held in the register has a command field, the command field having a value, and the content-addressable memory is configured to perform one of several possible predetermined functions responsive to the value of the command field of the data element held in the register.

5. The system of claim 4 wherein the value of the command field of the data element specifies a search or read operation.

6. The system of claim 4 wherein the value of the command field of the data element specifies a write operation.

7. The system of claim 1 wherein the logic is configured to derive a value of the key for presenting to the content-addressable memory by selecting a subset of the packet processing state data responsive to the value of the key field.

8. The system of claim 1 wherein the packet processing state data has a size, and the logic is configured to reduce the size of at least a portion of the state data to form modified state data, and derive a value of the key for presenting to the content-addressable memory from the modified state data and the value of the key field.

9. The system of claim 8 wherein the data element held in the register has one or more reduction fields specifying a first subset of the state data, and the logic includes one or more data structures configured to map the first subset of state data into mapped state data having reduced size, and the logic is configured to select a second subset of the state data, augmented with the mapped state data of reduced size, responsive to the value of the key field.

10. A system for flexibly controlling bandwidth of a pipelined packet processing system comprising:
    a content-addressable memory;
    at least one packet processor configured to 1) process in parallel a plurality of packets through at least one pipeline having a plurality of slots for placement of packet data, and 2) perform one or more processing sets, wherein, during each of the one or more processing sets, the at least one packet processor is configured to perform a first predetermined but programmable number of processing operations (m) on each of one or more of the packets having data stored in the slots of the pipeline, each of the processing operations including at least one access to the content-addressable memory;
    at least one host processor configured to direct the at least one packet processor to perform one or more host-related processing operations upon or after the completion of a second predetermined but programmable number of processing sets (r); and
    at least one interface through which a user can specify the first (m) and second (r) predetermined but programmable numbers;
    wherein m is the number of cycles of processing, and r is the number of processing sets;
    wherein the bandwidth of the packet processing system is flexibly controlled through suitable setting of the first (m) and second (r) programmable numbers.

11. The system of claim 10, wherein the at least one host processor is configured to direct the at least one packet processor to perform a third predetermined number (p), equal to one or more, of host-related processing operations upon or after the completion of the second predetermined but programmable number of processing sets (r), and the at least one interface is configured to allow the user to specify the third predetermined but programmable number (p);
    wherein p is the number processing operations;
    wherein the bandwidth of the packet processing system is flexibly controlled through suitable setting of the first (m) and second (r) and third (p) programmable numbers.

12. A method of accessing a content-addressable memory in a pipelined packet processing system, the memory having a plurality of locations, each associated with a value of a key and a content value, comprising:
    in a register, holding a data element having a field, the field having a value;
    deriving a value of the key responsive to packet processing state data indicating state of processing of one or more packets undergoing processing by the pipelined packet processing system and the value of the key field of the data element held by the register, and presenting that derived value to the memory; and in the memory, searching for a location associated with the derived value of the key presented to it, and, if such a location is found, outputting the content value associated with the location, and, if such a location is not found, outputting a signal indicative of a miss condition;

wherein the packet processing state data comprises a sequence control table index.

13. The method of claim 12 further comprising retrieving the data element from a second memory holding a plurality of data elements, each having a key field set to a value;

wherein the register is coupled to the logic and the register is coupled to the content-addressable memory.

14. The method of claim 12 wherein the pipelined packet processing system has packet processing state data for each of one or more of the packets undergoing processing by the pipelined packet processing system, and the deriving step comprises deriving the value of the key responsive to packet processing state data relating to the packet currently undergoing processing by the pipelined packet processing system.

15. The method of claim 12 wherein the deriving step comprises deriving a value of the key for presenting to the content-addressable memory by selecting a subset of the packet processing state data responsive to the value of the key field.

16. The method of claim 12 wherein the packet processing state data has a size, and the deriving step comprises reducing the size of at least a portion of the state data to form modified state data, and deriving a value of the key for presenting to the content-addressable memory from the modified state data and the value of the key field.

17. The method of claim 16 wherein the held data element has one or more reduction fields specifying a first subset of the state data, and the method further comprises mapping the first subset of state data into mapped state data having reduced size, and the deriving step comprises deriving a value of the key for presenting to the content-addressable memory by selecting a second subset of the state data responsive to the value of the key field.

18. A method of flexibly controlling bandwidth of pipelined packet processing comprising:

providing a content-addressable memory;

specifying first (m) and second (r) but programmable numbers through at least one user interface;

processing in parallel a plurality of packets through at least one pipeline having a plurality of slots for placement of packet data;

performing one or more processing sets, wherein, during each of the one or more processing sets, the first predetermined but programmable number of processing operations (m) is performed on each of one or more of the packets having data stored in the slots of the pipeline, each of the processing operations including at least one access to the content-addressable memory; and performing one or more host-related processing operations upon or after the completion of the second predetermined but programmable number of processing sets (r);

wherein m is the number of cycles of processing, and r is the number of processing sets;

wherein the bandwidth of the packet processing system is flexibly controlled through suitable setting of the first (m) and second (r) programmable numbers.

19. The method of claim 18, wherein the specifying step further comprises specifying a third predetermined but programmable number (p) through the at least one user interface, and the last performing step comprises performing the third predetermined number (p) of host-related processing operations upon or after the completion of the second predetermined but programmable number of processing sets (r);

wherein p is the number of processing operations;

wherein the bandwidth of the Packet processing system is flexibly controlled through suitable setting of the first (m) and second (r) and third (p) programmable numbers.

20. A system for accessing content-addressable memory means in a pipelined packet processing system, the memory means having a plurality of locations, each associated with a value of a key and a content value, comprising:

holding means for holding a data element having a key field, the key field having a value; and deriving means for deriving a value of the key responsive to 1) packet processing state data indicating state of processing of one or more packets undergoing processing by the pipelined packet processing system, and 2) the value of the key field of the data element held by the holding means, and presenting the derived value to the memory means;

wherein the memory means is configured to search for a location associated with the derived value of the key presented to it by the deriving means, and, if such a location is found, output the content value associated with the location, and, if such a location is not found, output a signal indicative of a miss condition;

wherein the packet processing state data comprises a sequence control table index.

21. The system of claim 20 wherein the packet processing state data has a size and the deriving means is configured to reduce the size of at least a portion of the state data to form modified state data, and derive a value of the key for presenting to the content-addressable memory from the modified state data responsive to the value of the key field.

22. The system of claim 21 wherein the data element held in the holding means has one or more reduction fields specifying a first subset of the packet processing state data, and the deriving means in configured to map the first subset of state data into mapped state data having reduced size, and derive a value of the key for presenting to the content-addressable memory by selecting a second subset of the state data, as augmented by the mapped state data of reduced size, responsive to the value of the key field.

* * * * *